(12) United States Patent
Austin et al.

(10) Patent No.: US 12,428,529 B2
(45) Date of Patent: Sep. 30, 2025

(54) COMPOSITES CONTAINING CELLULOSE-BASED COMPOSITIONS

(71) Applicant: Renmatix, Inc., Wayne, PA (US)

(72) Inventors: Jeremy R. Austin, Malvern, PA (US); Danilo A. Cantero, Wallingford, PA (US); Stephen Herbert Harris, Kennett Square, PA (US)

(73) Assignee: Renmatix, Inc., Wayne, PA (US)

( * ) Notice: Subject to any disclaimer, the term of this patent is extended or adjusted under 35 U.S.C. 154(b) by 0 days.

(21) Appl. No.: 18/235,735

(22) Filed: Aug. 18, 2023

(65) Prior Publication Data

US 2024/0076459 A1    Mar. 7, 2024

Related U.S. Application Data

(63) Continuation of application No. 17/044,612, filed as application No. PCT/US2019/024110 on Mar. 26, 2019, now abandoned.

(60) Provisional application No. 62/652,113, filed on Apr. 3, 2018.

(51) Int. Cl.
| | | |
|---|---|---|
| C08J 5/04 | (2006.01) | |
| C08K 3/40 | (2006.01) | |
| C08K 7/14 | (2006.01) | |
| C08L 1/02 | (2006.01) | |
| C08L 77/02 | (2006.01) | |

(52) U.S. Cl.
CPC .......... *C08J 5/043* (2013.01); *C08L 1/02* (2013.01); *C08L 77/02* (2013.01); *C08J 2301/02* (2013.01); *C08J 2377/02* (2013.01); *C08K 3/40* (2013.01); *C08K 7/14* (2013.01); *C08L 2310/00* (2013.01)

(58) Field of Classification Search
CPC ...... C08J 2301/02; C08J 2377/02; C08J 5/04; C08J 5/0405; C08J 5/041; C08J 5/042; C08J 5/043; C08K 3/346; C08K 3/40; C08K 7/14; C08L 2310/00; C08L 2666/02; C08L 1/02
See application file for complete search history.

(56) References Cited

U.S. PATENT DOCUMENTS

| | | |
|---|---|---|
| 2,781,328 A | 2/1957 | Ayers et al. |
| 4,652,363 A | 3/1987 | Miller |
| 4,946,953 A | 8/1990 | Okuma et al. |
| 5,104,520 A | 4/1992 | Maronde et al. |
| 5,123,962 A | 6/1992 | Komuro et al. |
| 5,413,802 A | 5/1995 | Baumanis et al. |
| 6,921,820 B2 | 7/2005 | Arai et al. |
| 7,144,972 B2 | 12/2006 | Hayes |
| 7,507,474 B2 | 3/2009 | Varlet et al. |
| 7,901,663 B2 | 3/2011 | Lenglet |
| 7,955,508 B2 | 6/2011 | Allan et al. |
| 8,057,639 B2 | 11/2011 | Pschorn et al. |
| 8,075,629 B2 | 12/2011 | Gomaa et al. |
| 8,282,738 B2 | 10/2012 | Kilambi |
| 8,372,899 B2 | 2/2013 | Kotzev et al. |
| 8,729,325 B2 | 5/2014 | Powell |
| 8,747,561 B2 | 6/2014 | Tao |
| 8,999,065 B2 | 4/2015 | Vitalyevich et al. |
| 9,169,523 B2 | 10/2015 | Vitalyevich et al. |
| 9,399,782 B2 | 7/2016 | Smith et al. |
| 10,385,140 B2 | 8/2019 | Capanema et al. |
| 11,440,974 B2 | 9/2022 | Capanema et al. |
| 2002/0172650 A1 | 11/2002 | Cannell et al. |
| 2003/0017187 A1 | 1/2003 | Brode et al. |
| 2003/0018187 A1 | 1/2003 | Arai et al. |
| 2004/0074615 A1 | 4/2004 | Nguyen |
| 2007/0093654 A1 | 4/2007 | Yabusaki |
| 2007/0148750 A1 | 6/2007 | Hoshino et al. |
| 2007/0196471 A1 | 8/2007 | Thosar et al. |
| 2009/0221814 A1 | 9/2009 | Pschorn et al. |
| 2010/0043782 A1 | 2/2010 | Kilambi et al. |
| 2010/0048884 A1 | 2/2010 | Kilambi |
| 2010/0063271 A1 | 3/2010 | Allan et al. |
| 2010/0069626 A1 | 3/2010 | Kilambi |
| 2010/0170504 A1 | 7/2010 | Zhang |
| 2010/0206499 A1 | 8/2010 | Lasonde et al. |
| 2010/0285295 A1 | 11/2010 | Wang et al. |
| 2011/0182990 A1 | 7/2011 | Su et al. |
| 2011/0219679 A1 | 9/2011 | Budarin et al. |
| 2012/0100585 A1 | 4/2012 | Ropars et al. |
| 2012/0108127 A1 | 5/2012 | Yuan et al. |
| 2012/0108798 A1 | 5/2012 | Wenger et al. |

(Continued)

FOREIGN PATENT DOCUMENTS

| | | |
|---|---|---|
| AU | 2013290013 | 1/2017 |
| AU | 2015320328 | 4/2019 |

(Continued)

OTHER PUBLICATIONS

CN 104817836 A machine translation (Aug. 5, 2015).*
CN 106010155 A machine translation (Oct. 12, 2016).*
CN 104592753 A machine translation (May 6, 2015).*
JP-2007163574-A machine translation (Jun. 28, 2007).*
JP-2012201767-A machine translation (Oct. 22, 2012).*
Abdullah et al. (2014) "Hydrothermal decomposition of various crystalline celluloses as treated by semi-flow hot-compressed water," Journal of Wood Science 60: 278-286.
Avicel PH-200. FMC BioPolymer: Certificate of Analysis—Avicel® Microcrystalline Cellulose, NF, Ph. Eur, JP. FMC International (1 page).
Avicel® PH-200—Microcrystalline Cellulose NF, Ph. Eur., JP. Product Specification Bulletin. FMC International: FMC BioPolymer (2 pages).

(Continued)

*Primary Examiner* — Ana L. Woodward
(74) *Attorney, Agent, or Firm* — Ballard Spahr LLP

(57) ABSTRACT

This invention relates to methods for making compositions comprising polymers and a cellulose composition comprising particles, wherein the particles comprises cellulose. This invention also relates to methods for forming articles from the disclosed compositions and compositions and articles made from a disclosed process. This is intended as a scanning tool for purposes of searching in the particular art and is not intended to be limiting of the present invention.

8 Claims, 2 Drawing Sheets

(56) References Cited

U.S. PATENT DOCUMENTS

| | | |
|---|---|---|
| 2012/0145094 A1 | 6/2012 | Simard |
| 2012/0205059 A1 | 8/2012 | Senturk-Ozer et al. |
| 2012/0285445 A1 | 11/2012 | Kilambi et al. |
| 2012/0291774 A1 | 11/2012 | Kilambi et al. |
| 2013/0115358 A1 | 5/2013 | Seeley et al. |
| 2013/0172546 A1 | 7/2013 | Floyd et al. |
| 2013/0172547 A1 | 7/2013 | Floyd et al. |
| 2013/0239954 A1 | 9/2013 | Kilambi et al. |
| 2014/0014092 A1 | 1/2014 | Kazachkin et al. |
| 2014/0039144 A1 | 2/2014 | Simard et al. |
| 2014/0134219 A1 | 5/2014 | Bonner |
| 2014/0200335 A1 | 7/2014 | Olkowski et al. |
| 2014/0275501 A1 | 9/2014 | Capanema et al. |
| 2015/0176091 A1 | 6/2015 | Kazachkin et al. |
| 2015/0191499 A1 | 7/2015 | Floyd et al. |
| 2015/0191500 A1 | 7/2015 | Floyd et al. |
| 2015/0291786 A1* | 10/2015 | Sumnicht ............... D21H 17/36 524/45 |
| 2015/0320057 A1 | 11/2015 | Cha et al. |
| 2016/0108182 A1 | 4/2016 | Kilambi et al. |
| 2016/0244852 A1 | 8/2016 | Kilambi et al. |
| 2016/0319186 A1 | 11/2016 | Chopade et al. |
| 2017/0015822 A1* | 1/2017 | Nelson ................... D21H 17/72 |
| 2017/0275385 A1 | 9/2017 | Capanema et al. |
| 2018/0142071 A1* | 5/2018 | Ju ........................... C08K 7/02 |
| 2019/0008749 A1 | 1/2019 | Harris et al. |

FOREIGN PATENT DOCUMENTS

| | | | |
|---|---|---|---|
| CA | 2816250 | | 5/2012 |
| CA | 2962606 | | 3/2016 |
| CA | 3068830 | | 2/2024 |
| CN | 101395320 | | 3/2009 |
| CN | 101787398 | | 7/2010 |
| CN | 102388144 | | 3/2012 |
| CN | 104592753 A | * | 5/2015 |
| CN | 104817836 A | * | 8/2015 |
| CN | 106010155 A | * | 10/2016 |
| CN | 104592753 | | 3/2017 |
| CN | 107074981 | | 8/2017 |
| CN | 104411830 | | 3/2020 |
| EP | 0425477 | | 5/1991 |
| EP | 0537554 | | 4/1993 |
| EP | 1547170 | | 6/2005 |
| EP | 2042519 | | 4/2009 |
| EP | 2872643 | | 5/2015 |
| EP | 2949707 | | 12/2015 |
| EP | 3186286 | | 7/2017 |
| GB | 1003537 | | 9/1965 |
| IN | 51/2015 | | 12/2015 |
| JP | 2000-127152 | | 5/2000 |
| JP | 2001-262162 | | 9/2001 |
| JP | 2002-233400 | | 8/2002 |
| JP | 2003-213037 | | 7/2003 |
| JP | 2004-121055 | | 4/2004 |
| JP | 2006-136263 | | 6/2006 |
| JP | 2007163574 A | * | 6/2007 |
| JP | 2008-248202 | | 10/2008 |
| JP | 2010-531668 | | 9/2010 |
| JP | 2011-032388 | | 2/2011 |
| JP | 2012201767 A | * | 10/2012 |
| KR | 2015-0036368 | | 4/2015 |
| KR | 10-2571674 | | 8/2023 |
| MY | 168280 | | 10/2018 |
| NZ | 628964 | | 11/2016 |
| PH | 1-2015-500040 | | 8/2019 |
| RU | 2651509 | | 4/2019 |
| SG | 201400907.0 | | 8/2017 |
| WO | WO 1999/028350 | | 6/1999 |
| WO | WO 2009/003167 | | 12/2008 |
| WO | WO 2009086141 | | 7/2009 |
| WO | WO 2010/113129 | | 10/2010 |
| WO | WO 2011/091044 | | 7/2011 |
| WO | WO 2012/060767 | | 5/2012 |
| WO | WO 2012/106808 | | 8/2012 |
| WO | WO 2013/070160 | | 5/2013 |
| WO | WO-2013/101397 | | 7/2013 |
| WO | WO-2013/101402 | | 7/2013 |
| WO | WO-2013/101403 | | 7/2013 |
| WO | WO-2013/165308 | | 11/2013 |
| WO | WO 2014/012030 | | 1/2014 |
| WO | WO 2014/089170 | | 6/2014 |
| WO | WO 2014/144746 | | 9/2014 |
| WO | WO 2015/104459 | | 7/2015 |
| WO | WO-2015199482 A1 | * | 12/2015 |
| WO | WO-2016/049564 | | 3/2016 |
| WO | WO-2016/049567 | | 3/2016 |
| WO | WO-2016/049569 | | 3/2016 |
| WO | WO 2019/010336 | | 1/2019 |
| WO | WO 2019/195033 | | 10/2019 |
| ZA | 2015/00209 | | 10/2016 |

OTHER PUBLICATIONS

Avicel® RC-591—Microcrystalline Cellulose and Carboxymethylcellulose Sodium, NF, BP. Pharmaceutical Emulsions and Suspensions: Stabilization Technology for Liquid and Semi-Solid Dosage Forms. FMC International: FMC BioPolymer (1994) (20 pages).

Beaumont, M. et al., A Nanostructured Cellulose II Gel Consisting of Spherical Particles. ACS Sustainable Chem Eng. 2016; pp. 1-26 (27 pages).

Benavides, E.E.U., Cellulose Nanocrystals Properties and Applications in Renewable Nanocomposites. Doctoral Thesis. Graduate School of Clemson University: Chemical Engineering (2011) (197 pages).

Boussaid, et al. (2001) "Sugar recovery and fermentability of hemicellulose hydrolysates from steam-exploded softwoods containing bark," Biotechnol. Prog. 17: 887-892.

Buffiere, J., Cellulose Dissolution in Near- and Supercritical Water for Cello-Oligosaccharides Production. Master's Thesis. Aalto University School of Chemical Technology (2014) (95 pages).

Demirbas, et al. (2010) "Sub- and super-critical water depolymerization of biomass," Energy Sources, Part A: Recovery, Utilization, and Environmental Effects 32(12): 1100-1110.

DuPont, A.L., Cellulose in Lithium Chloride/N,N-dimethylacetamide, Optimization of a Dissolution Method Using Paper Substrates and Stability of the Solutions. Polymer. 2003; 44:4117-26.

Ehara, et al. (2002) "Characterization of the lignin-derived products from wood as treated in supercritical water," Journal of Wood Science 48(4): 320-325.

El Seoud, O.A. et al., Chemistry and Applications of Polysaccharide Solutions in Strong Electrolytes/Dipolar Aprotic Solvents: An Overview. Molecules. 2013; 18:1270-313.

Galkin, et al. (2005) "Subcritical and supercritical water: a universal medium for chemical reactions," Russian Chemical Reviews 7491: 21-35.

Graczyk, et al. (1990) "Explosion puling of lignocellulosic materials. Effect of steam explosion on plant raw materials and their constituents," Przelad Papierniczy, 46(12): 413-418.

Habibi, Y. et al., Cellulose Nanocrystals: Chemistry, Self-Assembly, and Applications. Chem Rev. 2010; 110(6): 3479-500.

Hennings, U. et al., Dissolution Behavior of Different Celluloses. Biomacromolecules. 2011; 12:871-9.

Jeoh (1998) "Steam Explosion Pretreatment of Cotton Gin Waste for Fuel Ethanol Produciton," Thesis submitted to the Faculty of the Virginia Polytechnic Institute and State University, Dec. 1998, pp. 1-153.

Li et al. (2014) "Preparation and characterization of cellulose nanofibers from partly mercerized cotton by mixed acid hydrolysis," Cellulose 21: 301-309.

Maache-Rezzoug, et al. (2009) "A thermomechanical pretreatment to improve enzymatic hydrolysis of wheat straw," Recents Progres en Genie des Procedes, Numero 98.

Masuelli, Mark-Houwink Parameters for Aqueous-Soluble Polymers and Biopolymers at Various Temperatures. J Polymer Biopolymer Physics Chem. 2014; 2(2):37-43.

(56) References Cited

OTHER PUBLICATIONS

Matsunga, M. et al., Chemical Conversion of Wood by Treatment in a Semi-Batch Reactor with Subcritical Water. J Supercritical Fluids. 2008; 44:364-9.
Newman, R.H. and T.C. Davidson, Molecular Conformations at the Cellulose-Water Interface. Cellulose. 2004; 11:23-32.
Pilla, et al. (2011) Handbook of bioplastics and biocomposites engineering applications, p. 465.
Potthast, A. et al., A Novel Method for the Determination of Carbonyl Groups in Cellulosics by Fluoresence labeling. 3. Monitoring Oxidative Processes. Biomacromolecules. 2003; 4:743-9.
Potthast, A. et al., Comparison Testing of Methods for Gel Permeation Chromatography of Cellulose: Coming Closer to a Standard Protocol. Cellulose. 2015; 22(3):1591-613.
Reier, G.E., Avicel® PH Microcrystalline Cellulose, NF, Ph Eur., JP, BP. Section 11. FMC International (2000) (27 pages).
Röhrling et al., A Novel Method for the Determination of Carbonyl Groups in Cellulosics by Fluorescence Labeling. 1. Method Development. Biomacromolecules. 2002; 3:959-68.
Röhrling et al., A Novel Method for the Determination of Carbonyl Groups in Cellulosics by Fluorescence Labeling. 2. Validation and Application. Biomacromolecules. 2002; 3:969-75.
Rosnah Abdullah, "Hydrothermal decomposition of various crystalline celluloses as treated by semitflow hottcompressed Water", Journal of Wood Science, vol. 60, pp. 278-286.
Sasaki, et al. (2000) "Dissolution and Hydrolysis of Cellulose in Subcritical and Supercritical Water," Industrial & Engineering Chemistry Research 39(8): 2883-2890.
Sasaki, et al. (2012) "Direct hydrolysis of cellulose to glucose using ultra-high temperature and pressure steam explosion," Carbohydrate Polymers 89: 298-301.
Sasaki, M. et al., Kinetics of Cellulose Conversion at 25 MPa in Sub- and Supercritical Water. Amer Inst Chem Eng. 2004; 50(1):192-202.
Sasaki, M. et al., Production of Cellulose II from Native Cellulose by Near- and Supercritical Water Solubilization. J Agric Food Chem. 2003; 51:5376-81.
Sasaki, M. et al., Rapid and Selective Conversion of Cellulose to Valuable Chemical Intermediates with Supercritical Water. Proc. 6th International Symposium on Supercritical Fluids. 2003; Tome 2:1417-22.
Savage, et al. (1995) "Reactions at supercritical conditions: applications and fundamentals," AIChE Journal 41(7): 1723-78.
Savage, et al. (1999) "Organic chemical reactions in supercritical water," Chemical Reviews (Washington, D.C.) 99(2): 603-621.
Segal, L. et al., An Empirical Method for Estimating the Degree of Crystallinity of Native Cellulose Using the X-Ray Diffractometer. Tex Res J. 1962; 29:786-94 (Abstract; 2 pages).
Terinte, N. et al., Overview on Native Cellulose and Microcrystalline Cellulose I Structure Studied by X-Ray Diffraction (WAXD): Comparison Between Measurement Techniques. Lenzinger Berichte. 2011; 89:118-31.
Tolonen, L.K et al., Supercritical Water Treatment for Cello-Oligosaccharide Production from Microcrystalline Cellulose. Carbohydr Res. 2015; 401:16-23.
Ververis, et al. (2004) "Fiber dimensions, ligins and cellulose content of various plant materials and their suitability for paper productions," Industrial crops and products 19: 245-254.
Veigel (2011) "Cellulose Nanofibrils as Filler for Adhevisves: Effect on Specific Fracture Energy of Solid Wood-Adhesive Bond," Cellulose, vol. 18, 5, pp. 1227-1237.
Wang, et al. (2009) "Influence of steaming explosion time on the physic-chemical properties of cellulose from Lespedeza stalks (Lespedeza crytobotrya)," Bioresource Technology 100: 5288-5294.
Wang, et al. (2009) "Influence of steaming time during steam-explosion on the chemical composition, crystallinity and enzymatic hydrolysis of Lespedez bicolor stalks," Beijing Linye Daxue Xuebao 31(5): 121-125.
Yu, Y. and H. Wu, Characteristics and Precipitation of Glucose Oligomers in the Fresh Liquid Products Obtained from the Hydrolysis of Cellulose in Hot-Compressed Water. Ind Eng Chem Res. 2009; 48:10682-90.
Yu, Y., Formation and Characteristics of Glucose Oligomers During the Hydrolysis of Cellulose in Hot-Compressed Water. Doctoral Thesis. Curtin University of Technology: Dept Chem Eng (2009) (192 pages).
Zhao, et al. (2008) "Supercritical Pretreatment and Hydrolyzation and Cellulose," Acta Chimica Sinica 66(20): 2295-2301.
Zhao, et al. (2009) "Supercritical hydrolysis of cellulose for oligosaccharide production in combined technology," Chemical Engineering Journal 150(2-3): 411-417.
Zoulikha, et al. (2009) "A thermomechanical pretreatment to improve enzymatic hydrolysis of wheat straw" Recents Progres en Genie des Procedes, Numero 98.
Zuckerstatter, G. et al., The Elucidation of Cellulose Supramolecular Structure by 13C CP-MAS NMR. Lenzinger Berichte. 2009; 87:38-46.
Sasaki, M., Adschiri, T. and Arai, K. (2004), Kinetics of cellulose conversion at 25 MPa in sub- and supercritical water. AIChE J., 50: 192-202. https://doi.org/10.1002/aic.10018.

* cited by examiner

US 12,428,529 B2

COMPOSITES CONTAINING CELLULOSE-BASED COMPOSITIONS

CROSS-REFERENCE TO RELATED APPLICATIONS

This Application is a continuation of Ser. No. 17/044,612 filed Oct. 1, 2020, which is a national stage filing under 35 U.S.C. § 371 of International Application No. PCT/US2019/024110, filed Mar. 26, 2019, which claims priority to U.S. Provisional Application No. 62/652,113, filed Apr. 3, 2018, the contents of which are expressly incorporated herein by reference in their entireties.

BACKGROUND OF THE INVENTION

Reinforced composites are composite materials that serve a range of industrial applications ranging from sports equipment to automotive components. Generally, these composite materials include a polymer in which a filler or additive has been dispersed. The filler is responsible for endowing the composite with desirable properties, such as stiffness or modulus, that are inherent in the filler itself. The reinforced plastics industry most commonly employs glass fibers as fillers. Glass fibers are, unfortunately, typically incorporated at exceedingly high levels, sometimes in excess of 50 vol %, in order to transfer a sufficient amount of modulus to the composite as a whole. Although there is a near-linear correlation between loading level and measured modulus, a theoretical maximum is not achieved. Specifically, the glass fiber does not contribute to the resulting modulus value as a function of inherent modulus value and the weight fraction. Thus, despite the extensive use of glass fibers in reinforced plastics, the development of thermoplastic composites having improved adhesion between the polymer and the filler has remained elusive. Thus, there remains a need for improved compositions and methods of making same.

SUMMARY

In one aspect, disclosed are methods for making compositions comprising polymers and a cellulose composition comprising particles, wherein the particles comprises cellulose. Also disclosed are methods for forming articles from the disclosed compositions and compositions and articles made from a disclosed process.

Disclosed are compositions comprising: (a) a polymer in an amount of from about 60 wt % to about 90 wt % of the composition; (b) a cellulose composition comprising particles, wherein the particles comprises cellulose, and wherein the cellulose composition is present in an amount of from about 0.01 wt % to about 5 wt % of the composition; and (c) a reinforcing filler in an amount of from about 5 wt % to about 50 wt % of the composition.

Also disclosed are compositions comprising: (a) a polymer in an amount of from about 30 wt % to about 60 wt % of the composition; (b) a cellulose composition comprising particles, wherein the particles comprises cellulose, and wherein the cellulose composition is present in an amount of from about 0.01 wt % to about 5 wt % of the composition; and (c) a reinforcing filler in an amount of from about 40 wt % to about 80 wt % of the composition.

Also disclosed are methods for making a masterbatch composition, the method comprising the step of combining: (a) a thermoplastic polymer in an amount of from about 60 wt % to about 95 wt % of the masterbatch composition; and (b) a cellulose composition comprising particles, wherein the particles comprises cellulose, and wherein the cellulose composition is present in an amount of from about 10 wt % to about 40 wt % of the composition, thereby making the masterbatch composition.

Also disclosed are masterbatch compositions prepared by a disclosed method.

Also disclosed are methods for making a composition, the method comprising the step of combining: (a) a polymer in an amount of from about 60 wt % to about 90 wt % of the composition; (b) a cellulose composition comprising particles, wherein the particles comprises cellulose, and wherein the cellulose composition is present in an amount of from about 0.01 wt % to about 5 wt % of the composition; and (c) a reinforcing filler in an amount of from about 5 wt % to about 50 wt % of the composition, thereby forming the composition.

Also disclosed are methods for making a composition, the method comprising the step of combining: (a) a polymer in an amount of from about 30 wt % to about 60 wt % of the composition; (b) a cellulose composition comprising particles, wherein the particles comprises cellulose, and wherein the cellulose composition is present in an amount of from about 0.01 wt % to about 5 wt % of the composition; and (c) a reinforcing filler in an amount of from about 40 wt % to about 80 wt % of the composition, thereby forming the composition.

Also disclosed are methods for making a composition, the method comprising the step of combining: (a) a masterbatch composition comprising a polymer and a cellulose composition comprising particles, wherein the particles comprise cellulose; and (b) a reinforcing filler, thereby forming the composition. In a further aspect, the composition is a thermoplastic composition.

Also disclosed are compositions prepared by a disclosed method.

Also disclosed are articles formed from a disclosed composition.

Also disclosed are articles prepared by a disclosed method.

Also disclosed are methods for drying a particle, the method comprising: (a) mixing the particle with a resuspending agent, wherein the resuspending agent is adsorbed or bonded to at least a portion of the surface of the particles, thereby forming a composition; and (b) drying the composition.

Additional advantages will be set forth in part in the description which follows, and in part will be obvious from the description, or can be learned by practice of the invention. The advantages will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying figures, which are incorporated in and constitute a part of this specification, illustrate several aspects and together with the description serve to explain the principles of the invention.

DETAILED DESCRIPTION

Figure 1:
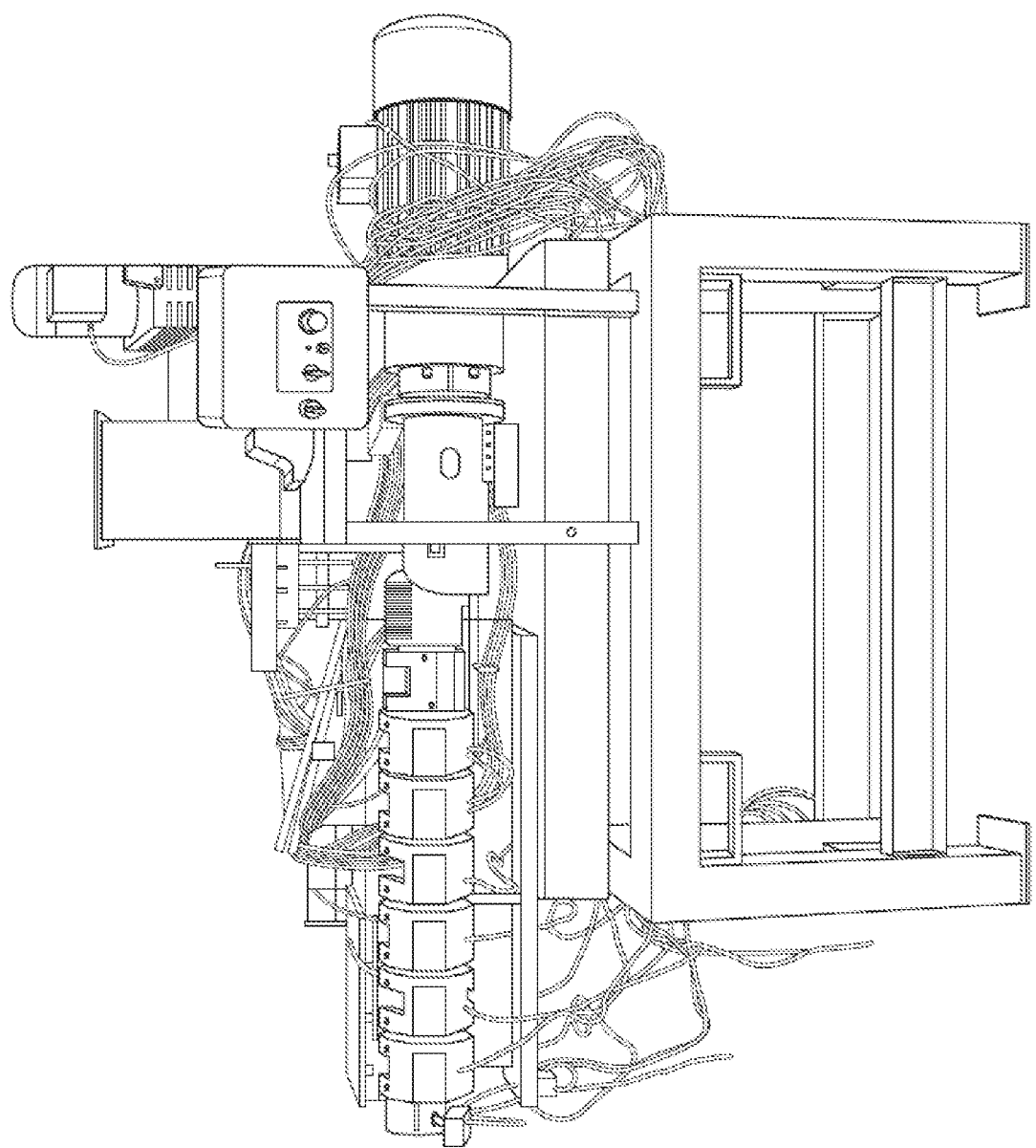
FIG. 1 shows a representative image of a Berstorff 25 mm ZE twin-screw extruder.

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein may be different from the actual publication dates, which can require independent confirmation.

A. Definitions

As used in the specification and the appended claims, the singular forms "a," "an" and "the" include plural referents unless the context clearly dictates otherwise. Thus, for example, reference to "a functional group," "an alkyl," or "a residue" includes mixtures of two or more such functional groups, alkyls, or residues, and the like.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

When disclosing numerical values herein, for example, 1, 2, 3, 4, 5, 6, 7, 8, 9, 10, the following sentence may follow such numerical values: "Each of the foregoing numbers can be preceded by the term 'about,' 'at least about,' or 'less than about,' and any of the foregoing numbers can be used singly to describe an open-ended range or in combination to describe a closed-ended range." This sentence means that each of the aforementioned numbers can be used alone (e.g., 4), can be prefaced with the word "about" (e.g., about 8), prefaced with the phrase "at least about" (e.g., at least about 2), prefaced with the phrase "less than about" (e.g., less than about 7), or used in any combination with or without any of the prefatory words or phrases to define a range (e.g., 2 to 9, about 1 to 4, 8 to about 9, about 1 to about 10, and so on). Moreover, when a range is described as "about X or less" (where X is a number), this phrase is the same as a range that is a combination of "about X" and "less than about X" in the alternative. For example, "about 10 or less" is the same as "about 10, or less than about 10." Such interchangeable range descriptions are contemplated herein. Other range formats may be disclosed herein, but the difference in formats should not be construed to imply that there is a difference in substance.

As used herein, the terms "optional" or "optionally" means that the subsequently described event or circumstance can or cannot occur, and that the description includes instances where said event or circumstance occurs and instances where it does not.

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —OCH$_2$CH$_2$O— units in the polyester, regardless of whether ethylene glycol was used to prepare the polyester. Similarly, a sebacic acid residue in a polyester refers to one or more —CO(CH$_2$)$_8$CO— moieties in the polyester, regardless of whether the residue is obtained by reacting sebacic acid or an ester thereof to obtain the polyester.

As used herein, the term "polymer" refers to a relatively high molecular weight organic compound, natural or synthetic, whose structure can be represented by a repeated small unit, the monomer (e.g., polyethylene, rubber). Synthetic polymers are typically formed by addition or condensation polymerization of monomers.

As used herein, the term "thermoplastic polymer" refers to a polymer that becomes more flexible and/or melts and flows when heated, and returns back to a solid state after it is cooled. Examples of thermoplastic polymers include, but are not limited to, natural and synthetic thermoplastic polymers such as, for example, polyolefins (such as polyethylene or polypropylene), polyesters, poly carbonates, styrene-acrylonitrile copolymers, polyethylene terephthalate, polybutylene terephthalate, polyamides, polystyrene, polystyrene derivatives, polyphenylene oxide, polyoxymethylene, fluorine-containing thermoplastics (such as polytetrafluoroethylene), polybenzimidazole, polyetherether ketone, polyetherimide, polylactic acid, polyether sulfone, polyacrylate, polyalkyl acrylate, polyvinylchloride, and blends thereof. The alkyl group in the polyalkyl acrylate can be any suitable alkyl group, including methyl, ethyl, isopropyl, n-propyl, isobutyl, n-butyl, t-butyl, pentyl, hexyl, and the like.

As used herein, the term "thermoset polymer" refers to a polymer that solidifies or sets irreversibly; thus a thermoset does not melt and flow when heated. Examples of thermoset polymers include, but are not limited to, natural and synthetic thermoset polymers such as, for example, urethane formaldehyde, phenol formaldehyde, melamine formaldehyde, unsaturated polyesters, epoxy based polyesters, elastomers such as rubber, and blends thereof.

As used herein, the term "copolymer" refers to a polymer formed from two or more different repeating units (monomer residues). By way of example and without limitation, a copolymer can be an alternating copolymer, a random copolymer, a block copolymer, or a graft copolymer. It is also contemplated that, in certain aspects, various block segments of a block copolymer can themselves comprise copolymers.

As used herein, the term "polymer blend" refers to a physical blend of at least two polymers and/or copolymers.

As used herein, the term "molecular weight" (MW) refers to the mass of one molecule of that substance, relative to the unified atomic mass unit u (equal to $1/12$ the mass of one atom of carbon-12).

As used herein, the term "biomass" means a renewable energy source generally comprising carbon-based biological material derived from living or recently-living organisms. In some embodiments, the biomass may serve as a feedstock and, as such, in appropriate context, the terms may be used interchangeably. Suitable feedstocks include lignocellulosic feedstock, cellulosic feedstock, hemicellulosic feedstock, starch-containing feedstocks, and the like. The lignocellulosic feedstock may be from any lignocellulosic biomass, such as plants (e.g., duckweed, annual fibers, etc.), trees (softwood, e.g., fir, pine, spruce, etc.; tropical wood, e.g., balsa, iroko, teak, etc.; or hardwood, e.g., elm, oak, aspen, pine, poplar, willow, eucalyptus, etc.), bushes, grass (e.g., miscanthus, switchgrass, rye, reed canary grass, giant reed, or sorghum), dedicated energy crops, municipal waste (e.g., municipal solid waste), and/or a by-product of an agricultural product (e.g., corn, sugarcane, sugar beets, pearl millet, grapes, rice, straw, cotton stalk). The biomass may be from a virgin source (e.g., a forest, woodland, or farm), or a by-product of a processed source (e.g., off-cuts, bark, and/or sawdust from a paper mill or saw mill, sugarcane bagasse, corn stover, palm oil industry residues, cotton linters, branches, leaves, roots, and/or hemp), and/or a residue of a primary use (i.e., a secondary use). Suitable feedstocks may also include the constituent parts of any of the aforementioned feedstocks, including, without limitation, lignin, C6 saccharides (including cellulose, C6 oligosaccharides, and C6 monosaccharides), C5 saccharides (including hemicellulose, C5 oligosaccharides, and C5 monosaccharides), and mixtures thereof. Suitable feedstocks can also include fractionated biomass, in which at least a portion of the original components has been removed (e.g., fractionated biomass in which at least a portion, some, most, or all of originally present hemicellulose has been removed, e.g., 30, 35, 40, 45, 50, 55, 60, 65, 70, 75, 80, 85, 90, 95, or 99 wt. % of the hemicellulose originally present has been removed (each of the foregoing numbers can be preceded by the word "about," "at least about," or "less than about," and any of the foregoing numbers can be used singly to describe an open-ended range or in combination to describe a close-ended range)). Suitable feedstocks can also include unfractionated biomass, in which the at least a portion, some, most, or all of the hemicellulose present in the biomass has not been removed.

The feed material for the hydrolysis reaction need not be a lignocellulosic biomass, and may not be a biomass at all; any cellulose-containing feed material may be suitable for the hydrolysis process to produce the disclosed particles comprising cellulose including relatively pure sources of cellulose, such as, for example, microcrystalline cellulose (MCC), nanocrystalline cellulose (NCC), cotton, pulp, wood pulp, dissolving wood pulp, fresh and recycled paper, a cellulose fraction isolated from lignocellulosic biomass, and the like.

As used herein, the terms "microcrystalline cellulose" and "MCC" are used interchangeably and refer to a non-fibrous form of cellulose in which the cell wall of the fibers have been broken into fragments ranging in size from a few hundred microns to a few tenths of a micron in length. Such microcrystalline cellulose includes, but is not limited to, AVICEL® products available from FMC BioPolymer, Philadelphia, PA, USA and Microcrystalline Cellulose 102 available from Blackburn Distributions, Nelson, Lancashire, UK.

As used herein, the term "nanocellulose" or "nanocrystalline cellulose" (NCC) refers to a collection of isolated cellulose microfibrils or microfibril bundles derived from cellulose raw material. Microfibrils typically have high aspect ratio: the length might exceed two, five, or ten micrometers while the number-average diameter is typically below 200 nm. The diameter of microfibril bundles can also be larger but generally less than 1 µm. The smallest microfibrils are similar to the so called elementary fibrils, which are typically 2-12 nm in diameter. Without wishing to be bound by theory, the dimensions of the fibrils or fibril bundles are dependent on the raw material and a disintegration method. The nanocrystalline cellulose may also contain some hemicelluloses, although the amount may be dependent on the plant source.

As used herein, "aspect ratio" refers to the ratio of the largest dimension of a particle to the smallest (e.g. length/diameter for a cylinder; length/thickness for a plate; longest axis/shortest axis for an ellipsoid).

As used herein, the term "unconverted type-I cellulose" refers to a type-I cellulose that that has not been converted to a type-II cellulose when a feedstock as defined herein and having type-I cellulose is contacted with a fluid, for example a fluid comprising water, wherein the fluid (for example, water) is subcritical, near-critical, or supercritical.

A supercritical fluid is a fluid at a temperature above its critical temperature and at a pressure above its critical pressure. A supercritical fluid exists at or above its "critical point," the point of highest temperature and pressure at which the liquid and vapor (gas) phases can exist in equilibrium with one another. At or above critical pressure and critical temperature, the distinction between liquid and gas phases disappears. A supercritical fluid possesses approximately the penetration properties of a gas simultaneously with the solvent properties of a liquid. Accordingly, supercritical fluid extraction has the benefit of high penetrability and good solvation.

Reported critical temperatures and pressures include: for pure water, a critical temperature of about 374.2° C., and a critical pressure of about 221 bar; for carbon dioxide, a critical temperature of about 31° C. and a critical pressure of about 72.9 atmospheres (about 1072 psig). Near-critical water has a temperature at or above about 300° C. and below the critical temperature of water (374.2° C.), and a pressure high enough to ensure that at least a portion of (e.g., all of) the fluid is in the liquid phase. Sub-critical water has a temperature of less than about 300° C. and a pressure high enough to ensure that at least a portion of (e.g., all of) the fluid is in the liquid phase. Sub-critical water temperature may be greater than about 250° C. and less than about 300° C., and in many instances sub-critical water has a temperature between about 250° C. and about 280° C. The term "hot compressed water" is defined herein as near-critical or sub-critical water, or at any temperature at least about 100° C. (preferably, at least about 100° C., at least about 150° C., at least about 200° C., at least about 250° C., at least about 300° C., or at least about 350° C.) but less than supercritical (e.g., less than about 374° C.), and at pressures such that at least a portion of the water (e.g., all of the water) is in a liquid state.

As used herein, a fluid which is "supercritical" (e.g., supercritical water, supercritical $CO_2$, etc.) indicates a fluid which would be supercritical if present in pure form under a given set of temperature and pressure conditions. For example, "supercritical water" indicates water present at a temperature of at least about 374.2° C. and a pressure of at least about 221 bar, whether the water is pure water, or present as a mixture (e.g., water and ethanol, water and $CO_2$, etc.). Thus, for example, "a mixture of sub-critical water and supercritical carbon dioxide" indicates a mixture of water and carbon dioxide at a temperature and pressure above that of the critical point for carbon dioxide but below the critical point for water, regardless of whether any supercritical phase contains water and regardless of whether the water phase contains any carbon dioxide. For example, a mixture of sub-critical water and supercritical $CO_2$ may have a temperature of about 250° C. to about 280° C. and a pressure of at least about 225 bar.

As used herein, the term "resuspending agent" is an additive that enables a substance to be "resuspendable" as defined above, which substance would otherwise not meet such definition of "resuspendable" without the addition of the resuspending agent.

As used herein, the term "degree of polymerization" (DP) is defined as the number of monomeric units in a macromolecule or polymer or oligomer. For example and without limitation, the number-average degree of polymerization is given by:

$$DP_n = X_n = \frac{M_n}{M_0}$$

where $M_n$ is the number-average molecular weight and $M_0$ is the molecular weight of the monomer unit. For cellulose, the monomer unit is the anhydroglucose unit (glucose minus the equivalent of one water molecule, 162 g/mol).

As used herein, "oligosaccharide" refers to linear or branched carbohydrate molecules of the same or different monosaccharide units joined together by glycosidic bonds having the general formula of $C_x(H_2O)_y$. Oligosaccharides may be thought of as shorter chain polysaccharides, i.e., polysaccharides simply having less monomeric residues in the polymeric chain. When an oligosaccharide contains $C_6$ monosaccharide residues, the general formula may be represented as $(C_6H_{10}O_5)_n$, where n is about 2 to about 15 (i.e., the number of hexose monomers in the oligosaccharide). As used herein, an oligomer (e.g., cello-oligosaccharide) has a DP in the range of 2 to about 15, whereas a polymer (e.g., cellulose) has a DP of at least about 16. As used herein, the term "glucooligosaccharide" ("GOS") or "precipitated glucooligosaccharide" ("PGOS") may additionally comprise a monosaccharide as a minor component.

As used herein, "monosaccharide" refers to any of the class of sugars that cannot be hydrolyzed to give a simpler sugar. Monosaccharides typically are $C_5$ (e.g., xylose) and $C_6$ sugars (e.g., glucose), but may also include monosaccharides having other numbers of carbon, such as $C_3$, $C_4$, $C_7$, $C_8$, and so on. Expressed another way, monosaccharides are the simplest building blocks of oligosaccharides and polysaccharides. Monosaccharides of cellulose are predominantly $C_6$ saccharides (e.g., glucose).

As used herein, the phrases "particles comprising cellulose" and "cellulose particles" are used interchangeably and refer to the same thing, namely, particles that comprise cellulose.

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers such as Aldrich Chemical Co., (Milwaukee, Wis.), Acros Organics (Morris Plains, N.J.), Fisher Scientific (Pittsburgh, Pa.), or Sigma (St. Louis, Mo.) or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplemental volumes (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

B. Methods for Making Compositions

In one aspect, disclosed are methods for making a composition, the method comprising the step of combining: (a) a polymer in an amount of from about 60 wt % to about 90 wt % of the composition; (b) a cellulose composition comprising particles, wherein the particles comprises cellulose, and wherein the cellulose composition is present in an amount of from about 0.01 wt % to about 5 wt % of the composition; and (c) a reinforcing filler in an amount of from about 5 wt % to about 50 wt % of the composition, thereby forming the composition. In a further aspect, the composition is a thermoplastic composition.

In one aspect, disclosed are methods for making a composition, the method comprising the step of combining: (a) a polymer in an amount of from about 30 wt % to about 60 wt % of the composition; (b) a cellulose composition comprising particles, wherein the particles comprises cellulose, and wherein the cellulose composition is present in an amount of from about 0.01 wt % to about 5 wt % of the composition; and (c) a reinforcing filler in an amount of from about 40 wt % to about 80 wt % of the composition, thereby forming the composition.

In one aspect, disclosed are methods for making a thermoplastic composition, the method comprising the step of combining: (a) a masterbatch composition comprising a thermoplastic polymer and a cellulose composition comprising particles, wherein the particles comprises cellulose; and (b) a reinforcing filler, thereby forming the composition.

In a further aspect, the masterbatch composition is present in an amount of from about 2 wt % to about 15 wt % of the thermoplastic composition. In a still further aspect, the masterbatch thermoplastic composition is present in an amount of from about 2 wt % to about 12 wt % of the thermoplastic composition. In yet a further aspect, the masterbatch composition is present in an amount of from about 2 wt % to about 10 wt % of the thermoplastic composition. In an even further aspect, the masterbatch composition is present in an amount of from about 2 wt % to about 8 wt % of the thermoplastic composition. In a still further aspect, the masterbatch composition is present in an amount of from about 2 wt % to about 5 wt % of the thermoplastic composition. In yet a further aspect, the masterbatch composition is present in an amount of from about 5 wt % to about 15 wt % of the thermoplastic composition. In an even further aspect, the masterbatch composition is present in an amount of from about 8 wt % to about 15 wt % of the thermoplastic composition. In a still further aspect, the masterbatch composition is present in an amount of from about 12 wt % to about 15 wt % of the thermoplastic composition. In yet a further aspect, the masterbatch composition is present in an amount of from about 2.5 wt % to about 10 wt % of the thermoplastic composition. Each of the foregoing numbers can be preceded by the term "about," "at least about," or "less than about," and any of the foregoing numbers can be used singly to describe an open-ended range or in combination to describe a closed-ended range.

In a further aspect, the polymer is a thermoplastic polymer. Examples of thermoplastic polymers include, but are not limited to, natural and synthetic thermoplastic polymers such as, for example, polyolefins, polyesters, polycarbonates, styrene-acrylonitrile copolymers, polyethylene terephthalate, polybutylene terephthalate, polyamides, polystyrene, polystyrene derivatives, polyphenylene oxide, polyoxymethylene, fluorine-containing thermoplastics, and blends thereof. In a further aspect, the thermoplastic polymer is shaped in a pellet. Suitable thermoplastics are also described elsewhere herein.

In a further aspect, the polymer is a thermoset polymer. Examples of thermoset polymers include, but are not limited to, natural and synthetic thermoset polymers such as, for example, urethane formaldehyde, phenol formaldehyde, melamine formaldehyde, unsaturated polyesters, epoxy based polyesters, elastomers such as rubber, and blends thereof.

In a further aspect, the polymer is a polyamide (PA) or a polyester or both. In a still further aspect, the polymer is a polyamide. Examples of polyamides include, but are not limited to, PA6, PA4/6, PA6/6, PA6/10, PA6/12, PA11, and PA12. In an even further aspect, the polyamide is PA6.

In a further aspect, the polymer is a polyester. Examples of polyesters include, but are not limited to, polybutylene terephthalate (PBT), polyethylene terephthalate (PET), polyethylene isophthalate (PEI), PET/PEI copolymer, polyarylate (PAR), polybutylene naphthalate (PBN), liquid crystal polyesters, polybutylene terephthalate/tetraethylene glycol copolymer, and polyoxyalkylenediimide diacid/polybutylene terephthalate copolymer.

In a further aspect, the thermoplastic polymer is present in an amount of from about 60 wt % to about 99 wt % of the masterbatch composition. In a still further aspect, the thermoplastic polymer is present in an amount of from about 60 wt % to about 90 wt % of the masterbatch composition. In yet a further aspect, the thermoplastic polymer is present in an amount of from about 65 wt % to about 99 wt % of the masterbatch composition. In an even further aspect, the thermoplastic polymer is present in an amount of from about 70 wt % to about 99 wt % of the masterbatch composition. In a further aspect, the thermoplastic polymer is present in an amount of from about 70 wt % to about 90 wt % of the masterbatch composition. In a still further aspect, the thermoplastic polymer is present in an amount of from about 70 wt % to about 85 wt % of the masterbatch composition. In yet a further aspect, the thermoplastic polymer is present in an amount of from about 70 wt % to about 80 wt % of the masterbatch composition. In an even further aspect, the thermoplastic polymer is present in an amount of from about 70 wt % to about 75 wt % of the masterbatch composition. In a still further aspect, the thermoplastic polymer is present in an amount of from about 75 wt % to about 90 wt % of the masterbatch composition. In yet a further aspect, the thermoplastic polymer is present in an amount of from about 80 wt % to about 90 wt % of the masterbatch composition. In an even further aspect, the thermoplastic polymer is present in an amount of from about 85 wt % to about 90 wt % of the masterbatch composition. In a still further aspect, the thermoplastic polymer is present in an amount of from about 75 wt % to about 85 wt % of the masterbatch composition. In yet a further aspect, the thermoplastic polymer is present in an amount of about 80 wt % of the masterbatch composition. Each of the foregoing numbers can be preceded by the term "about," "at least about," or "less than about," and any of the foregoing numbers can be used singly to describe an open-ended range or in combination to describe a closed-ended range.

In a further aspect, the polymer is present in an amount of from about 60 wt % to about 99 wt % of the composition. In a still further aspect, the polymer is present in an amount of from about 60 wt % to about 95 wt % of the composition.

In yet a further aspect, the polymer is present in an amount of from about 65 wt % to about 99 wt % of the composition. In an even further aspect, the polymer is present in an amount of from about 70 wt % to about 99 wt % of the composition. In a further aspect, the polymer is present in an amount of about 70 wt % to about 85 wt % of the composition. In a still further aspect, the polymer is present in an amount of about 70 wt % to about 80 wt % of the composition. In yet a further aspect, the polymer is present in an amount of about 70 wt % to about 75 wt % of the composition. In an even further aspect, the polymer is present in an amount of about 75 wt % to about 90 wt % of the composition. In a still further aspect, the polymer is present in an amount of about 80 wt % to about 90 wt % of the composition. In yet a further aspect, the polymer is present in an amount of about 85 wt % to about 90 wt % of the composition. Each of the foregoing numbers can be preceded by the term "about," "at least about," or "less than about," and any of the foregoing numbers can be used singly to describe an open-ended range or in combination to describe a closed-ended range.

In a further aspect, the polymer is present in an amount of from about 30 wt % to about 60 wt % of the composition. In a still further aspect, the polymer is present in an amount of from about 30 wt % to about 50 wt % of the composition. In yet a further aspect, the polymer is present in an amount of from about 30 wt % to about 40 wt % of the composition. In an even further aspect, the polymer is present in an amount of from about 40 wt % to about 60 wt % of the composition. In a still further aspect, the polymer is present in an amount of from about 50 wt % to about 60 wt % of the composition. Each of the foregoing numbers can be preceded by the term "about," "at least about," or "less than about," and any of the foregoing numbers can be used singly to describe an open-ended range or in combination to describe a closed-ended range.

In a further aspect, the cellulose composition is a crystalline cellulose. In a still further aspect, the crystalline cellulose is a microcrystalline cellulose (MCC). In yet a further aspect, the crystalline cellulose is a nanocrystalline cellulose (NCC). The particle sizes (e.g., $d_{50}$, $d_{75}$, etc.) disclosed herein for the "cellulose particles" can also be used to describe the particle sizes of MCC or NCC.

In a further aspect, the cellulose composition comprises particles, wherein the particles comprises cellulose, have a $d_{75}$ of less than about 8 microns, have a $d_{50}$ of about 0.5 microns to about 5 microns, have an aspect ratio of about 1 to about 1.5, and have a non-spherical shape, wherein at least a portion of the cellulose is type-II cellulose.

In a further aspect, the cellulose composition is dried prior to the combining step. Without wishing to be bound by theory, the cellulose composition can be dried by any method known to one of skill in the art. Preferably, the drying should be done in such a manner that the particles of the cellulose composition are not allowed to agglomerate. Thus, in a still further aspect, dried is via freeze drying, lyophilization, spray drying, nano spray drying, fumed silica drying, supercritical carbon dioxide drying, supercritical anti-solvent drying, clay drying, oven drying, evaporation, vacuum, or a mixture thereof.

In a further aspect, the cellulose composition is present in an amount of from about 1 wt % to about 40 wt % of the masterbatch composition. In a still further aspect, the cellulose composition is present in an amount of from about 1 wt % to about 30 wt % of the masterbatch composition. In yet a further aspect, the cellulose composition is present in an amount of from about 5 wt % to about 40 wt % of the masterbatch composition. In a further aspect, the cellulose composition is present in an amount of from about 5 wt % to about 30 wt % of the masterbatch composition. In a still further aspect, the cellulose composition is present in an amount of from about 5 wt % to about 25 wt % of the masterbatch composition. In yet a further aspect, the cellulose composition is present in an amount of from about 5 wt % to about 20 wt % of the masterbatch composition. In an even further aspect, the cellulose composition is present in an amount of from about 5 wt % to about 15 wt % of the masterbatch composition. In a still further aspect, the cellulose composition is present in an amount of from about 5 wt % to about 10 wt % of the masterbatch composition. In yet a further aspect, the cellulose composition is present in an amount of from about 10 wt % to about 30 wt % of the masterbatch composition. In an even further aspect, the cellulose composition is present in an amount of from about 15 wt % to about 30 wt % of the masterbatch composition. In a still further aspect, the cellulose composition is present in an amount of from about 20 wt % to about 30 wt % of the masterbatch composition. In yet a further aspect, the cellulose composition is present in an amount of from about 25 wt % to about 30 wt % of the masterbatch composition. In an even further aspect, the cellulose composition is present in an amount of from about 5 wt % to about 30 wt % of the masterbatch composition. In a still further aspect, the cellulose composition is present in an amount of from about 10 wt % to about 25 wt % of the masterbatch composition. In yet a further aspect, the cellulose composition is present in an amount of from about 15 wt % to about 25 wt % of the masterbatch composition. In an even further aspect, the cellulose composition is present in an amount of about 10 wt % of the masterbatch composition. In a still further aspect, the cellulose composition is present in an amount of about 20 wt % of the masterbatch composition. Each of the foregoing numbers can be preceded by the term "about," "at least about," or "less than about," and any of the foregoing numbers can be used singly to describe an open-ended range or in combination to describe a closed-ended range.

In a further aspect, the cellulose composition is present in an amount of from about 0.01 wt % to about 5 wt % of the composition. In a still further aspect, the cellulose composition is present in an amount of from about 0.01 wt % to about 2.5 wt % of the composition. In yet a further aspect, the cellulose composition is present in an amount of from about 0.1 wt % to about 5 wt % of the composition. In a further aspect, the cellulose composition is present in an amount of from about 0.1 wt % to about 2.5 wt % of the composition. In a still further aspect, the cellulose composition is present in an amount of from about 0.1 wt % to about 2.0 wt % of the composition. In yet a further aspect, the cellulose composition is present in an amount of from about 0.1 wt % to about 1.5 wt % of the composition. In an even further aspect, the cellulose composition is present in an amount of from about 0.1 wt % to about 1.0 wt % of the composition. In a still further aspect, the cellulose composition is present in an amount of from about 0.1 wt % to about 0.5 wt % of the composition. In yet a further aspect, the cellulose composition is present in an amount of from about 0.5 wt % to about 2.5 wt % of the composition. In an even further aspect, the cellulose composition is present in an amount of from about 1.0 wt % to about 2.5 wt % of the composition. In a still further aspect, the cellulose composition is present in an amount of from about 1.5 wt % to about 2.5 wt % of the composition. In yet a further aspect, the cellulose composition is present in an amount of from about 2.0 wt % to about 2.5 wt % of the composition. Each of the foregoing numbers can be preceded by the term "about," "at least about," or "less than about," and any of the foregoing numbers can be used singly to describe an open-ended range or in combination to describe a closed-ended range.

In a further aspect, the cellulose composition is present in an amount of from about 0.5 wt % to about 2.0 wt % of the composition. In a still further aspect, the cellulose composition is present in an amount of from about 0.5 wt % to about 1.5 wt % of the composition. In yet a further aspect, the cellulose composition is present in an amount of from about 0.5 wt % to about 1.0 wt % of the composition. In an even further aspect, the cellulose composition is present in an amount of from about 1.0 wt % to about 2.5 wt % of the composition. In a still further aspect, the cellulose composition is present in an amount of from about 1.5 wt % to about 2.5 wt % of the composition. In yet a further aspect, the cellulose composition is present in an amount of from about 2.0 wt % to about 2.5 wt % of the composition. Each of the foregoing numbers can be preceded by the term "about," "at least about," or "less than about," and any of the foregoing numbers can be used singly to describe an open-ended range or in combination to describe a closed-ended range.

In a further aspect, the reinforcing filler is selected from a glass fiber, a mineral filler, a carbon fiber, an aramide filler, a polymer filler, and any combination thereof. In a still further aspect, the reinforcing filler is selected from glass beads, glass fiber, glass flakes, mica, talc, clay, wollastonite, zinc sulfide, zinc oxide, carbon fiber, ceramic-coated graphite, and titanium dioxide.

In a further aspect, the reinforcing fiber is a glass fiber. Examples of glass fibers include, but are not limited to, E-glass and S-glass. E-glass is a low alkali, aluminum-borosilicate composition with excellent electrical properties and good strength and modulus. S-glass is a magnesium-aluminosilicate composition with considerably higher strength and modulus. In a still further aspect, the glass fiber is E-glass. In yet a further aspect, the glass fiber is a chopped strand. In an even further aspect, the glass fiber is a continuous fiber product.

In a further aspect, the reinforcing fiber is a mineral filler. Examples of mineral fillers include, but are not limited to, barytes, barium sulfate, asbestos, barite, diatomite, feldspar, gypsum, hormite, kaolin, mica, nepheline syenite, perlite, phyrophyllite, smectite, talc, vermiculite, zeolite, calcite, calcium carbonate, wollastonite, calcium metasilicate, clay, aluminum silicate, talc, magnesium aluminum silicate, hydrated alumina, hydrated aluminum oxide, silica, silicon dioxide, and titanium dioxide, or mixtures thereof.

In a further aspect, the reinforcing fiber is a carbon fiber. Examples of carbon fibers include, but are not limited to, T300, T300J, T400H, T600S, T700S, T700 G and AS4, which can have diameters ranging from 1 to 10 microns, and IM6, which can have diameters that are approximately 5 microns. Commercially available carbon fibers are provided by, for example, Toray Carbon Fibers North America (Decatur, Ala., USA).

In some aspects, the reinforcing filler has any suitable aspect ratio. The aspect ratio can be 5, 10, 15, 20, 25, 30, 35, 40, 45, 50, 55, 60, 65, 70, 75, 80, 85, 90, 95, 100, 110, 120, 130, 140, 150, 160, 170, 180, 190, 200, 220, 240, 260, 280, 300, 320, 340, 360, 380, 400, 420, 440, 460, 480, 500, 520, 540, 560, 580, 600, 625, 650, 675, 700, 750, 800, 850, 900, 950, or 1000. Each of the foregoing numbers can be preceded by the term "about," "at least about," or "less than about," and any of the foregoing numbers can be used singly to describe an open-ended range or in combination to describe a closed-ended range.

In a further aspect, the reinforcing filler is present in an amount of from about 1 wt % to about 50 wt % of the composition. In a still further aspect, the reinforcing filler is present in an amount of from about 1 wt % to about 40 wt % of the composition. In yet a further aspect, the reinforcing filler is present in an amount of from about 10 wt % to about 50 wt % of the composition. In a further aspect, the reinforcing filler is present in an amount of from about 10 wt % to about 40 wt % of the composition. In a further aspect, the reinforcing filler is present in an amount of from about 10 wt % to about 35 wt % of the composition. In a still further aspect, the reinforcing filler is present in an amount of from about 10 wt % to about 30 wt % of the composition. In yet a further aspect, the reinforcing filler is present in an amount of from about 10 wt % to about 25 wt % of the composition. In an even further aspect, the reinforcing filler is present in an amount of from about 10 wt % to about 20 wt % of the composition. In a still further aspect, the reinforcing filler is present in an amount of from about 10 wt % to about 15 wt % of the composition. In yet a further aspect, the reinforcing filler is present in an amount of from about 15 wt % to about 40 wt % of the composition. In an even further aspect, the reinforcing filler is present in an amount of from about 20 wt % to about 40 wt % of the composition. In a still further aspect, the reinforcing filler is present in an amount of from about 25 wt % to about 40 wt % of the composition. In yet a further aspect, the reinforcing filler is present in an amount of from about 30 wt % to about 40 wt % of the composition. In an even further aspect, the reinforcing filler is present in an amount of from about 35 wt % to about 40 wt % of the composition. In a still further aspect, the reinforcing filler is present in an amount of from about 15 wt % to about 35 wt % of the composition. In yet a further aspect, the reinforcing filler is present in an amount of from about 15 wt % to about 30 wt % of the composition. Each of the foregoing numbers can be preceded by the term "about," "at least about," or "less than about," and any of the foregoing numbers can be used singly to describe an open-ended range or in combination to describe a closed-ended range.

In a further aspect, the reinforcing filler is present in an amount of from about 40 wt % to about 80 wt % of the composition. In a still further aspect, the reinforcing filler is present in an amount of from about 40 wt % to about 70 wt % of the composition. In yet a further aspect, the reinforcing filler is present in an amount of from about 40 wt % to about 60 wt % of the composition. In an even further aspect, the reinforcing filler is present in an amount of from about 40 wt % to about 50 wt % of the composition. In a still further aspect, the reinforcing filler is present in an amount of from about 50 wt % to about 80 wt % of the composition. In yet a further aspect, the reinforcing filler is present in an amount of from about 60 wt % to about 80 wt % of the composition. In an even further aspect, the reinforcing filler is present in an amount of from about 70 wt % to about 80 wt % of the composition. In a still further aspect, the reinforcing filler is present in an amount of about 60 wt % of the composition. Each of the foregoing numbers can be preceded by the term "about," "at least about," or "less than about," and any of the foregoing numbers can be used singly to describe an open-ended range or in combination to describe a closed-ended range.

In a further aspect, the method further comprises the step of combining a clay. Examples of clay include, but are not limited to, natural clay or synthetic clay, mica, vermiculite, montmorillonite, iron montmorillonite, beidellite, saponite, hectorite, stevensite, and nontronite, or a mixture thereof. In a still further aspect, the clay is hydrophobic. In yet a further aspect, the clay is hectorite.

In a further aspect, the clay is pre-mixed with the cellulose composition. In yet a further aspect, the clay is homogenously mixed with the cellulose composition. In an even further aspect, the cellulose composition and the clay are homogenously mixed prior to combining with the polymer.

In a further aspect, the clay is present in an amount of from about 0.05 wt % to about 1.0 wt % of the composition. In a still further aspect, the clay is present in an amount of from about 0.1 wt % to about 1.0 wt % of the composition. In yet a further aspect, the clay is present in an amount of from about 0.5 wt % to about 1.0 wt % of the composition. In an even further aspect, the clay is present in an amount of from about 0.05 wt % to about 0.5 wt % of the composition. In a still further aspect, the clay is present in an amount of from about 0.05 wt % to about 0.1 wt % of the composition. In yet a further aspect, the clay is present in an amount of from about 0.05 wt % to about 0.5 wt % of the composition. In an even further aspect, the clay is present in an amount of from about 0.05 wt % to about 0.1 wt % of the composition. In a still further aspect, the clay is present in an amount of from about 0.1 wt % to about 0.6 wt % of the composition. Each of the foregoing numbers can be preceded by the term "about," "at least about," or "less than about," and any of the foregoing numbers can be used singly to describe an open-ended range or in combination to describe a closed-ended range.

In a further aspect, the masterbatch composition further comprises a clay.

In a further aspect, the clay is present in an amount of from about 5 wt % to about 15 wt % of the masterbatch composition. In a still further aspect, the clay is present in an amount of from about 5 wt % to about 10 wt % of the masterbatch composition. In yet a further aspect, the clay is present in an amount of from about 10 wt % to about 15 wt % of the masterbatch composition. In an even further aspect, the clay is present in an amount of about 10 wt % of the masterbatch composition. Each of the foregoing numbers can be preceded by the term "about," "at least about," or "less than about," and any of the foregoing numbers can be used singly to describe an open-ended range or in combination to describe a closed-ended range.

In a further aspect, the method further comprises the step of combining a compatibilizer. Examples of compatibilizers include, but are not limited to, polyethylene, ethylene vinyl acetate, maleic anhydride, citric acid, and ethylene methyl acrylate.

In a further aspect, the compatibilizer is present in an amount of from about 0.01 wt % to about 10 wt % of the composition. In a still further aspect, the compatibilizer is present in an amount of from about 0.01 wt % to about 5 wt % of the composition. In yet a further aspect, the compatibilizer is present in an amount of from about 0.01 wt % to about 1 wt % of the composition. In an even further aspect, the compatibilizer is present in an amount of from about 0.01 wt % to about 0.5 wt % of the composition. In a still further aspect, the compatibilizer is present in an amount of from about 0.01 wt % to about 0.1 wt % of the composition. In yet a further aspect, the compatibilizer is present in an amount of from about 0.1 wt % to about 10 wt % of the composition. In an even further aspect, the compatibilizer is present in an amount of from about 0.5 wt % to about 10 wt % of the composition. In yet a further aspect, the compatibilizer is present in an amount of from about 1 wt % to about 10 wt % of the composition. In an even further aspect, the compatibilizer is present in an amount of from about 5 wt % to about 10 wt % of the composition. Each of the foregoing numbers can be preceded by the term "about," "at least about," or "less than about," and any of the foregoing numbers can be used singly to describe an open-ended range or in combination to describe a closed-ended range.

In a further aspect, the method further comprises the step of forming the composition into an article. In a still further aspect, forming is via injection molding, stretch blow molding, extrusion, thermoforming, or extrusion blow molding. In yet a further aspect, forming is via sheet or film extrusion. In an even further aspect, the article is shaped as a body part for a vehicle.

C. Methods for Making Masterbatch Compositions

In one aspect, disclosed are methods for making a masterbatch composition, the method comprising the step of combining: (a) a thermoplastic polymer in an amount of from about 60 wt % to about 95 wt % of the masterbatch composition; and (b) a cellulose composition comprising particles, wherein the particles comprises cellulose, and wherein the cellulose composition is present in an amount of from about 1 wt % to about 40 wt % of the masterbatch composition, thereby forming the masterbatch composition.

In a further aspect, the polymer is a thermoplastic polymer. Examples of thermoplastic polymers include, but are not limited to, natural and synthetic thermoplastic polymers such as, for example, polyolefins, polyesters, polycarbonates, styrene-acrylonitrile copolymers, polyethylene terephthalate, polybutylene terephthalate, polyamides, polystyrene, polystyrene derivatives, polyphenylene oxide, polyoxymethylene, fluorine-containing thermoplastics, or blends thereof. In a further aspect, the thermoplastic polymer is shaped in a pellet. Suitable thermoplastics are also described elsewhere herein.

In a further aspect, the polymer is a polyamide (PA) or a polyester or both. In a still further aspect, the polymer is a polyamide. Examples of polyamides include, but are not limited to, PA6, PA46, PA66, PA610, PA612, PA11, and PA12. In an even further aspect, the polyamide is PA6. Any combination of polyamides can be employed.

In a further aspect, the polymer is a polyester. Examples of polyesters include, but are not limited to, polybutylene terephthalate (PBT), polyethylene terephthalate (PET), polyethylene isophthalate (PEI), PET/PEI copolymer, polyarylate (PAR), polybutylene naphthalate (PBN), liquid crystal polyesters, polybutylene terephthalate/tetraethylene glycol copolymer, polyoxyalkylenediimide diacid/polybutylene terephthalate copolymer, or any combination thereof.

In a further aspect, the polymer is present in an amount of from about 60 wt % to about 99 wt % of the masterbatch composition. In a still further aspect, the polymer is present in an amount of from about 60 wt % to about 95 wt % of the masterbatch composition. In yet a further aspect, the polymer is present in an amount of from about 65 wt % to about 99 wt % of the masterbatch composition. In an even further aspect, the polymer is present in an amount of from about 70 wt % to about 99 wt % of the masterbatch composition. In a further aspect, the polymer is present in an amount of from about 70 wt % to about 95 wt % of the masterbatch composition. In a still further aspect, the polymer is present in an amount of from about 70 wt % to about 90 wt % of the masterbatch composition. In yet a further aspect, the polymer is present in an amount of from about 70 wt % to about 85 wt % of the masterbatch composition. In an even further aspect, the polymer is present in an amount of from about 70 wt % to about 80 wt % of the masterbatch composition. In a still further aspect, the polymer is present in an amount of from about 70 wt % to about 75 wt % of the masterbatch composition. In yet a further aspect, the polymer is present in an amount of from about 75 wt % to about 95 wt % of the masterbatch composition. In an even further aspect, the polymer is present in an amount of from about 80 wt % to about 95 wt % of the masterbatch composition. In a still further aspect, the polymer is present in an amount of from about 85 wt % to about 95 wt % of the masterbatch composition. In yet a further aspect, the polymer is present in an amount of from about 90 wt % to about 95 wt % of the masterbatch composition. In an even further aspect, the polymer is present in an amount of from about 75 wt % to about 90 wt % of the masterbatch composition. In a still further aspect, the polymer is present in an amount of from about 75 wt % to about 85 wt % of the masterbatch composition. In yet a further aspect, the polymer is present in an amount of about 80 wt % of the masterbatch composition. Each of the foregoing numbers can be preceded by the term "about," "at least about," or "less than about," and any of the foregoing numbers can be used singly to describe an open-ended range or in combination to describe a closed-ended range.

In a further aspect, the cellulose composition is a crystalline cellulose. In a still further aspect, the crystalline cellulose is a microcrystalline cellulose (MCC). In yet a further aspect, the crystalline cellulose is a nanocrystalline cellulose (NCC).

In a further aspect, the cellulose composition comprises particles, wherein the particles comprises cellulose, have a $d_{75}$ of less than about 8 microns, have a $d_{50}$ of about 0.5 microns to about 5 microns, have an aspect ratio of about 1 to about 1.5, and have a non-spherical shape, wherein at least a portion of the cellulose is type-II cellulose.

In a further aspect, the cellulose composition is dried prior to the combining step. Without wishing to be bound by theory, the cellulose composition can be dried by any method known to one of skill in the art. Preferably, the drying should be done in such a manner that the particles of the cellulose composition are not allowed to agglomerate. Thus, in a still further aspect, dried is via freeze drying, lyophilization, spray drying, nano spray drying, fumed silica drying, supercritical carbon dioxide drying, supercritical anti-solvent drying, clay drying, oven drying, evaporation, vacuum, or a mixture thereof.

In a further aspect, the cellulose composition is present in an amount of from about 1 wt % to about 40 wt % of the masterbatch composition. In a still further aspect, the cellulose composition is present in an amount of from about 1 wt % to about 30 wt % of the masterbatch composition. In yet a further aspect, the cellulose composition is present in an amount of from about 5 wt % to about 40 wt % of the masterbatch composition. In a further aspect, the cellulose composition is present in an amount of from about 5 wt % to about 25 wt % of the masterbatch composition. In a still further aspect, the cellulose composition is present in an amount of from about 5 wt % to about 20 wt % of the masterbatch composition. In yet a further aspect, the cellulose composition is present in an amount of from about 5 wt % to about 15 wt % of the masterbatch composition. In an even further aspect, the cellulose composition is present in an amount of from about 5 wt % to about 10 wt % of the masterbatch composition. In a still further aspect, the cellulose composition is present in an amount of from about 10 wt % to about 30 wt % of the masterbatch composition. In yet a further aspect, the cellulose composition is present in an amount of from about 15 wt % to about 30 wt % of the masterbatch composition. In an even further aspect, the cellulose composition is present in an amount of from about 20 wt % to about 30 wt % of the masterbatch composition. In a still further aspect, the cellulose composition is present in an amount of from about 20 wt % to about 30 wt % of the masterbatch composition. In yet a further aspect, the cellulose composition is present in an amount of from about 25 wt % to about 30 wt % of the masterbatch composition. In an even further aspect, the cellulose composition is present in an amount of from about 10 wt % to about 25 wt % of the masterbatch composition. In a still further aspect, the cellulose composition is present in an amount of from about 15 wt % to about 25 wt % of the masterbatch composition. In yet a further aspect, the cellulose composition is present in an amount of about 10 wt % of the masterbatch composition. In an even further aspect, the cellulose composition is present in an amount of about 20 wt % of the masterbatch composition. Each of the foregoing numbers can be preceded by the term "about," "at least about," or "less than about," and any of the foregoing numbers can be used singly to describe an open-ended range or in combination to describe a closed-ended range.

In a further aspect, the method further comprises the step of combining a clay. Examples of clay include, but are not limited to, natural clay or synthetic clay, mica, vermiculite, montmorillonite, iron montmorillonite, beidellite, saponite, hectorite, stevensite, and nontronite, or a mixture thereof. In a still further aspect, the clay is hydrophilic. In yet a further aspect, the clay is hectorite.

In a further aspect, the clay is pre-mixed with the cellulose composition. In yet a further aspect, the clay is homogenously mixed with the cellulose composition. In an even further aspect, the cellulose composition and the clay are homogenously mixed prior to combining with the polymer.

In a further aspect, the clay is present in an amount of from about 0.25 wt % to about 10 wt % of the masterbatch composition. In a still further aspect, the clay is present in an amount of from about 1 wt % to about 10 wt % of the masterbatch composition. In yet a further aspect, the clay is present in an amount of from about 5 wt % to about 10 wt % of the masterbatch composition. In an even further aspect, the clay is present in an amount of about 10 wt % of the masterbatch composition. In a still further aspect, the clay is present in an amount of from about 0.25 wt % to about 5 wt % of the masterbatch composition. In yet a further aspect, the clay is present in an amount of from about 0.25 wt % to about 1 wt % of the masterbatch composition. Each of the foregoing numbers can be preceded by the term "about," "at least about," or "less than about," and any of the foregoing numbers can be used singly to describe an open-ended range or in combination to describe a closed-ended range.

In a further aspect, the method further comprises the step of combining a compatibilizer. Examples of compatibilizers include, but are not limited to, polyethylene, ethylene vinyl acetate, maleic anhydride, citric acid, and ethylene methyl acrylate.

In a further aspect, the compatibilizer is present in an amount of from about 0.01 wt % to about 10 wt % of the composition. In a still further aspect, the compatibilizer is present in an amount of from about 0.01 wt % to about 5 wt % of the composition. In yet a further aspect, the compatibilizer is present in an amount of from about 0.01 wt % to about 1 wt % of the composition. In an even further aspect, the compatibilizer is present in an amount of from about 0.01 wt % to about 0.5 wt % of the composition. In a still further aspect, the compatibilizer is present in an amount of from about 0.01 wt % to about 0.1 wt % of the composition. In yet a further aspect, the compatibilizer is present in an amount of from about 0.1 wt % to about 10 wt % of the composition. In an even further aspect, the compatibilizer is present in an amount of from about 0.5 wt % to about 10 wt % of the composition. In yet a further aspect, the compatibilizer is present in an amount of from about 1 wt % to about 10 wt % of the composition. In an even further aspect, the compatibilizer is present in an amount of from about 5 wt % to about 10 wt % of the composition. Each of the foregoing numbers can be preceded by the term "about," "at least about," or "less than about," and any of the foregoing numbers can be used singly to describe an open-ended range or in combination to describe a closed-ended range.

D. Methods for Drying a Particle

In one aspect, disclosed are methods for drying a particle, the method comprising: (a) mixing the particle with a resuspending agent, wherein the resuspending agent is adsorbed or bonded to at least a portion of the surface of the particles, thereby forming a composition; and (b) drying the composition.

Without wishing to be bound by theory, the resuspending agent may prevent irreversible agglomeration during the drying process. Thus, in various aspects, the resuspending agent should possess one or more of the following properties: a small size, dispersible in water, affinity to hydrogen bond, and non-volatile. Examples of resuspending agents include, but are not limited to, clays (natural or synthetic), minerals, acids (e.g., sulfuric acid), bases (e.g., sodium hydroxide), salts (e.g., $CaCl_2$, NaCl, KCl, and $NaSO_4$), sugars (e.g., mono-saccharides, oligo-saccharides, polyols, glucose, xylose, sorbitol, glycerine, and sucrose), surfactants (e.g., lecithin), and polymers (natural or synthetic) (e.g., polysaccharides, gums, proteins, polyvinyl alcohol (PVA), cellulose ethers, and polyethylene glycol (PEG)).

In a further aspect, the resuspending agent is a clay. Examples of clay include, but are not limited to, natural clay or synthetic clay, mica, vermiculite, montmorillonite, iron montmorillonite, beidellite, saponite, hectorite, stevensite, and nontronite, or a mixture thereof. In a still further aspect, the clay is hydrophobic. In yet a further aspect, the clay is hectorite.

In a further aspect, the resuspending agent is present in an amount of from about 5 wt % to about 15 wt % of the composition. In a still further aspect, the resuspending agent is present in an amount of from about 10 wt % to about 15 wt % of the composition. In yet a further aspect, the resuspending agent is present in an amount of from about 5 wt % to about 10 wt % of the composition. In an even further aspect, the resuspending agent is present in an amount of about 10 wt % of the composition. Each of the foregoing numbers can be preceded by the term "about," "at least about," or "less than about," and any of the foregoing numbers can be used singly to describe an open-ended range or in combination to describe a closed-ended range.

In a further aspect, the resuspending agent is present in an amount of from about 0.05 wt % to about 1.0 wt % of the composition. In a still further aspect, the resuspending agent is present in an amount of from about 0.1 wt % to about 1.0 wt % of the composition. In yet a further aspect, the resuspending agent is present in an amount of from about 0.5 wt % to about 1.0 wt % of the composition. In an even further aspect, the resuspending agent is present in an amount of from about 0.05 wt % to about 0.5 wt % of the composition. In a still further aspect, the resuspending agent is present in an amount of from about 0.05 wt % to about 0.1 wt % of the composition. In yet a further aspect, the resuspending agent is present in an amount of from about 0.05 wt % to about 0.5 wt % of the composition. In an even further aspect, the resuspending agent is present in an amount of from about 0.05 wt % to about 0.1 wt % of the composition. In a still further aspect, the resuspending agent is present in an amount of from about 0.1 wt % to about 0.6 wt % of the composition. Each of the foregoing numbers can be preceded by the term "about," "at least about," or "less than about," and any of the foregoing numbers can be used singly to describe an open-ended range or in combination to describe a closed-ended range.

In a further aspect, the weight ratio (dry basis) of the resuspending agent to the cellulose composition is of from about 1:1 to about 1:50, for example, from about 1:1 to about 1:40, from about 1:1 to about 1:35, from about 1:1 to about 1:32, from about 1:1 to about 1:30, from about 1:1 to about 1:25, from about 1:1 to about 1:20, from about 1:1 to about 1:15, from about 1:1 to about 1:12, from about 1:1 to about 1:10, from about 1:1 to about 1:8, from about 1:1 to about 1:6, from about 1:1 to about 1:5, from about 1:1 to about 1:4, from about 1:1 to about 1:3, from about 1:1 to about 1:2, from about 1:2 to about 1:10, from about 1:4 to about 1:10, from about 1:5 to about 1:10, from about 1:6 to about 1:10, from about 1:7 to about 1:10, from about 1:8 to about 1:10, from about 1:9 to about 1:10, about 1:1, about 1:2, about 1:3, about 1:4, about 1:5, about 1:6, about 1:7, about 1:8, about 1:9, or about 1:10.

In a further aspect, the weight ratio (dry basis) of the cellulose composition to the resuspending agent is of from about 1:1 to about 1:5, from about 1:1 to about 1:4, from about 1:1 to about 1:3, from about 1:1 to about 1:2, about 1:1, about 1:2, about 1:3, about 1:4, or about 1:5.

In a further aspect, the weight ratio (dry basis) of the resuspending agent to the particles is of from about 1:1 to about 1:50, for example, from about 1:1 to about 1:40, from about 1:1 to about 1:35, from about 1:1 to about 1:32, from about 1:1 to about 1:30, from about 1:1 to about 1:25, from about 1:1 to about 1:20, from about 1:1 to about 1:15, from about 1:1 to about 1:12, from about 1:1 to about 1:10, from about 1:1 to about 1:8, from about 1:1 to about 1:6, from about 1:1 to about 1:5, from about 1:1 to about 1:4, from about 1:1 to about 1:3, from about 1:1 to about 1:2, from about 1:2 to about 1:10, from about 1:4 to about 1:10, from about 1:5 to about 1:10, from about 1:6 to about 1:10, from about 1:7 to about 1:10, from about 1:8 to about 1:10, from about 1:9 to about 1:10, about 1:1, about 1:2, about 1:3, about 1:4, about 1:5, about 1:6, about 1:7, about 1:8, about 1:9, or about 1:10.

In a further aspect, the weight ratio (dry basis) of the particles to the resuspending agent is of from about 1:1 to about 1:5, from about 1:1 to about 1:4, from about 1:1 to about 1:3, from about 1:1 to about 1:2, about 1:1, about 1:2, about 1:3, about 1:4, or about 1:5.

In a further aspect, the particles have a $d_{75}$ of less than about 8 microns, have a $d_{50}$ of about 0.5 microns to about 5 microns, have an aspect ratio of about 1 to about 1.5, and have a non-spherical shape.

In a further aspect, the particle comprises cellulose. The disclosed particles comprising cellulose may be prepared, for example, from the hydrolysis of biomass and other cellulose containing materials, particularly those processes utilizing sub-, near-, or supercritical fluids. In further aspects, the particles comprise chitin, chitosan, and/or polysaccharides. In still further aspects, the particles comprise silica and/or alumina.

In various aspects, a suitable feedstock as disclosed elsewhere herein is hydrolyzed by contacting with a fluid, and the fluid has a temperature (° C.) of 100, 120, 140, 160, 180, 200, 220, 240, 250, 260, 280, 300, 320, 340, 350, 355, 360, 365, 374, 380, 385, 390, 395, 400, 410, 420, 430, 440, 450, 460, 470, 480, 490, 500, 550, or 575. Each of the foregoing numbers can be preceded by the word "about," "at least about," or "less than about," and any of the foregoing numbers can be used singly to describe an open-ended range or in combination to describe a closed-ended range.

In various aspects, the pressure of the hydrolysis is conducted at a pressure (bar) of 1, 5, 10, 20, 30, 40, 50, 60, 70, 80, 90, 100, 110, 120, 130, 140, 150, 160, 170, 180, 190, 200, 210, 220, 221, 225, 230, 250, 275, 300, 325, 350, 375, 400, 425, 450, 475, 500, 525, 550, 575, 600, 625, 650, 675, 700, 725, 750, 775, or 800. Each of the foregoing numbers can be preceded by the word "about," "at least about," or "less than about," and any of the foregoing numbers can be used singly to describe an open-ended range or in combination to describe a closed-ended range. For example, the pressure can be about 221 bar to about 800 bar, about 230 bar to about 500 bar, about 325 bar to about 750 bar, or about 275 bar to about 350 bar. In various aspects, the pressure may be greater than 800 bar. In some embodiments, the pressure is sufficient to maintain at least a portion or all of the fluid in liquid or supercritical form.

In various aspects, the residence time (seconds) of the hydrolysis is 0.1, 0.2, 0.3, 0.4, 0.5, 0.6, 0.7, 0.8, 0.9, 1.0, 1.1, 1.2, 1.3, 1.4, 1.5, 2.0, 2.5, 3.0, 3.5, 4.0, 4.5, 5.0, 6.0, 7.0, 8.0, 9.0, 10.0, 15, 20, 30, 40, 50, 60, 70, 80, 90, 100, 120, 140, 160, 180, 200, 220, 240, 260, 280, or 300. Each of the foregoing numbers can be preceded by the word "about," "at least about," or "less than about," and any of the foregoing numbers can be used singly to describe an open-ended range or in combination to describe a closed-ended range. For example, the duration can be about 0.1 seconds to about 10 seconds, about 0.1 seconds to about 5 seconds, about 0.1 seconds to about 0.3 seconds, about 1.1 seconds to about 5 seconds, or about 0.9 seconds to about 9 seconds. In various aspects, the duration is greater than 10 seconds. In various aspects, the duration is about 1.4 seconds or less, such as about 0.1 seconds to about 1.4 seconds. In various aspects, where the mixture is subjected to subcritical hydrolysis, the duration (minutes) of the hydrolysis is 0.5, 1, 1.5, 2, 2.5, 3, 3.5, 4, 5, 10, 20, 30, 40, 50, 60, 80, 100, 120, 140, 160, 180, 200, 220, 240, 260, 280, or 300. Each of the foregoing numbers can be preceded by the word "about," "at least about," or "less than about," and any of the foregoing numbers can be used singly to describe an open-ended range or in combination to describe a closed-ended range.

Thus, in various aspects, particles comprising cellulose may be isolated from the mixture resulting from the hydrolysis reaction by one or more of centrifugation, cyclone separation (including hydrocyclone separation), sedimentation, elutriation, aggregation, flocculation, screening, flotation and skimming, and the like, or any combination thereof. Differing cellulose particle fractions are produced according to differing methods of production and isolation.

In various aspects, the hydrolysis is conducted in one step. In various aspects, the hydrolysis in conducted in two steps. In various aspects, the hydrolysis is conducted in three, four, five, or six steps. Reaction conditions for each step can be independently selected from any of the reaction conditions or types of fluids (e.g., sub-, near-, or supercritical) disclosed herein. In various aspects, the hydrolysis is conducted in two steps, where the first step is subcritical or near-critical hydrolysis, and the second step is a supercritical hydrolysis. In various aspects where one step is employed, the one step is carried with a near- or supercritical fluid.

In a further aspect, the particles have a $d_{75}$ of less than about 8 microns, have a $d_{50}$ of about 0.5 microns to about 5 microns, have an aspect ratio of about 1 to about 1.5, and have a non-spherical shape, and wherein at least a portion of the cellulose is type-II cellulose.

In a further aspect, the particles comprise cellulose in an amount of 44%, 45% 46%, 48%, 50%, 52%, 54%, 56%, 58%, 60%, 62%, 64%, 66%, 68%, 70%, 72%, 74%, 76%, 78%, 80%, 82%, 84%, 86%, 88%, 90%, 92%, 94%, 96%, 98%, 99%, or 100%, based on the total weight of the particles on a dry basis. Each of the foregoing numbers can be preceded by the word "about," "at least about," or "less than about," and any of the foregoing numbers can be used singly to describe an open-ended range or in combination to describe a close-ended range. For example and without limitation, the amount of cellulose in the particles can be at least about 45% by weight, about 45% by weight to about 100% by weight, at least about 99%, or less than about 100%, by weight based on the total weight of the particles on a dry basis.

In various aspects, disclosed are particles comprising type II cellulose. In a further aspect, the particles comprise type II cellulose in an amount of 44%, 45% 46%, 48%, 50%, 52%, 54%, 56%, 58%, 60%, 62%, 64%, 66%, 68%, 70%, 72%, 74%, 76%, 78%, 80%, 82%, 84%, 86%, 88%, 90%, 92%, 94%, 96%, 98%, 99%, or 100%, based on the total weight of the particles on a dry basis. Each of the foregoing numbers can be preceded by the word "about," "at least about," or "less than about," and any of the foregoing numbers can be used singly to describe an open-ended range or in combination to describe a close-ended range. For example and without limitation, the amount of cellulose in the particles can be at least about 45% by weight, about 45% by weight to about 100% by weight, at least about 99%, or less than about 100%, by weight based on the total weight of the particles on a dry basis.

In various aspects, and as readily appreciated by one of ordinary skill in the art, the cellulose particles may comprise a number of crystalline structures. Natural cellulose, known as a type-I cellulose, can comprise $I_\alpha$ and $I_\beta$ structures. The amount of $I_\alpha$ and $I_\beta$ structures depends on the type of the natural cellulose. For example and without limitation, the cellulose produced by bacteria and algae may be enriched in $I_\alpha$, while cellulose of plants consists mainly of $I_\beta$. Type-I cellulose may be converted to a stable crystalline form of cellulose known as a type-II cellulose. The conversion of the type-I cellulose to the type-II cellulose may be achieved by different routes, for example and without limitation, by mercerization (alkali treatment), regeneration (solubilization followed by recrystallization), subcritical and supercritical water, ball milling of cellulose in presence of water and the like. The conversion may be irreversible, suggesting that the type-II cellulose is more stable than type-I cellulose. In a further aspect, additional types of the cellulose may be included. For example, and without limitation, a type-III cellulose and type-IV cellulose may be produced by various chemical treatments, such as treatment with liquid ammonia or certain amides such as ethylene diamine, or high temperature treatment in glycerol. The particles comprising cellulose herein comprise type-II cellulose, in an amount ranging up to 100% of the cellulose. In various aspects, the particles comprising cellulose herein may additionally comprise type-I cellulose.

In a further aspect, the cellulose particles comprise type-I cellulose and type-II cellulose. In a still further aspect, the cellulose particles comprise type-II cellulose and unconverted type-I cellulose. In yet a further aspect, the cellulose particles further comprise lignin. It should be understood that each respective component present in the cellulose particles may be present in any amount relative to the total weight percentage of the cellulose particles. For example, and without limitation, the cellulose particles can comprise type-I cellulose or type-II cellulose in any amount. The amounts described herein can apply to the amount of type-I cellulose in the cellulose particles, the amount of type-II cellulose in the cellulose particles, or the combined amount of type-I cellulose and type-II cellulose in the cellulose particles as will be clear by context. For example, the amount of type-I and/or type-II cellulose in the cellulose particles can be 5%, 10%, 15%, 20%, 25%, 30%, 35%, 40%, 45%, 50%, 55%, 60%, 65%, 70%, 75%, 80%, 85%, 90%, 95%, or 100% by weight. Each of the foregoing numbers can be preceded by the word "about," "at least about," or "less than about," and any of the foregoing numbers can be used singly to describe an open-ended range or in combination to describe a close-ended range. For example, the type-I and/or type-II cellulose can be present in an amount of at least about 35% by weight, about 15% by weight to about 70% by weight, or less than about 80% by weight.

In various aspects, there may be a type-III cellulose, a type-IV cellulose, an amorphous cellulose, or any combination thereof present in the cellulose particles. The numerical weight percent ranges disclosed herein for the type-I cellulose and/or type-II cellulose may be used to describe the amount of any of these additional cellulose types, if present, either alone or in combination with one another as will be clear by context, and weight percent values are based on the total weight of the cellulose particles (i.e., the total weight of all cellulose types, including amorphous if present, making up the cellulose particles on a dry basis).

As one of ordinary skill in the art would readily appreciate, the different crystalline phases of the cellulose may be analyzed using X-ray diffraction (XRD). The specific XRD pattern of a crystalline solid reflects the crystal structure. Using Cu Kα radiation, the XRD spectrum of the type-I cellulose show two peaks at 2θ: a primary peak around 22.5° and a secondary peak around 15.5°. The XRD spectrum of the type-II cellulose shows a primary peak at 2θ around 19.9° and a secondary peak around 12.1°.

In one aspect, at least a portion of the cellulose particles exhibits a degree of crystallinity of 70%, 72%, 74%, 76%, 78%, 80%, 82%, 84%, 86%, 88%, 90%, 92%, 94%, 96%, 98%, 99%, or 100%. Each of the foregoing numbers can be preceded by the word "about," "at least about," or "less than about," and any of the foregoing numbers can be used singly to describe an open-ended range or in combination to describe a close-ended range. For example, the crystallinity can be about at least 90%, about 86% to about 96%, or less than about 88%.

Relative amounts of type-I cellulose, type-II cellulose, and amorphous cellulose can be measured using solid-state $^{13}$C CP-MAS NMR spectroscopy or XRD. In various aspects, the cellulose particles comprise, consist of, or consist essentially of cellulose having a type-I structure, either alone or in combination with a type-I structure, an amorphous structure, or both. In other words, the cellulose in the particles can be type-II cellulose, either alone or in combination with a type-I cellulose, amorphous cellulose, or both. In various aspects, the ratio of type-I cellulose to type-II cellulose in the cellulose particles, on a dry weight basis, is about 0.5:9.5, 1:9, 1.5:9.5, 2:8, 2.5:7.5, 3:7, 3.5:6.5, 4:6, 4.5:5.5, 5:5, 5.5:4.5, 6:4, 6.5:3.5, 7:3, 7.5:2.5, 8:2, 8.5:1.5, 9:1, or 9.5:0.5. Each of the foregoing numbers can be preceded by the word "about," "at least about," or "less than about," and any of the foregoing numbers can be used singly to describe an open-ended range or in combination to describe a close-ended range. In various aspects, the cellulose particles comprises cellulose, wherein the cellulose is at least 99 wt % type-II cellulose on a dry basis.

In various aspects, the cellulose particles can comprise type-I and type-II cellulose having any of the ratios herein, and the cellulose particles can further comprise amorphous cellulose. The ratio of amorphous cellulose to total amount of type-I and type-II cellulose, on a dry weight basis, can be 0.5:9.5, 1:9, 1.5:9.5, 2:8, 2.5:7.5, 3:7, 3.5:6.5, 4:6, 4.5:5.5, 5:5, 5.5:4.5, 6:4, 6.5:3.5, 7:3, 7.5:2.5, 8:2, 8.5:1.5, 9:1, or 9.5:0.5. Each of the foregoing numbers can be preceded by the word "about," "at least about," or "less than about," and any of the foregoing numbers can be used singly to describe an open-ended range or in combination to describe a close-ended range.

In various aspects, the cellulose particles can comprise cellulose having a weight-average molecular weight ($M_w$ in g/mol) of 2200, 2400, 2600, 2800, 3000, 3200, 3400, 3500, 3600, 3800, 4000, 4200, 4400, 4500, 4600, 4800, 5000, 5200, 5400, 5500, 5600, 5800, 6000, 6200, 6400, 6500, 6600, 6800, 7000, 7200, 7400, 7500, 7600, 7800, 8000, 8500, 9000, 9500, 10000, 10500, 11000, 11500, 12000, 12500, 13000, 13500, 14000, 14500, 15000, 15500, 16000, 16500, 17000, 17500, or 18000. Each of the foregoing numbers can be preceded by the word "about," "at least about," or "less than about," and any of the foregoing numbers can be used singly to describe an open-ended range or in combination to describe a close-ended range. For example, the $M_w$ of the cellulose particles can be at least about 4000 g/mol, about 12000 g/mol to about 15500 g/mol, about 6000 g/mol to about 12000 g/mol, about 2200 g/mol to about 9500 g/mol, or less than about 13000 g/mol, as determined on a sample of the cellulose particles that has been prepared for gel-permeation chromatography analysis according to a first condition.

The particles can have any suitable $M_n$. For example, the $M_n$ (g/mol) can be 2000, 2500, 3000, 3500, 4000, 4500, 5000, 5500, 6000, 6500, 7000, 7500, or 8000. Each of the foregoing numbers can be preceded by the word "about," "at least about," or "less than about," and any of the foregoing numbers can be used singly to describe an open-ended range or in combination to describe a close-ended range. For example, the $M_n$ of the particles can be at least about 2000 g/mol, about 3000 g/mol to about 5500 g/mol, about 3000 g/mol to about 8000 g/mol, or less than about 7000 g/mol, as determined on a sample of the cellulose particles that has been prepared for gel-permeation chromatography analysis according to a first condition.

The particles can have any suitable $M_z$. For example, the $M_z$ (g/mol) can be 5000, 5500, 6000, 6500, 7000, 7500, 8000, 8500, 9000, 9500, 10000, 10500, 11000, 11500, 12000, 12500, 13000, 13500, 14000, 14500, 15000, 16000, 17000, 18000, 19000, 20000, 21000, 22000, 23000, 24000, 25000, 26000, 27000, 28000, 29000, 30000, or 40000. Each of the foregoing numbers can be preceded by the word "about," "at least about," or "less than about," and any of the foregoing numbers can be used singly to describe an open-ended range or in combination to describe a close-ended range.

In various aspects, the cellulose particles can comprise cellulose having a degree of polymerization ($DP_w$) of 10, 12, 14, 15, 16, 18, 20, 22, 24, 25, 26, 28, 30, 32, 34, 35, 36, 38, 40, 42, 44, 45, 46, 48, 50, 55, 60, 65, 70, 75, 80, 85, 90, 95, 100, 105, 110, 115, 120, 125, 130, 135, 140, 145, 150. Each of the foregoing numbers can be preceded by the word "about," "at least about," or "less than about," and any of the foregoing numbers can be used singly to describe an open-ended range or in combination to describe a close-ended range. For example and without limitation, the DP can be at least about 16, about 20 to about 95, about 40 to about 80, or less than about 150, as determined on a sample of the cellulose particles that has been prepared for gel-permeation chromatography analysis according to a first condition. DP, as used herein (sometimes termed $DP_w$), is calculated from $M_w$, using the anhydroglucose molar weight of 162 g/mol.

Similarly a $DP_n$ can be calculated from the Mn for the particles comprising cellulose. In various aspects, the cellulose particles can comprise cellulose having a number average degree of polymerization ($DP_n$) of 15, 16, 18, 20, 22, 24, 25, 26, 28, 30, 32, 34, 35, 36, 38, 40, 42, 44, 45, 46, 48, 50, 55, 60, 65, 70, 75, 80, 85, 90, 95, 100, 105, 110, 115, 120, 125, 130, 135, 140, 145, 150. Each of the foregoing numbers can be preceded by the word "about," "at least about," or "less than about," and any of the foregoing numbers can be used singly to describe an open-ended range or in combination to describe a close-ended range. For example and without limitation, the $DP_n$ can be at least about 16, about 20 to about 95, about 25 to about 40, or less than about 150, as determined on a sample of the cellulose particles that has been prepared for gel-permeation chromatography analysis according to a first condition. $DP_n$, as used herein, is calculated from $M_n$, using the anhydroglucose molar weight of 162 g/mol.

The $M_w$, $M_n$, $M_z$, and DP reported herein for the cellulose particles are different than those same parameters measured for microcrystalline cellulose (MCC), when solubilized for GPC measurement according to the first condition. The MCC used in this comparison was Acros Organics, cellulose microcrystalline, extra pure, average particle size 90 μm, product #382310010, and this MCC should be used for comparison purposes if available. If not available, then a comparable MCC should be used for comparison. Accordingly, in various aspects, the cellulose particles herein have an $M_n$ that is 0.05, 0.1, 0.15, 0.2, 0.25, 0.3, 0.35, 0.4, 0.45, 0.5, 0.55, 0.6, 0.65, or 0.7 times the $M_n$ of MCC. In various aspects, the cellulose particles herein have an $M_w$ that is 0.04, 0.02, 0.04, 0.06, 0.08, 0.1, 0.12, 0.14, 0.16, 0.18, 0.2, 0.22, 0.24, 0.26, 0.28, 0.3, 0.32, 0.34, 0.36, 0.38, 0.4, 0.42, 0.44, 0.46, 0.48, or 0.5 times the $M_w$ of MCC. In various aspects, the cellulose particles herein have an $M_z$ that is 0.01, 0.02, 0.03, 0.04, 0.05, 0.06, 0.07, 0.08, 0.09, 0.1, 0.12, 0.14, 0.15, 0.16, 0.18, 0.2, 0.22, 0.24, 0.26, 0.28, 0.3, 0.32, 0.34, or 0.36 times the $M_z$ of MCC. In various aspects, the cellulose particles herein have DP that is 0.04, 0.02, 0.04, 0.06, 0.08, 0.1, 0.12, 0.14, 0.16, 0.18, 0.2, 0.22, 0.24, 0.26, 0.28, 0.3, 0.32, 0.34, 0.36, 0.38, 0.4, 0.42, 0.44, 0.46, 0.48, or 0.5 times the DP of MCC. Each of the foregoing numbers relating to the comparison of $M_w$, $M_n$, $M_z$ and DP for MCC and cellulose particles can be preceded by "about," "at least about," or "less than about," and any of the foregoing numbers can be used singly to describe an open-ended range or in combination to describe a close-ended range. For example, the cellulose particles have an $M_w$ that is less than about 0.5 times the $M_w$ of MCC.

The particles comprising cellulose can have any suitable PDI. For example, the PDI can be 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, or 2.8. Each of the foregoing numbers can be preceded by the word "about," "at least about," or "less than about," and any of the foregoing numbers can be used singly to describe an open-ended range or in combination to describe a close-ended range.

In certain aspects, the disclosed particles comprising comprise lignin. In certain aspects, lignin is present in an amount (weight %, dry basis) of 0, 1, 2, 3, 4, 5, 6, 7, 8, 9, 10, 11, 12, 3, 14, 15, 6, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 62, 64, 66, 68, 70, 72, 74, 76, 78, or 80. Each of the foregoing numbers can be preceded by the word "about," "at least about," or "less than about," and any of the foregoing numbers can be used singly to describe an open-ended range or in combination to describe a close-ended range. For example, lignin can be present in an amount of at least about 4% by weight, about 10% by weight to about 26% by weight, or less than about 5% by weight. In various aspects, the particles comprise about 0% by weight lignin, based on the weight of the particles on a dry basis.

Particle sizes are measured and reported herein using a Beckman Coulter LS 13 320 Laser Diffraction Particle Size Analyzer instrument with Universal Liquid Module attached (referred to herein as the Beckman Coulter Particle Sizer). One of ordinary skill in the art would understand how to prepare samples for particle size analysis with the Beckman Coulter Particle Sizer. While the Beckman Coulter Particle Sizer is preferred for measuring particle size, if such an instrument is not available, a different instrument known to one of ordinary skill in the art to have comparable measurement results should be employed. Samples for analysis should be prepared in a manner that enables the particles to be analyzed with the instrument. The following sample preparation is illustrative: (i) ensure a solids content of at least 3 wt. %, based on total suspension weight; (ii) heat the suspension at 45+/−5° C. for 1 hour; and (iii) blend the suspension for 60 seconds at about 12,000 rpm. This sample should then be stirred to form a homogeneous suspension immediately before injection into the Universal Solutions Module of the instrument. The standard software accompanying the Beckman Coulter Particle Sizer provides instructions for use of the instrument and sample preparation.

Light scattering is a commonly used technique for particle size determination for a suspension of particles in a liquid and particle sizes are generally reported herein in terms of $d_{(n)}$. The value $d_{(n)}$ represents the particle size at which (n) percentage of the sample, ranked by volume, is smaller. For example, the quantity $d_{(100)}$ represents the particle size at which 100% of the sample is smaller. The quantity $d_{(90)}$ represents the particle size at which 90% of the sample is smaller. The quantity $d_{(50)}$ represents the particle size at which 50% of the sample is smaller. The quantity $d_{(25)}$ represents the particle size at which 25% of the sample is smaller. The quantity $d_{(10)}$ represents the particle size at which 10% of the sample is smaller.

The particles disclosed herein may have any desired particle size distribution characteristics. Particle size distributions typically include values of $d_{(n)}$, where (n) represents a volume percentage such as 5, 10, 15, 20, 25, 30, 35, 40, 45, 50, 55, 60, 65, 70, 75, 80, 85, 90, 95, or 100, at which (n) percentage of the volume is smaller. The particle size distribution can refer either to the cellulose particles in an agglomerated state or a non-agglomerated state, as will be clear from context. If an agglomeration state is not referred to, then the particle size refers to the non-agglomerated state of the particles (i.e., the size of the primary particles).

In exemplary and non-limiting aspects, the particles have a particle size distribution with a $d_{10}$ (µm) of 0.3, 0.35, 0.4, 0.45, 0.5, 0.55, 0.6, 0.65, 0.7, 0.75, 0.8, 0.85, 0.9, 0.95, 1.0, 1.1, 1.2, 1.3, 1.4, 1.5, 1.6, 1.7, 1.8, 1.9, 2.0. Each of the foregoing numbers can be preceded by the word "about," "at least about," or "less than about," and any of the foregoing numbers can be used singly to describe an open-ended range or in combination to describe a close-ended range. For example, the $d_{10}$ can be at least about 0.3 µm, about 0.6 µm, about 0.4 µm to about 0.7 µm, or less than about 1.0 µm.

In various aspects, the particles have a particle size distribution with a $d_{50}$ (µm) of 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0. Each of the foregoing numbers can be preceded by the word "about," "at least about," or "less than about," and any of the foregoing numbers can be used singly to describe an open-ended range or in combination to describe a close-ended range. For example, the $d_{50}$ can be at least about 0.5 µm, about 1.4 µm, about 1.0 µm to about 1.6 µm, about 0.7 to about 1.2 µm, or less than about 2.0 µm.

In various aspects, the particles have a particle size distribution with a $d_{75}$ (µm) of 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 12, 3.3, 3.4, 3.5, 3.6, 17, 3.8, 3.9, 4.0, 4.1, 4.2, 4.3, 4.4, 4.5, 4.6, 4.7, 4.8, 4.9, 5.0, 5.5, 6.0, 6.5, 7.0, 7.5, or 8.0. Each of the foregoing numbers can be preceded by the word "about," "at least about," or "less than about," and any of the foregoing numbers can be used singly to describe an open-ended range or in combination to describe a close-ended range. For example, the $d_{75}$ can be at least about 0.7 µm, about 3.0 µm, about 0.8 µm to about 3.0 µm, about 0.5 µm to about 6 µm, or less than about 4.0 µm.

In various aspects, the particles have a particle size distribution with a $d_{90}$ (µm) of 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.5, 9.0, 9.5, or 10. Each of the foregoing numbers can be preceded by the word "about," "at least about," or "less than about," and any of the foregoing numbers can be used singly to describe an open-ended range or in combination to describe a close-ended range. For example, the $d_{90}$ can be at least about 0.8 µm, about 6.2 µm, about 1.0 µm to about 7.5 µm, about 0.5 µm to about 10 µm, or less than about 8.0 µm.

In certain aspects, the particles are characterized by transmission electron microscopy or scanning electron microscopy, in which the particle shape and aspect ratios can be readily visualized and calculated. In various aspects, aspect ratios for the particles comprising cellulose can be 1, 1.1, 1.2, 1.3, 1.4, or 1.5. Each of the foregoing numbers can be preceded by the word "about," "at least about," or "less than about," and any of the foregoing numbers can be used singly to describe an open-ended range or in combination to describe a close-ended range. For example, the aspect ratio can be about 1.2, about 1.1 to about 1.4, or about 1.4 or less. In various aspects, the aspect ratio is not greater than 1.5. In various aspects, particle shape can be irregular, globular, or the like. In various aspects, the particle shape is not needle-like, rectangular, or the like.

In certain aspects, suspensions (e.g., aqueous and/or organic solvent) of the particles comprising cellulose disclosed herein can have a solids content (%) of 4, 5, 6, 7, 8, 9, 10, 11, 12, 13, 14, 15, 16, 17, 18, 19, 20, 21, 22, 23, 24, 25, 26, 27, 28, 28, 30, 31, 32, 33, 34, 35, 36, 37, 38, 39, 40, 41, 42, 43, 44, 45, 46, 47, 48, 49, or 50. Each of the foregoing numbers can be preceded by the word "about," "at least about," or "less than about," and any of the foregoing numbers can be used singly to describe an open-ended range or in combination to describe a close-ended range. In certain aspects, the suspension has a solids content of at least about 15%, about 16% to about 20%, or less than about 40%. In various aspects, the suspension has a solids content of about 20% to about 40%.

In certain aspects, a cellulose composition is provided comprising particles comprising cellulose as disclosed herein and further comprising a resuspending agent adsorbed or bonded to at least a portion of the surface of the particles. In certain aspects, suspensions of such compositions may be dried and the dried compositions can have a solids content (%) of 90, 90.5, 91, 91.5, 92, 92.5, 93, 93.5, 94, 94.5, 95, 95.5, 96, 96.5, 97, 97.5, 98, 98.5, 99, 99.5, or 100. Each of the foregoing numbers can be preceded by the word "about," "at least about," or "less than about," and any of the foregoing numbers can be used singly to describe an open-ended range or in combination to describe a close-ended range. In certain aspects, the cellulose particles have a solids content of at least about 98.5%, about 97% to about 99%, or at least about 95%. In various aspects, the cellulose particles have a solids content of about 92% to about 93.5%. In various aspects, the cellulose particles have a solids content of at least about 95%. As used herein, "adsorbed" means the resuspending agent is in contact with at least a portion of the surface of the particles and, in various aspects, may be (but need not be) held to the surface through hydrogen bonding, van der Waals forces, or a combination thereof. As used herein, "bonded" means the resuspending agent is covalently bonded to at least a portion of the surface of the particles. In various aspects, the resuspending agent may be both adsorbed and bonded to the surface, for example, where a portion (or portions) of the agent is (are) adsorbed to the surface, and another portion (or portions) is (are) bonded to the surface.

In a further aspect, drying is in such a manner that the particles of the cellulose composition are not allowed to agglomerate. Thus, in a still further aspect, drying is via freeze drying, lyophilization, spray drying, nano spray drying, fumed silica drying, supercritical carbon dioxide drying, supercritical anti-solvent drying, clay drying, oven drying, evaporation, vacuum, or a mixture thereof.

E. Compositions

In one aspect, disclosed are compositions prepared by a disclosed method. In a further aspect, disclosed are thermoplastic compositions prepared by a disclosed method.

In one aspect, compositions comprising: (a) a polymer in an amount of from about 60 wt % to about 90 wt % of the composition; (b) a cellulose composition comprising particles, wherein the particles comprises cellulose, and wherein the cellulose composition is present in an amount of from about 0.01 wt % to about 5 wt % of the composition; and (c) reinforcing filler in an amount of from about 5 wt % to about 50 wt % of the composition.

In one aspect, disclosed are compositions comprising: (a) a polymer in an amount of from about 30 wt % to about 60 wt % of the composition; (b) a cellulose composition comprising particles, wherein the particles comprises cellulose, and wherein the cellulose composition is present in an amount of from about 0.01 wt % to about 5 wt % of the composition; and (c) a reinforcing filler in an amount of from about 40 wt % to about 80 wt % of the composition.

In a further aspect, the polymer is a thermoplastic polymer. Examples of thermoplastic polymers include, but are not limited to, natural and synthetic thermoplastic polymers such as, for example, polyolefins, polyesters, polycarbonates, styrene-acrylonitrile copolymers, polyethylene terephthalate, polybutylene terephthalate, polyamides, polystyrene, polystyrene derivatives, polyphenylene oxide, polyoxymethylene, fluorine-containing thermoplastics, and blends thereof. Suitable thermoplastics are also described elsewhere herein.

In a further aspect, the polymer is a thermoset polymer. Examples of thermoset polymers include, but are not limited to, natural and synthetic thermoset polymers such as, for example, urethane formaldehyde, phenol formaldehyde, melamine formaldehyde, unsaturated polyesters, epoxy based polyesters, elastomers such as rubber, and blends thereof.

In a further aspect, the polymer is a polyamide (PA) or a polyester or both. In a still further aspect, the polymer is a polyamide. Examples of polyamides include, but are not limited to, PA6, PA46, PA66, PA610, PA612, PA11, and PA12. In an even further aspect, the polyamide is PA6.

In a further aspect, the polymer is a polyester. Examples of polyesters include, but are not limited to, polybutylene terephthalate (PBT), polyethylene terephthalate (PET), polyethylene isophthalate (PEI), PET/PEI copolymer, polyarylate (PAR), polybutylene naphthalate (PBN), liquid crystal polyesters, polybutylene terephthalate/tetraethylene glycol copolymer, and polyoxyalkylenediimide diacid/polybutylene terephthalate copolymer.

In a further aspect, the polymer is present in an amount of from about 60 wt % to about 99 wt % of the composition. In a still further aspect, the polymer is present in an amount of from about 60 wt % to about 95 wt % of the composition. In yet a further aspect, the polymer is present in an amount of from about 65 wt % to about 99 wt % of the composition. In an even further aspect, the polymer is present in an amount of from about 70 wt % to about 99 wt % of the composition. In a further aspect, the polymer is present in an amount of about 70 wt % to about 85 wt % of the composition. In a still further aspect, the polymer is present in an amount of about 70 wt % to about 80 wt % of the composition. In yet a further aspect, the polymer is present in an amount of about 70 wt % to about 75 wt % of the composition. In an even further aspect, the polymer is present in an amount of about 75 wt % to about 90 wt % of the composition. In a still further aspect, the polymer is present in an amount of about 80 wt % to about 90 wt % of the composition. In yet a further aspect, the polymer is present in an amount of about 85 wt % to about 90 wt % of the composition. Each of the foregoing numbers can be preceded by the term "about," "at least about," or "less than about," and any of the foregoing numbers can be used singly to describe an open-ended range or in combination to describe a closed-ended range.

In a further aspect, the polymer is present in an amount of from about 30 wt % to about 60 wt % of the composition. In a still further aspect, the polymer is present in an amount of from about 30 wt % to about 50 wt % of the composition. In yet a further aspect, the polymer is present in an amount of from about 30 wt % to about 40 wt % of the composition. In an even further aspect, the polymer is present in an amount of from about 40 wt % to about 60 wt % of the composition. In a still further aspect, the polymer is present in an amount of from about 50 wt % to about 60 wt % of the composition. Each of the foregoing numbers can be preceded by the term "about," "at least about," or "less than about," and any of the foregoing numbers can be used singly to describe an open-ended range or in combination to describe a closed-ended range.

In a further aspect, the cellulose composition comprises particles, wherein the particles comprises cellulose, have a $d_{75}$ of less than about 8 microns, have a $d_{50}$ of about 0.5 microns to about 5 microns, have an aspect ratio of about 1 to about 1.5, and have a non-spherical shape, and wherein at least a portion of the cellulose is type-II cellulose.

In a further aspect, the cellulose composition is present in an amount of from about 0.01 wt % to about 5 wt % of the composition. In a still further aspect, the cellulose composition is present in an amount of from about 0.01 wt % to about 2.0 wt % of the composition. In yet a further aspect, the cellulose composition is present in an amount of from about 0.5 wt % to about 5 wt % of the composition. In a further aspect, the cellulose composition is present in an amount of from about 0.5 wt % to about 2.0 wt % of the composition. In a still further aspect, the cellulose composition is present in an amount of from about 0.5 wt % to about 1.5 wt % of the composition. In yet a further aspect, the cellulose composition is present in an amount of from about 0.5 wt % to about 1.0 wt % of the composition. In an even further aspect, the cellulose composition is present in an amount of from about 1.0 wt % to about 2.5 wt % of the composition. In a still further aspect, the cellulose composition is present in an amount of from about 1.5 wt % to about 2.5 wt % of the composition. In yet a further aspect, the cellulose composition is present in an amount of from about 2.0 wt % to about 2.5 wt % of the composition. Each of the foregoing numbers can be preceded by the term "about," "at least about," or "less than about," and any of the foregoing numbers can be used singly to describe an open-ended range or in combination to describe a closed-ended range.

In some aspects, the reinforcing filler has any suitable aspect ratio. The aspect ratio can be 5, 10, 15, 20, 25, 30, 35, 40, 45, 50, 55, 60, 65, 70, 75, 80, 85, 90, 95, 100, 110, 120, 130, 140, 150, 160, 170, 180, 190, 200, 220, 240, 260, 280, 300, 320, 340, 360, 380, 400, 420, 440, 460, 480, 500, 520, 540, 560, 580, 600, 625, 650, 675, 700, 750, 800, 850, 900, 950, or 1000. Each of the foregoing numbers can be preceded by the term "about," "at least about," or "less than about," and any of the foregoing numbers can be used singly to describe an open-ended range or in combination to describe a closed-ended range.

In a further aspect, the reinforcing filler is selected from a glass fiber, a mineral filler, a carbon fiber, and any combination thereof.

In a further aspect, the reinforcing fiber is a glass fiber. Examples of glass fibers include, but are not limited to, E-glass and S-glass. E-glass is a low alkali, aluminum-borosilicate composition with excellent electrical properties and good strength and modulus. S-glass is a magnesium-aluminosilicate composition with considerably higher strength and modulus. In a still further aspect, the glass fiber is E-glass. In yet a further aspect, the glass fiber is a chopped strand. In an even further aspect, the glass fiber is a continuous fiber product.

In a further aspect, the reinforcing fiber is a mineral filler. Examples of mineral fillers include, but are not limited to, barytes, barium sulfate, asbestos, barite, diatomite, feldspar, gypsum, hormite, kaolin, mica, nepheline syenite, perlite, phyrophyllite, smectite, talc, vermiculite, zeolite, calcite, calcium carbonate, wollastonite, calcium metasilicate, clay, aluminum silicate, talc, magnesium aluminum silicate, hydrated alumina, hydrated aluminum oxide, silica, silicon dioxide, and titanium dioxide, or mixtures thereof.

In a further aspect, the reinforcing fiber is a carbon fiber. Examples of carbon fibers include, but are not limited to, T300, T300J, T400H, T600S, T700S, T700 G and AS4, which can have diameters ranging from 1 to 10 microns, and IM6, which can have diameters that are approximately 5 microns. Commercially available carbon fibers are provided by, for example, Toray Carbon Fibers North America (Decatur, Ala., USA).

In some aspects, the reinforcing filler has any suitable aspect ratio. The aspect ratio can be 5, 10, 15, 20, 25, 30, 35, 40, 45, 50, 55, 60, 65, 70, 75, 80, 85, 90, 95, 100, 110, 120, 130, 140, 150, 160, 170, 180, 190, 200, 220, 240, 260, 280, 300, 320, 340, 360, 380, 400, 420, 440, 460, 480, 500, 520, 540, 560, 580, 600, 625, 650, 675, 700, 750, 800, 850, 900, 950, or 1000. Each of the foregoing numbers can be preceded by the term "about," "at least about," or "less than about," and any of the foregoing numbers can be used singly to describe an open-ended range or in combination to describe a closed-ended range.

In a further aspect, the reinforcing filler is present in an amount of from about 1 wt % to about 50 wt % of the composition. In a still further aspect, the reinforcing filler is present in an amount of from about 1 wt % to about 35 wt % of the composition. In yet a further aspect, the reinforcing filler is present in an amount of from about 10 wt % to about 50 wt % of the composition. In a further aspect, the reinforcing filler is present in an amount of from about 10 wt % to about 35 wt % of the composition. In a still further aspect, the reinforcing filler is present in an amount of from about 10 wt % to about 30 wt % of the composition. In yet a further aspect, the reinforcing filler is present in an amount of from about 10 wt % to about 25 wt % of the composition. In an even further aspect, the reinforcing filler is present in an amount of from about 10 wt % to about 20 wt % of the composition. In a still further aspect, the reinforcing filler is present in an amount of from about 10 wt % to about 15 wt % of the composition. In yet a further aspect, the reinforcing filler is present in an amount of from about 15 wt % to about 40 wt % of the composition. In an even further aspect, the reinforcing filler is present in an amount of from about 20 wt % to about 40 wt % of the composition. In a still further aspect, the reinforcing filler is present in an amount of from about 25 wt % to about 40 wt % of the composition. In yet a further aspect, the reinforcing filler is present in an amount of from about 30 wt % to about 40 wt % of the composition. In an even further aspect, the reinforcing filler is present in an amount of from about 35 wt % to about 40 wt % of the composition. In a still further aspect, the reinforcing filler is present in an amount of from about 15 wt % to about 35 wt % of the composition. In yet a further aspect, the reinforcing filler is present in an amount of from about 15 wt % to about 30 wt % of the composition. Each of the foregoing numbers can be preceded by the term "about," "at least about," or "less than about," and any of the foregoing numbers can be used singly to describe an open-ended range or in combination to describe a closed-ended range.

In a further aspect, the reinforcing filler is present in an amount of from about 40 wt % to about 80 wt % of the composition. In a still further aspect, the reinforcing filler is present in an amount of from about 40 wt % to about 70 wt % of the composition. In yet a further aspect, the reinforcing filler is present in an amount of from about 40 wt % to about 60 wt % of the composition. In an even further aspect, the reinforcing filler is present in an amount of from about 40 wt % to about 50 wt % of the composition. In a still further aspect, the reinforcing filler is present in an amount of from about 50 wt % to about 80 wt % of the composition. In yet a further aspect, the reinforcing filler is present in an amount of from about 60 wt % to about 80 wt % of the composition. In an even further aspect, the reinforcing filler is present in an amount of from about 70 wt % to about 80 wt % of the composition. In a still further aspect, the reinforcing filler is present in an amount of about 60 wt % of the composition. Each of the foregoing numbers can be preceded by the term "about," "at least about," or "less than about," and any of the foregoing numbers can be used singly to describe an open-ended range or in combination to describe a closed-ended range.

In a further aspect, the composition further comprises a clay. Examples of clay include, but are not limited to, natural clay or synthetic clay, mica, vermiculite, montmorillonite, iron montmorillonite, beidellite, saponite, hectorite, stevensite, and nontronite, or a mixture thereof. In a still further aspect, the clay is hydrophobic. In yet a further aspect, the clay is hectorite.

In a further aspect, wherein the clay is present in an amount of from about 0.05 wt % to about 1.0 wt % of the composition. In a still further aspect, wherein the clay is present in an amount of from about 0.05 wt % to about 0.5 wt % of the composition. In yet a further aspect, wherein the clay is present in an amount of from about 0.05 wt % to about 0.1 wt % of the composition. In an even further aspect, wherein the clay is present in an amount of from about 0.1 wt % to about 1.0 wt % of the composition. In a still further aspect, wherein the clay is present in an amount of from about 0.5 wt % to about 1.0 wt % of the composition. In yet a further aspect, the clay is present in an amount of from about 0.1 wt % to about 0.6 wt % of the composition. Each of the foregoing numbers can be preceded by the term "about," "at least about," or "less than about," and any of the foregoing numbers can be used singly to describe an open-ended range or in combination to describe a closed-ended range.

In a further aspect, the composition further comprises a compatibilizer. Examples of compatibilizers include, but are not limited to, polyethylene, ethylene vinyl acetate, maleic anhydride, citric acid, and ethylene methyl acrylate.

In a further aspect, the compatibilizer is present in an amount of from about 0.01 wt % to about 10 wt % of the composition. In a still further aspect, the compatibilizer is present in an amount of from about 0.01 wt % to about 5 wt % of the composition. In yet a further aspect, the compatibilizer is present in an amount of from about 0.01 wt % to about 1 wt % of the composition. In an even further aspect, the compatibilizer is present in an amount of from about 0.01 wt % to about 0.5 wt % of the composition. In a still further aspect, the compatibilizer is present in an amount of from about 0.01 wt % to about 0.1 wt % of the composition. In yet a further aspect, the compatibilizer is present in an amount of from about 0.1 wt % to about 10 wt % of the composition. In an even further aspect, the compatibilizer is present in an amount of from about 0.5 wt % to about 10 wt % of the composition. In yet a further aspect, the compatibilizer is present in an amount of from about 1 wt % to about 10 wt % of the composition. In an even further aspect, the compatibilizer is present in an amount of from about 5 wt % to about 10 wt % of the composition. Each of the foregoing numbers can be preceded by the term "about," "at least about," or "less than about," and any of the foregoing numbers can be used singly to describe an open-ended range or in combination to describe a closed-ended range.

1. Polymers

In one aspect, the composition comprises a polymer.

In a further aspect, the polymer is a thermoplastic polymer. Examples of thermoplastic polymers include, but are not limited to, natural and synthetic thermoplastic polymers such as, for example, polyolefins, polyesters, polycarbonates, styrene-acrylonitrile copolymers, polyethylene terephthalate, polybutylene terephthalate, polyamides, polystyrene, polystyrene derivatives, polyphenylene oxide, polyoxymethylene, fluorine-containing thermoplastics, and blends thereof. Suitable thermoplastics are also described elsewhere herein.

In a further aspect, the polymer is a thermoset polymer. Examples of thermoset polymers include, but are not limited to, natural and synthetic thermoset polymers such as, for example, urethane formaldehyde, phenol formaldehyde, melamine formaldehyde, unsaturated polyesters, epoxy based polyesters, elastomers such as rubber, and blends thereof. In a further aspect, the thermoplastic polymer is shaped in a pellet.

In a further aspect, the polymer is a polyamide or a polyester or both. In a still further aspect, the polymer is a polyamide. Examples of polyamides include, but are not limited to, PA6, PA46, PA66, PA610, PA612, PA11, and PA12. In an even further aspect, the polyamide is PA6.

In a further aspect, the polymer is a polyester. Examples of polyesters include, but are not limited to, polybutylene terephthalate (PBT), polyethylene terephthalate (PET), polyethylene isophthalate (PEI), PET/PEI copolymer, polyarylate (PAR), polybutylene naphthalate (PBN), liquid crystal polyesters, polybutylene terephthalate/tetraethylene glycol copolymer, and polyoxyalkylenediimide diacid/polybutylene terephthalate copolymer.

In a further aspect, the polymer is present in an amount of from about 60 wt % to about 99 wt % of the composition. In a still further aspect, the polymer is present in an amount of from about 60 wt % to about 95 wt % of the composition. In yet a further aspect, the polymer is present in an amount of from about 65 wt % to about 99 wt % of the composition. In an even further aspect, the polymer is present in an amount of from about 70 wt % to about 99 wt % of the composition. In a further aspect, the polymer is present in an amount of about 70 wt % to about 85 wt % of the composition. In a still further aspect, the polymer is present in an amount of about 70 wt % to about 80 wt % of the composition. In yet a further aspect, the polymer is present in an amount of about 70 wt % to about 75 wt % of the composition. In an even further aspect, the polymer is present in an amount of about 75 wt % to about 90 wt % of the composition. In a still further aspect, the polymer is present in an amount of about 80 wt % to about 90 wt % of the composition. In yet a further aspect, the polymer is present in an amount of about 85 wt % to about 90 wt % of the composition. Each of the foregoing numbers can be preceded by the term "about," "at least about," or "less than about," and any of the foregoing numbers can be used singly to describe an open-ended range or in combination to describe a closed-ended range.

In a further aspect, the polymer is present in an amount of from about 30 wt % to about 60 wt % of the composition. In a still further aspect, the polymer is present in an amount of from about 30 wt % to about 50 wt % of the composition. In yet a further aspect, the polymer is present in an amount of from about 30 wt % to about 40 wt % of the composition. In an even further aspect, the polymer is present in an amount of from about 40 wt % to about 60 wt % of the composition. In a still further aspect, the polymer is present in an amount of from about 50 wt % to about 60 wt % of the composition. Each of the foregoing numbers can be preceded by the term "about," "at least about," or "less than about," and any of the foregoing numbers can be used singly to describe an open-ended range or in combination to describe a closed-ended range.

2. Cellulose Compositions

In one aspect, the composition comprises a cellulose composition.

Without wishing to be bound by theory, the cellulose composition can improve the stress-transfer between the polymer and the reinforcing filler. For example, the cellulose composition can reside at the boundary of the polymer and the reinforcing filler and thereby improve the interfacial adhesion between the two components (i.e., between the polymer and the reinforcing filler). In this way, the cellulose composition can help to transfer energy from the polymer to the filler. In an alternative example, the cellulose composition can be dispersed throughout the thermoplastic composition and thereby improve the adhesion between the two components.

Without wishing to be bound by theory, the incorporation of a cellulose composition can endow the composition with greater modulus using the same volume fraction of reinforcing filler. Alternatively, the incorporation of a cellulose composition can endow the composition with an equivalent modulus, while using a lower volume of reinforcing filler.

In a further aspect, the cellulose composition is a crystalline cellulose. In a still further aspect, the crystalline cellulose is a microcrystalline cellulose (MCC). In yet a further aspect, the crystalline cellulose is a nanocrystalline cellulose (NCC).

In a further aspect, the cellulose composition comprises particles, wherein the particles comprises cellulose, have a $d_{75}$ of less than about 8 microns, have a $d_{50}$ of about 0.5 microns to about 5 microns, have an aspect ratio of about 1 to about 1.5, and have a non-spherical shape, wherein at least a portion of the cellulose is type-II cellulose.

In various aspects, the particles are primary particles; however, without wishing to be bound by theory, the particles may also be in a semi- or fully-agglomerated form.

In a further aspect, the particles have a $d_{75}$ of less than about 10 microns. In a still further aspect, the particles have a $d_{75}$ of less than about 8 microns. In yet a further aspect, the particles have a $d_{75}$ of less than about 6 microns. In an even further aspect, the particles have a $d_{75}$ of less than about 5 microns. In a still further aspect, the particles have a $d_{75}$ of less than about 4 microns. In yet a further aspect, the particles have a $d_{75}$ of less than about 3 microns. In an even further aspect, the particles have a $d_{75}$ of less than about 2 microns. In a still further aspect, the particles have a $d_{75}$ of from about 1 micron to about 8 microns.

In a further aspect, the particles have an aspect ratio of about 1 to about 1.5. In a still further aspect, the particles have an aspect ratio of about 1 to about 1.4. In yet a further aspect, the particles have an aspect ratio of about 1 to about 1.3. In an even further aspect, the particles have an aspect ratio of about 1 to about 1.2. In a still further aspect, the particles have an aspect ratio of about 1 to about 1.1. In yet a further aspect, the particles have an aspect ratio of about 1.1 to about 1.5. In an even further aspect, the particles have an aspect ratio of about 1.2 to about 1.5. In a still further aspect, the particles have an aspect ratio of about 1.3 to about 1.5. In yet a further aspect, the particles have an aspect ratio of about 1.4 to about 1.5.

In a further aspect, at least a portion of the cellulose is type-II cellulose. In a still further aspect, at least 0.01 wt % of the cellulose is type-II cellulose. In yet a further aspect, at least 0.1 wt % of the cellulose is type-II cellulose. In an even further aspect, at least 1 wt % of the cellulose is type-II cellulose. In a still further aspect, at least 5 wt % of the cellulose is type-II cellulose. In yet a further aspect, at least 10 wt % of the cellulose is type-II cellulose. In an even further aspect, at least 10 wt % of the cellulose is type-II cellulose. In a still further aspect, at least 20 wt % of the cellulose is type-II cellulose. In yet a further aspect, at least 30 wt % of the cellulose is type-II cellulose. In an even further aspect, at least 40 wt % of the cellulose is type-II cellulose. In a still further aspect, at least 50 wt % of the cellulose is type-II cellulose. In yet a further aspect, at least 60 wt % of the cellulose is type-II cellulose. In an even further aspect, at least 70 wt % of the cellulose is type-II cellulose. In a still further aspect, at least 80 wt % of the cellulose is type-II cellulose. In yet a further aspect, at least 90 wt % of the cellulose is type-II cellulose. In an even further aspect, at least 95 wt % of the cellulose is type-II cellulose. In a still further aspect, at least 99 wt % of the cellulose is type-II cellulose. In yet a further aspect, the entirety of the cellulose is type-II cellulose. In an even further aspect, about 100 wt % of the cellulose is type-II cellulose. Each of the foregoing numbers can be preceded by the term "about," "at least about," or "less than about," and any of the foregoing numbers can be used singly to describe an open-ended range or in combination to describe a closed-ended range.

In a further aspect, the cellulose composition is dried prior to the combining step. Without wishing to be bound by theory, the cellulose composition can be dried by any method known to one of skill in the art. Preferably, the drying should be done in such a manner that the particles of the cellulose composition are not allowed to agglomerate. Thus, in a still further aspect, dried is via freeze drying, lyophilization, spray drying, nano spray drying, fumed silica drying, supercritical carbon dioxide drying, supercritical anti-solvent drying, clay drying, oven drying, evaporation, vacuum, or a mixture thereof.

In a further aspect, the cellulose composition is present in an amount of from about 0.01 wt % to about 5 wt % of the composition. In a still further aspect, the cellulose composition is present in an amount of from about 0.01 wt % to about 2.5 wt % of the composition. In yet a further aspect, the cellulose composition is present in an amount of from about 0.1 wt % to about 5 wt % of the composition. In a further aspect, the cellulose composition is present in an amount of from about 0.1 wt % to about 2.5 wt % of the composition. In a still further aspect, the cellulose composition is present in an amount of from about 0.1 wt % to about 2.0 wt % of the composition. In yet a further aspect, the cellulose composition is present in an amount of from about 0.1 wt % to about 1.5 wt % of the composition. In an even further aspect, the cellulose composition is present in an amount of from about 0.1 wt % to about 1.0 wt % of the composition. In a still further aspect, the cellulose composition is present in an amount of from about 0.1 wt % to about 0.5 wt % of the composition. In yet a further aspect, the cellulose composition is present in an amount of from about 0.5 wt % to about 2.5 wt % of the composition. In an even further aspect, the cellulose composition is present in an amount of from about 1.0 wt % to about 2.5 wt % of the composition. In a still further aspect, the cellulose composition is present in an amount of from about 1.5 wt % to about 2.5 wt % of the composition. In yet a further aspect, the cellulose composition is present in an amount of from about 2.0 wt % to about 2.5 wt % of the composition. Each of the foregoing numbers can be preceded by the term "about," "at least about," or "less than about," and any of the foregoing numbers can be used singly to describe an open-ended range or in combination to describe a closed-ended range.

In a further aspect, the cellulose composition is present in an amount of from about 0.5 wt % to about 2.0 wt % of the composition. In a still further aspect, the cellulose composition is present in an amount of from about 0.5 wt % to about 1.5 wt % of the composition. In yet a further aspect, the cellulose composition is present in an amount of from about 0.5 wt % to about 1.0 wt % of the composition. In an even further aspect, the cellulose composition is present in an amount of from about 1.0 wt % to about 2.5 wt % of the composition. In a still further aspect, the cellulose composition is present in an amount of from about 1.5 wt % to about 2.5 wt % of the composition. In yet a further aspect, the cellulose composition is present in an amount of from about 2.0 wt % to about 2.5 wt % of the composition. Each of the foregoing numbers can be preceded by the term "about," "at least about," or "less than about," and any of the foregoing numbers can be used singly to describe an open-ended range or in combination to describe a closed-ended range.

a. Particles Comprising Cellulose

In one aspect, the cellulose composition comprises particles, wherein the particles comprise cellulose. The disclosed particles comprising cellulose may be prepared, for example, from the hydrolysis of biomass and other cellulose containing materials, particularly those processes utilizing sub-, near-, or supercritical fluids.

In various aspects, a suitable feedstock as disclosed elsewhere herein is hydrolyzed by contacting with a fluid, and the fluid has a temperature (° C.) of 100, 120, 140, 160, 180, 200, 220, 240, 250, 260, 280, 300, 320, 340, 350, 355, 360, 365, 374, 380, 385, 390, 395, 400, 410, 420, 430, 440, 450, 460, 470, 480, 490, 500, 550, or 575. Each of the foregoing numbers can be preceded by the word "about," "at least about," or "less than about," and any of the foregoing numbers can be used singly to describe an open-ended range or in combination to describe a closed-ended range.

In various aspects, the pressure of the hydrolysis is conducted at a pressure (bar) of 1, 5, 10, 20, 30, 40, 50, 60, 70, 80, 90, 100, 110, 120, 130, 140, 150, 160, 170, 180, 190, 200, 210, 220, 221, 225, 230, 250, 275, 300, 325, 350, 375, 400, 425, 450, 475, 500, 525, 550, 575, 600, 625, 650, 675, 700, 725, 750, 775, or 800. Each of the foregoing numbers can be preceded by the word "about," "at least about," or "less than about," and any of the foregoing numbers can be used singly to describe an open-ended range or in combination to describe a closed-ended range. For example, the pressure can be about 221 bar to about 800 bar, about 230 bar to about 500 bar, about 325 bar to about 750 bar, or about 275 bar to about 350 bar. In various aspects, the pressure may be greater than 800 bar. In some embodiments, the pressure is sufficient to maintain at least a portion or all of the fluid in liquid or supercritical form.

In various aspects, the residence time (seconds) of the hydrolysis is 0.1, 0.2, 0.3, 0.4, 0.5, 0.6, 0.7, 0.8, 0.9, 1.0, 1.1, 1.2, 1.3, 1.4, 1.5, 2.0, 2.5, 3.0, 3.5, 4.0, 4.5, 5.0, 6.0, 7.0, 8.0, 9.0, 10.0, 15, 20, 30, 40, 50, 60, 70, 80, 90, 100, 120, 140, 160, 180, 200, 220, 240, 260, 280, or 300. Each of the foregoing numbers can be preceded by the word "about," "at least about," or "less than about," and any of the foregoing numbers can be used singly to describe an open-ended range or in combination to describe a closed-ended range. For example, the duration can be about 0.1 seconds to about 10 seconds, about 0.1 seconds to about 5 seconds, about 0.1 seconds to about 0.3 seconds, about 1.1 seconds to about 5 seconds, or about 0.9 seconds to about 9 seconds. In various aspects, the duration is greater than 10 seconds. In various aspects, the duration is about 1.4 seconds or less, such as about 0.1 seconds to about 1.4 seconds. In various aspects, where the mixture is subjected to subcritical hydrolysis, the duration (minutes) of the hydrolysis is 0.5, 1, 1.5, 2, 2.5, 3, 3.5, 4, 5, 10, 20, 30, 40, 50, 60, 80, 100, 120, 140, 160, 180, 200, 220, 240, 260, 280, or 300. Each of the foregoing numbers can be preceded by the word "about," "at least about," or "less than about," and any of the foregoing numbers can be used singly to describe an open-ended range or in combination to describe a closed-ended range.

Thus, in various aspects, particles comprising cellulose may be isolated from the mixture resulting from the hydrolysis reaction by one or more of centrifugation, cyclone separation (including hydrocyclone separation), sedimentation, elutriation, aggregation, flocculation, screening, flotation and skimming, and the like, or any combination thereof. Differing cellulose particle fractions are produced according to differing methods of production and isolation.

In various aspects, the hydrolysis is conducted in one step. In various aspects, the hydrolysis in conducted in two steps. In various aspects, the hydrolysis is conducted in three, four, five, or six steps. Reaction conditions for each step can be independently selected from any of the reaction conditions or types of fluids (e.g., sub-, near-, or supercritical) disclosed herein. In various aspects, the hydrolysis is conducted in two steps, where the first step is subcritical or near-critical hydrolysis, and the second step is a supercritical hydrolysis. In various aspects where one step is employed, the one step is carried with a near- or supercritical fluid.

In various aspects, disclosed are particles comprising cellulose. In a further aspect, the particles comprise cellulose in an amount of 44%, 45% 46%, 48%, 50%, 52%, 54%, 56%, 58%, 60%, 62%, 64%, 66%, 68%, 70%, 72%, 74%, 76%, 78%, 80%, 82%, 84%, 86%, 88%, 90%, 92%, 94%, 96%, 98%, 99%, or 100%, based on the total weight of the particles on a dry basis. Each of the foregoing numbers can be preceded by the word "about," "at least about," or "less than about," and any of the foregoing numbers can be used singly to describe an open-ended range or in combination to describe a close-ended range. For example and without limitation, the amount of cellulose in the particles can be at least about 45% by weight, about 45% by weight to about 100% by weight, at least about 99%, or less than about 100%, by weight based on the total weight of the particles on a dry basis.

In various aspects, disclosed are particles comprising type II cellulose. In a further aspect, the particles comprise type II cellulose in an amount of 44%, 45% 46%, 48%, 50%, 52%, 54%, 56%, 58%, 60%, 62%, 64%, 66%, 68%, 70%, 72%, 74%, 76%, 78%, 80%, 82%, 84%, 86%, 88%, 90%, 92%, 94%, 96%, 98%, 99%, or 100%, based on the total weight of the particles on a dry basis. Each of the foregoing numbers can be preceded by the word "about," "at least about," or "less than about," and any of the foregoing numbers can be used singly to describe an open-ended range or in combination to describe a close-ended range. For example and without limitation, the amount of cellulose in the particles can be at least about 45% by weight, about 45% by weight to about 100% by weight, at least about 99%, or less than about 100%, by weight based on the total weight of the particles on a dry basis.

In various aspects, and as readily appreciated by one of ordinary skill in the art, the cellulose particles may comprise a number of crystalline structures. Natural cellulose, known as a type-I cellulose, can comprise $I_\alpha$ and $I_\beta$ structures. The amount of $I_\alpha$ and $I_\beta$ structures depends on the type of the natural cellulose. For example and without limitation, the cellulose produced by bacteria and algae may be enriched in $I_\alpha$, while cellulose of plants consists mainly of $I_\beta$. Type-I cellulose may be converted to a stable crystalline form of cellulose known as a type-II cellulose. The conversion of the type-I cellulose to the type-II cellulose may be achieved by different routes, for example and without limitation, by mercerization (alkali treatment), regeneration (solubilization followed by recrystallization), subcritical and supercritical water, ball milling of cellulose in presence of water and the like. The conversion may be irreversible, suggesting that the type-II cellulose is more stable than type-I cellulose. In a further aspect, additional types of the cellulose may be included. For example, and without limitation, a type-III cellulose and type-IV cellulose may be produced by various chemical treatments, such as treatment with liquid ammonia or certain amides such as ethylene diamine, or high temperature treatment in glycerol. The particles comprising cellulose herein comprise type-II cellulose, in an amount ranging up to 100% of the cellulose. In various aspects, the particles comprising cellulose herein may additionally comprise type-I cellulose.

In a further aspect, the cellulose particles comprise type-I cellulose and type-II cellulose. In a still further aspect, the cellulose particles comprise type-II cellulose and unconverted type-I cellulose. In yet a further aspect, the cellulose particles further comprise lignin. It should be understood that each respective component present in the cellulose particles may be present in any amount relative to the total weight percentage of the cellulose particles. For example, and without limitation, the cellulose particles can comprise type-I cellulose or type-II cellulose in any amount. The amounts described herein can apply to the amount of type-I cellulose in the cellulose particles, the amount of type-II cellulose in the cellulose particles, or the combined amount of type-I cellulose and type-II cellulose in the cellulose particles as will be clear by context. For example, the amount of type-I and/or type-II cellulose in the cellulose particles can be 5%, 10%, 15%, 20%, 25%, 30%, 35%, 40%, 45%, 50%, 55%, 60%, 65%, 70%, 75%, 80%, 85%, 90%, 95%, or 100% by weight. Each of the foregoing numbers can be preceded by the word "about," "at least about," or "less than about," and any of the foregoing numbers can be used singly to describe an open-ended range or in combination to describe a close-ended range. For example, the type-I and/or type-II cellulose can be present in an amount of at least about 35% by weight, about 15% by weight to about 70% by weight, or less than about 80% by weight.

In various aspects, there may be a type-III cellulose, a type-IV cellulose, an amorphous cellulose, or any combination thereof present in the cellulose particles. The numerical weight percent ranges disclosed herein for the type-I cellulose and/or type-II cellulose may be used to describe the amount of any of these additional cellulose types, if present, either alone or in combination with one another as will be clear by context, and weight percent values are based on the total weight of the cellulose particles (i.e., the total weight of all cellulose types, including amorphous if present, making up the cellulose particles on a dry basis).

As one of ordinary skill in the art would readily appreciate, the different crystalline phases of the cellulose may be analyzed using X-ray diffraction (XRD). The specific XRD pattern of a crystalline solid reflects the crystal structure. Using Cu Kα radiation, the XRD spectrum of the type-I cellulose show two peaks at 2θ: a primary peak around 22.5° and a secondary peak around 15.5°. The XRD spectrum of the type-II cellulose shows a primary peak at 2θ around 19.9° and a secondary peak around 12.1°.

In one aspect, at least a portion of the cellulose particles exhibits a degree of crystallinity of 70%, 72%, 74%, 76%, 78%, 80%, 82%, 84%, 86%, 88%, 90%, 92%, 94%, 96%, 98%, 99%, or 100%. Each of the foregoing numbers can be preceded by the word "about," "at least about," or "less than about," and any of the foregoing numbers can be used singly to describe an open-ended range or in combination to describe a close-ended range. For example, the crystallinity can be about at least 90%, about 86% to about 96%, or less than about 88%.

Relative amounts of type-I cellulose, type-II cellulose, and amorphous cellulose can be measured using solid-state $^{13}C$ CP-MAS NMR spectroscopy or XRD. In various aspects, the cellulose particles comprise, consist of, or consist essentially of cellulose having a type-II structure, either alone or in combination with a type-I structure, an amorphous structure, or both. In other words, the cellulose in the particles can be type-II cellulose, either alone or in combination with a type-I cellulose, amorphous cellulose, or both. In various aspects, the ratio of type-I cellulose to type-II cellulose in the cellulose particles, on a dry weight basis, is about 0.5:9.5, 1:9, 1.5:9.5, 2:8, 2.5:7.5, 3:7, 3.5:6.5, 4:6, 4.5:5.5, 5:5, 5.5:4.5, 6:4, 6.5:3.5, 7:3, 7.5:2.5, 8:2, 8.5:1.5, 9:1, or 9.5:0.5. Each of the foregoing numbers can be preceded by the word "about," "at least about," or "less than about," and any of the foregoing numbers can be used singly to describe an open-ended range or in combination to describe a close-ended range. In various aspects, the cellulose particles comprises cellulose, wherein the cellulose is at least 99 wt. % type-II cellulose on a dry basis.

In various aspects, the cellulose particles can comprise type-I and type-II cellulose having any of the ratios herein, and the cellulose particles can further comprise amorphous cellulose. The ratio of amorphous cellulose to total amount of type-I and type-II cellulose, on a dry weight basis, can be 0.5:9.5, 1:9, 1.5:9.5, 2:8, 2.5:7.5, 3:7, 3.5:6.5, 4:6, 4.5:5.5, 5:5, 5.5:4.5, 6:4, 6.5:3.5, 7:3, 7.5:2.5, 8:2, 8.5:1.5, 9:1, or 9.5:0.5. Each of the foregoing numbers can be preceded by the word "about," "at least about," or "less than about," and any of the foregoing numbers can be used singly to describe an open-ended range or in combination to describe a close-ended range.

In various aspects, the cellulose particles can comprise cellulose having a weight-average molecular weight ($M_w$ in g/mol) of 2200, 2400, 2600, 2800, 3000, 3200, 3400, 3500, 3600, 3800, 4000, 4200, 4400, 4500, 5000, 5200, 5400, 5500, 5600, 5800, 6000, 6200, 6400, 6500, 6600, 6800, 7000, 7200, 7400, 7500, 7600, 7800, 8000, 8500, 9000, 9500, 10000, 10500, 11000, 11500, 12000, 12500, 13000, 13500, 14000, 14500, 15000, 15500, 16000, 16500, 17000, 17500, or 18000. Each of the foregoing numbers can be preceded by the word "about," "at least about," or "less than about," and any of the foregoing numbers can be used singly to describe an open-ended range or in combination to describe a close-ended range. For example, the $M_w$ of the cellulose particles can be at least about 4000 g/mol, about 12000 g/mol to about 15500 g/mol, about 6000 g/mol to about 12000 g/mol, about 2200 g/mol to about 9500 g/mol, or less than about 13000 g/mol, as determined on a sample of the cellulose particles that has been prepared for gel-permeation chromatography analysis according to a first condition.

The cellulose particles can have any suitable $M_n$. For example, the $M_n$ (g/mol) can be 2000, 2500, 3000, 3500, 4000, 4500, 5000, 5500, 6000, 6500, 7000, 7500, or 8000. Each of the foregoing numbers can be preceded by the word "about," "at least about," or "less than about," and any of the foregoing numbers can be used singly to describe an open-ended range or in combination to describe a close-ended range. For example, the $M_n$ of the cellulose particles can be at least about 2000 g/mol, about 3000 g/mol to about 5500 g/mol, about 3000 g/mol to about 8000 g/mol, or less than about 7000 g/mol, as determined on a sample of the cellulose particles that has been prepared for gel-permeation chromatography analysis according to a first condition.

The cellulose particles can have any suitable $M_z$. For example, the $M_z$ (g/mol) can be 5000, 5500, 6000, 6500, 7000, 7500, 8000, 8500, 9000, 9500, 10000, 10500, 11000, 11500, 12000, 12500, 13000, 13500, 14000, 14500, 15000, 16000, 17000, 18000, 19000, 20000, 21000, 22000, 23000, 24000, 25000, 26000, 27000, 28000, 29000, 30000, or 40000. Each of the foregoing numbers can be preceded by the word "about," "at least about," or "less than about," and any of the foregoing numbers can be used singly to describe an open-ended range or in combination to describe a close-ended range.

In various aspects, the cellulose particles can comprise cellulose having a degree of polymerization ($DP_w$) of 10, 12, 14, 15, 16, 18, 20, 22, 24, 25, 26, 28, 30, 32, 34, 35, 36, 38, 40, 42, 44, 45, 46, 48, 50, 55, 60, 65, 70, 75, 80, 85, 90, 95, 100, 105, 110, 115, 120, 125, 130, 135, 140, 145, 150. Each of the foregoing numbers can be preceded by the word "about," "at least about," or "less than about," and any of the foregoing numbers can be used singly to describe an open-ended range or in combination to describe a close-ended range. For example and without limitation, the DP can be at least about 16, about 20 to about 95, about 40 to about 80, or less than about 150, as determined on a sample of the cellulose particles that has been prepared for gel-permeation chromatography analysis according to a first condition. DP, as used herein (sometimes termed $DP_w$), is calculated from $M_w$, using the anhydroglucose molar weight of 162 g/mol.

Similarly a $DP_n$ can be calculated from the Mn for the particles comprising cellulose. In various aspects, the cellulose particles can comprise cellulose having a number average degree of polymerization ($DP_n$) of 15, 16, 18, 20, 22, 24, 25, 26, 28, 30, 32, 34, 35, 36, 38, 40, 42, 44, 45, 46, 48, 50, 55, 60, 65, 70, 75, 80, 85, 90, 95, 100, 105, 110, 115, 120, 125, 130, 135, 140, 145, 150. Each of the foregoing numbers can be preceded by the word "about," "at least about," or "less than about," and any of the foregoing numbers can be used singly to describe an open-ended range or in combination to describe a close-ended range. For example and without limitation, the $DP_n$ can be at least about 16, about 20 to about 95, about 25 to about 40, or less than about 150, as determined on a sample of the cellulose particles that has been prepared for gel-permeation chromatography analysis according to a first condition. $DP_n$, as used herein, is calculated from $M_n$, using the anhydroglucose molar weight of 162 g/mol.

The $M_w$, $M_n$, $M_z$, and DP reported herein for the cellulose particles are different than those same parameters measured for microcrystalline cellulose (MCC), when solubilized for GPC measurement according to the first condition. The MCC used in this comparison was Acros Organics, cellulose microcrystalline, extra pure, average particle size 90 μm, product #382310010, and this MCC should be used for comparison purposes if available. If not available, then a comparable MCC should be used for comparison. Accordingly, in various aspects, the cellulose particles herein have an $M_n$ that is 0.05, 0.1, 0.15, 0.2, 0.25, 0.3, 0.35, 0.4, 0.45, 0.5, 0.55, 0.6, 0.65, or 0.7 times the $M_n$ of MCC. In various aspects, the cellulose particles herein have an $M_w$ that is 0.04, 0.02, 0.04, 0.06, 0.08, 0.1, 0.12, 0.14, 0.16, 0.18, 0.2, 0.22, 0.24, 0.26, 0.28, 0.3, 0.32, 0.34, 0.36, 0.38, 0.4, 0.42, 0.44, 0.46, 0.48, or 0.5 times the $M_w$ of MCC. In various aspects, the cellulose particles herein have an $M_z$ that is 0.01, 0.02, 0.03, 0.04, 0.05, 0.06, 0.07, 0.08, 0.09, 0.1, 0.12, 0.14, 0.15, 0.16, 0.18, 0.2, 0.22, 0.24, 0.26, 0.28, 0.3, 0.32, 0.34, or 0.36 times the $M_z$ of MCC. In various aspects, the cellulose particles herein have DP that is 0.04, 0.02, 0.04, 0.06, 0.08, 0.1, 0.12, 0.14, 0.16, 0.18, 0.2, 0.22, 0.24, 0.26, 0.28, 0.3, 0.32, 0.34, 0.36, 0.38, 0.4, 0.42, 0.44, 0.46, 0.48, or 0.5 times the DP of MCC. Each of the foregoing numbers relating to the comparison of $M_w$, $M_n$, $M_z$ and DP for MCC and cellulose particles can be preceded by "about," "at least about," or "less than about," and any of the foregoing numbers can be used singly to describe an open-ended range or in combination to describe a close-ended range. For example, the cellulose particles have an $M_w$ that is less than about 0.5 times the $M_w$ of MCC.

The particles comprising cellulose can have any suitable PDI. For example, the PDI can be 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, or 2.8. Each of the foregoing numbers can be preceded by the word "about," "at least about," or "less than about," and any of the foregoing numbers can be used singly to describe an open-ended range or in combination to describe a close-ended range.

In certain aspects, the disclosed particles comprising cellulose additionally comprise lignin. In certain aspects, lignin is present in an amount (weight %, dry basis) of 0, 1, 2, 3, 4, 5, 6, 7, 8, 9, 10, 11, 12, 3, 14, 15, 6, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 62, 64, 66, 68, 70, 72, 74, 76, 78, or 80. Each of the foregoing numbers can be preceded by the word "about," "at least about," or "less than about," and any of the foregoing numbers can be used singly to describe an open-ended range or in combination to describe a close-ended range. For example, lignin can be present in an amount of at least about 4% by weight, about 10% by weight to about 26% by weight, or less than about 5% by weight. In various aspects, the particles comprise about 0% by weight lignin, based on the weight of the particles on a dry basis.

Particle sizes are measured and reported herein using a Beckman Coulter LS 13 320 Laser Diffraction Particle Size Analyzer instrument with Universal Liquid Module attached (referred to herein as the Beckman Coulter Particle Sizer). One of ordinary skill in the art would understand how to prepare samples for particle size analysis with the Beckman Coulter Particle Sizer. While the Beckman Coulter Particle Sizer is preferred for measuring particle size, if such an instrument is not available, a different instrument known to one of ordinary skill in the art to have comparable measurement results should be employed. Samples for analysis should be prepared in a manner that enables the particles to be analyzed with the instrument. The following sample preparation is illustrative: (i) ensure a solids content of at least 3 wt. %, based on total suspension weight; (ii) heat the suspension at 45+/−5° C. for 1 hour; and (iii) blend the suspension for 60 seconds at about 12,000 rpm. This sample should then be stirred to form a homogeneous suspension immediately before injection into the Universal Solutions Module of the instrument. The standard software accompanying the Beckman Coulter Particle Sizer provides instructions for use of the instrument and sample preparation.

Light scattering is a commonly used technique for particle size determination for a suspension of particles in a liquid and particle sizes are generally reported herein in terms of $d_{(n)}$. The value $d_{(n)}$ represents the particle size at which (n) percentage of the sample, ranked by volume, is smaller. For example, the quantity $d_{(100)}$ represents the particle size at which 100% of the sample is smaller. The quantity $d_{(90)}$ represents the particle size at which 90% of the sample is smaller. The quantity $d_{(50)}$ represents the particle size at which 50% of the sample is smaller. The quantity $d_{(25)}$ represents the particle size at which 25% of the sample is smaller. The quantity $d_{(10)}$ represents the particle size at which 10% of the sample is smaller.

The particles comprising cellulose disclosed herein may have any desired particle size distribution characteristics. Particle size distributions typically include values of $d_{(n)}$, where (n) represents a volume percentage such as 5, 10, 15, 20, 25, 30, 35, 40, 45, 50, 55, 60, 65, 70, 75, 80, 85, 90, 95, or 100, at which (n) percentage of the volume is smaller. The particle size distribution can refer either to the cellulose particles in an agglomerated state or a non-agglomerated state, as will be clear from context. If an agglomeration state is not referred to, then the particle size refers to the non-agglomerated state of the particles (i.e., the size of the primary particles).

In exemplary and non-limiting aspects, the particles comprising cellulose have a particle size distribution with a $d_{10}$ (μm) of 0.3, 0.35, 0.4, 0.45, 0.5, 0.55, 0.6, 0.65, 0.7, 0.75, 0.8, 0.85, 0.9, 0.95, 1.0, 1.1, 1.2, 1.3, 1.4, 1.5, 1.6, 1.7, 1.8, 1.9, 2.0. Each of the foregoing numbers can be preceded by the word "about," "at least about," or "less than about," and any of the foregoing numbers can be used singly to describe an open-ended range or in combination to describe a close-ended range. For example, the $d_{10}$ can be at least about 0.3 μm, about 0.6 μm, about 0.4 μm to about 0.7 μm, or less than about 1.0 μm.

In various aspects, the particles comprising cellulose have a particle size distribution with a $d_{50}$ (μm) of 0.4, 0.5, 0.6, 0.7, 0.8, 0.9, 1.0, 1.1, 1.2, 1.3, 1.4, 1.5, 1.6, 1.7, 1.8. 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0. Each of the foregoing numbers can be preceded by the word "about," "at least about," or "less than about," and any of the foregoing numbers can be used singly to describe an open-ended range or in combination to describe a close-ended range. For example, the $d_{50}$ can be at least about 0.5 μm about 1.4 μm about 1.0 μm to about 1.6 μm, about 0.7 to about 1.2 μm, or less than about 2.0 μm.

In various aspects, the particles comprising cellulose have a particle size distribution with a $d_{75}$ (μm) of 0.5, 0.6, 0.7, 0.8, 0.9, 1.0, 1.1, 1.2, 1.3, 1.4, 1.5, 1.6, 1.7, 1.8. 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.5, 6.0, 6.5, 7.0, 7.5, or 8.0. Each of the foregoing numbers can be preceded by the word "about," "at least about," or "less than about," and any of the foregoing numbers can be used singly to describe an open-ended range or in combination to describe a close-ended range. For example, the $d_{75}$ can be at least about 0.7 μm, about 3.0 μm, about 0.8 μm to about 3.0 μm, about 0.5 μm to about 6 μm, or less than about 4.0 μm.

In various aspects, the particles comprising cellulose have a particle size distribution with a $d_{90}$ (μm) of 0.5, 0.6, 0.7, 0.8, 0.9, 1.0, 1.1, 1.2, 1.3, 1.4, 1.5, 1.6, 1.7, 1.8. 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.5, 9.0, 9.5, or 10. Each of the foregoing numbers can be preceded by the word "about," "at least about," or "less than about," and any of the foregoing numbers can be used singly to describe an open-ended range or in combination to describe a close-ended range. For example, the $d_{90}$ can be at least about 0.8 μm, about 6.2 μm, about 1.0 μm to about 7.5 μm, about 0.5 μm to about 10 μm, or less than about 8.0 μm.

In certain aspects, the particles comprising cellulose are characterized by transmission electron microscopy or scanning electron microscopy, in which the particle shape and aspect ratios can be readily visualized and calculated. In various aspects, aspect ratios for the particles comprising cellulose can be 1, 1.1, 1.2, 1.3, 1.4, or 1.5. Each of the foregoing numbers can be preceded by the word "about," "at least about," or "less than about," and any of the foregoing numbers can be used singly to describe an open-ended range or in combination to describe a close-ended range. For example, the aspect ratio can be about 1.2, about 1.1 to about 1.4, or about 1.4 or less. In various aspects, the aspect ratio is not greater than 1.5. In various aspects, particle shape can be irregular, globular, or the like. In various aspects, the particle shape is not needle-like, rectangular, or the like.

In certain aspects, suspensions (e.g., aqueous and/or organic solvent) of the particles comprising cellulose disclosed herein can have a solids content (%) of 4, 5, 6, 7, 8, 9, 10, 11, 12, 13, 14, 15, 16, 17, 18, 19, 20, 21, 22, 23, 24, 25, 26, 27, 28, 28, 30, 31, 32, 33, 34, 35, 36, 37, 38, 39, 40, 41, 42, 43, 44, 45, 46, 47, 48, 49, or 50. Each of the foregoing numbers can be preceded by the word "about," "at least about," or "less than about," and any of the foregoing numbers can be used singly to describe an open-ended range or in combination to describe a close-ended range. In certain aspects, the suspension has a solids content of at least about 15%, about 16% to about 20%, or less than about 40%. In various aspects, the suspension has a solids content of about 20% to about 40%.

In certain aspects, a cellulose composition is provided comprising particles comprising cellulose as disclosed herein and further comprising a resuspending agent adsorbed or bonded to at least a portion of the surface of the particles. In certain aspects, suspensions of such compositions may be dried and the dried compositions can have a solids content (%) of 90, 90.5, 91, 91.5, 92, 92.5, 93, 93.5, 94, 94.5, 95, 95.5, 96, 96.5, 97, 97.5, 98, 98.5, 99, 99.5, or 100. Each of the foregoing numbers can be preceded by the word "about," "at least about," or "less than about," and any of the foregoing numbers can be used singly to describe an open-ended range or in combination to describe a close-ended range. In certain aspects, the cellulose particles have a solids content of at least about 98.5%, about 97% to about 99%, or at least about 95%. In various aspects, the cellulose particles have a solids content of about 92% to about 93.5%. In various aspects, the cellulose particles have a solids content of at least about 95%. As used herein, "adsorbed" means the resuspending agent is in contact with at least a portion of the surface of the particles and, in various aspects, may be (but need not be) held to the surface through hydrogen bonding, van der Waals forces, or a combination thereof. As used herein, "bonded" means the resuspending agent is covalently bonded to at least a portion of the surface of the particles. In various aspects, the resuspending agent may be both adsorbed and bonded to the surface, for example, where a portion (or portions) of the agent is (are) adsorbed to the surface, and another portion (or portions) is (are) bonded to the surface.

3. Reinforcing Fillers

In one aspect, the composition comprises a reinforcing filler. In a further aspect, the reinforcing filler is selected from a glass fiber, a mineral filler, a carbon fiber, an aramide filler, a polymer filler, and any combination thereof. In a still further aspect, the reinforcing filler is selected from glass beads, glass fiber, glass flakes, mica, talc, clay, wollastonite, zinc sulfide, zinc oxide, carbon fiber, ceramic-coated graphite, and titanium dioxide.

In a further aspect, the reinforcing fiber is a glass fiber. Examples of glass fibers include, but are not limited to, E-glass and S-glass. E-glass is a low alkali, aluminum-borosilicate composition with excellent electrical properties and good strength and modulus. S-glass is a magnesium-aluminosilicate composition with considerably higher strength and modulus. In a still further aspect, the glass fiber is E-glass. In yet a further aspect, the glass fiber is a chopped strand. In an even further aspect, the glass fiber is a continuous fiber product.

In a further aspect, the reinforcing fiber is a mineral filler. Examples of mineral fillers include, but are not limited to, barytes, barium sulfate, asbestos, barite, diatomite, feldspar, gypsum, hormite, kaolin, mica, nepheline syenite, perlite, phyrophyllite, smectite, talc, vermiculite, zeolite, calcite, calcium carbonate, wollastonite, calcium metasilicate, clay, aluminum silicate, talc, magnesium aluminum silicate, hydrated alumina, hydrated aluminum oxide, silica, silicon dioxide, and titanium dioxide, or mixtures thereof.

In a further aspect, the reinforcing fiber is a carbon fiber. Examples of carbon fibers include, but are not limited to, T300, T300J, T400H, T600S, T700S, T700 G and AS4, which can have diameters ranging from 1 to 10 microns, and IM6, which can have diameters that are approximately 5 microns. Commercially available carbon fibers are provided by, for example, Toray Carbon Fibers North America (Decatur, Ala., USA). Any combination of carbon fibers can be employed.

In some aspects, the reinforcing filler has any suitable aspect ratio. The aspect ratio can be 5, 10, 15, 20, 25, 30, 35, 40, 45, 50, 55, 60, 65, 70, 75, 80, 85, 90, 95, 100, 110, 120, 130, 140, 150, 160, 170, 180, 190, 200, 220, 240, 260, 280, 300, 320, 340, 360, 380, 400, 420, 440, 460, 480, 500, 520, 540, 560, 580, 600, 625, 650, 675, 700, 750, 800, 850, 900, 950, or 1000. Each of the foregoing numbers can be preceded by the term "about," "at least about," or "less than about," and any of the foregoing numbers can be used singly to describe an open-ended range or in combination to describe a closed-ended range.

In a further aspect, the reinforcing filler is present in an amount of from about 1 wt % to about 50 wt % of the composition. In a still further aspect, the reinforcing filler is present in an amount of from about 1 wt % to about 40 wt % of the composition. In yet a further aspect, the reinforcing filler is present in an amount of from about 10 wt % to about 50 wt % of the composition. In a further aspect, the reinforcing filler is present in an amount of from about 10 wt % to about 40 wt % of the composition. In a further aspect, the reinforcing filler is present in an amount of from about 10 wt % to about 35 wt % of the composition. In a still further aspect, the reinforcing filler is present in an amount of from about 10 wt % to about 30 wt % of the composition. In yet a further aspect, the reinforcing filler is present in an amount of from about 10 wt % to about 25 wt % of the composition. In an even further aspect, the reinforcing filler is present in an amount of from about 10 wt % to about 20 wt % of the composition. In a still further aspect, the reinforcing filler is present in an amount of from about 10 wt % to about 15 wt % of the composition. In yet a further aspect, the reinforcing filler is present in an amount of from about 15 wt % to about 40 wt % of the composition. In an even further aspect, the reinforcing filler is present in an amount of from about 20 wt % to about 40 wt % of the composition. In a still further aspect, the reinforcing filler is present in an amount of from about 25 wt % to about 40 wt % of the composition. In yet a further aspect, the reinforcing filler is present in an amount of from about 30 wt % to about 40 wt % of the composition. In an even further aspect, the reinforcing filler is present in an amount of from about 35 wt % to about 40 wt % of the composition. In a still further aspect, the reinforcing filler is present in an amount of from about 15 wt % to about 35 wt % of the composition. In yet a further aspect, the reinforcing filler is present in an amount of from about 15 wt % to about 30 wt % of the composition. Each of the foregoing numbers can be preceded by the term "about," "at least about," or "less than about," and any of the foregoing numbers can be used singly to describe an open-ended range or in combination to describe a closed-ended range.

In a further aspect, the reinforcing filler is present in an amount of from about 40 wt % to about 80 wt % of the composition. In a still further aspect, the reinforcing filler is present in an amount of from about 40 wt % to about 70 wt % of the composition. In yet a further aspect, the reinforcing filler is present in an amount of from about 40 wt % to about 60 wt % of the composition. In an even further aspect, the reinforcing filler is present in an amount of from about 40 wt % to about 50 wt % of the composition. In a still further aspect, the reinforcing filler is present in an amount of from about 50 wt % to about 80 wt % of the composition. In yet a further aspect, the reinforcing filler is present in an amount of from about 60 wt % to about 80 wt % of the composition. In an even further aspect, the reinforcing filler is present in an amount of from about 70 wt % to about 80 wt % of the composition. In a still further aspect, the reinforcing filler is present in an amount of about 60 wt % of the composition. Each of the foregoing numbers can be preceded by the term "about," "at least about," or "less than about," and any of the foregoing numbers can be used singly to describe an open-ended range or in combination to describe a closed-ended range.

4. Additional Components

In one aspect, the masterbatch composition further comprises an additional component such as, for example, a clay, or a compatibilizer, or both. In one aspect, the composition further comprises an additional component such as, for example, a clay, or a compatibilizer, or both.

Thus, in one aspect a disclosed masterbatch composition or a disclosed composition further comprises a clay. Examples of clay include, but are not limited to, natural clay or synthetic clay, mica, vermiculite, montmorillonite, iron montmorillonite, beidellite, saponite, hectorite, stevensite, and nontronite, or a mixture thereof. In a still further aspect, the clay is hydrophobic. In yet a further aspect, the clay is hectorite.

In a further aspect, the clay is present in an amount of from about 5 wt % to about 15 wt % of the masterbatch composition. In a still further aspect, the clay is present in an amount of from about 10 wt % to about 15 wt % of the masterbatch composition. In yet a further aspect, the clay is present in an amount of from about 5 wt % to about 10 wt % of the masterbatch composition. In an even further aspect, the clay is present in an amount of about 10 wt % of the masterbatch composition. Each of the foregoing numbers can be preceded by the term "about," "at least about," or "less than about," and any of the foregoing numbers can be used singly to describe an open-ended range or in combination to describe a closed-ended range.

In a further aspect, the clay is present in an amount of from about 0.05 wt % to about 1.0 wt % of the composition. In a still further aspect, the clay is present in an amount of from about 0.1 wt % to about 1.0 wt % of the composition. In yet a further aspect, the clay is present in an amount of from about 0.5 wt % to about 1.0 wt % of the composition. In an even further aspect, the clay is present in an amount of from about 0.05 wt % to about 0.5 wt % of the composition. In a still further aspect, the clay is present in an amount of from about 0.05 wt % to about 0.1 wt % of the composition. In yet a further aspect, the clay is present in an amount of from about 0.05 wt % to about 0.5 wt % of the composition. In an even further aspect, the clay is present in an amount of from about 0.05 wt % to about 0.1 wt % of the composition. In a still further aspect, the clay is present in an amount of from about 0.1 wt % to about 0.6 wt % of the composition. Each of the foregoing numbers can be preceded by the term "about," "at least about," or "less than about," and any of the foregoing numbers can be used singly to describe an open-ended range or in combination to describe a closed-ended range.

Thus, in one aspect a disclosed composition further comprises a compatibilizer. Examples of compatibilizers include, but are not limited to, polyethylene, ethylene vinyl acetate, maleic anhydride, citric acid, ethylene methyl acrylate, or any combination thereof.

In a further aspect, the compatibilizer is present in an amount of from about 0.01 wt % to about 10 wt % of the composition. In a still further aspect, the compatibilizer is present in an amount of from about 0.01 wt % to about 5 wt % of the composition. In yet a further aspect, the compatibilizer is present in an amount of from about 0.01 wt % to about 1 wt % of the composition. In an even further aspect, the compatibilizer is present in an amount of from about 0.01 wt % to about 0.5 wt % of the composition. In a still further aspect, the compatibilizer is present in an amount of from about 0.01 wt % to about 0.1 wt % of the composition. In yet a further aspect, the compatibilizer is present in an amount of from about 0.1 wt % to about 10 wt % of the composition. In an even further aspect, the compatibilizer is present in an amount of from about 0.5 wt % to about 10 wt % of the composition. In yet a further aspect, the compatibilizer is present in an amount of from about 1 wt % to about 10 wt % of the composition. In an even further aspect, the compatibilizer is present in an amount of from about 5 wt % to about 10 wt % of the composition. Each of the foregoing numbers can be preceded by the term "about," "at least about," or "less than about," and any of the foregoing numbers can be used singly to describe an open-ended range or in combination to describe a closed-ended range.

F. Masterbatch Compositions

In one aspect, disclosed are masterbatch compositions prepared by a disclosed method. In one aspect, the disclosed composition comprises a disclosed masterbatch composition.

1. Thermoplastic Polymers

In one aspect, the masterbatch composition comprises a thermoplastic polymer. Examples of thermoplastic polymers include, but are not limited to, natural and synthetic thermoplastic polymers such as, for example, polyolefins, polyesters, polycarbonates, styrene-acrylonitrile co-thermoplastic polymers, polyethylene terephthalate, polybutylene terephthalate, polyamides, polystyrene, polystyrene derivatives, polyphenylene oxide, polyoxymethylene, fluorine-containing thermoplastics, and blends thereof. Suitable thermoplastics are also described elsewhere herein.

In a further aspect, the thermoplastic polymer is a polyamide (PA) or a polyester or both. In a still further aspect, the thermoplastic polymer is a polyamide. Examples of polyamides include, but are not limited to, PA6, PA46, PA66, PA610, PA612, PA11, and PA12. In an even further aspect, the polyamide is PA6.

In a further aspect, the thermoplastic polymer is a polyester. Examples of polyesters include, but are not limited to, polybutylene terephthalate (PBT), polyethylene terephthalate (PET), polyethylene isophthalate (PEI), PET/PEI co-thermoplastic polymer, polyarylate (PAR), polybutylene naphthalate (PBN), liquid crystal polyesters, polybutylene terephthalate/tetraethylene glycol co-thermoplastic polymer, and polyoxyalkylenediimide diacid/polybutylene terephthalate co-thermoplastic polymer.

In a further aspect, the thermoplastic polymer is shaped in a pellet.

In a further aspect, the thermoplastic polymer is present in an amount of from about 60 wt % to about 99 wt % of the masterbatch composition. In a still further aspect, the thermoplastic polymer is present in an amount of from about 60 wt % to about 95 wt % of the masterbatch composition. In yet a further aspect, the thermoplastic polymer is present in an amount of from about 65 wt % to about 99 wt % of the masterbatch composition. In an even further aspect, the thermoplastic polymer is present in an amount of from about 70 wt % to about 99 wt % of the masterbatch composition. In a further aspect, the thermoplastic polymer in an amount of from about 70 wt % to about 95 wt % of the masterbatch composition. In a still further aspect, the thermoplastic polymer in an amount of from about 70 wt % to about 90 wt % of the masterbatch composition. In yet a further aspect, the thermoplastic polymer in an amount of from about 70 wt % to about 85 wt % of the masterbatch composition. In an even further aspect, the thermoplastic polymer in an amount of from about 70 wt % to about 80 wt % of the masterbatch composition. In a still further aspect, the thermoplastic polymer in an amount of from about 70 wt % to about 75 wt % of the masterbatch composition. In yet a further aspect, the thermoplastic polymer in an amount of from about 75 wt % to about 95 wt % of the masterbatch composition. In an even further aspect, the thermoplastic polymer in an amount of from about 80 wt % to about 95 wt % of the masterbatch composition. In a still further aspect, the thermoplastic polymer in an amount of from about 85 wt % to about 95 wt % of the masterbatch composition. In yet a further aspect, the thermoplastic polymer in an amount of from about 90 wt % to about 95 wt % of the masterbatch composition. In an even further aspect, the thermoplastic polymer in an amount of from about 75 wt % to about 90 wt % of the masterbatch composition. In a still further aspect, the thermoplastic polymer in an amount of from about 75 wt % to about 85 wt % of the masterbatch composition. In yet a further aspect, the thermoplastic polymer is present in an amount of about 80 wt % of the masterbatch composition. Each of the foregoing numbers can be preceded by the term "about," "at least about," or "less than about," and any of the foregoing numbers can be used singly to describe an open-ended range or in combination to describe a closed-ended range.

2. Cellulose Compositions

In one aspect, the masterbatch composition comprises a cellulose composition.

Without wishing to be bound by theory, the cellulose composition can improve the stress-transfer between the polymer and the reinforcing filler. For example, the cellulose composition can reside at the boundary of the polymer and the reinforcing filler and thereby improve the interfacial adhesion between the two components (i.e., between the polymer and the reinforcing filler). In this way, the cellulose composition can help to transfer energy from the polymer to the filler. In an alternative example, the cellulose composition can be dispersed throughout the thermoplastic composition and thereby improve the adhesion between the two components.

Without wishing to be bound by theory, the incorporation of a cellulose composition can endow the composition with greater modulus using the same volume fraction of reinforcing filler. Alternatively, the incorporation of a cellulose composition can endow the composition with an equivalent modulus, while using a lower volume of reinforcing filler.

In a further aspect, the cellulose composition is a crystalline cellulose. In a still further aspect, the crystalline cellulose is a microcrystalline cellulose (MCC). In yet a further aspect, the crystalline cellulose is a nanocrystalline cellulose (NCC).

In a further aspect, the cellulose composition comprises particles, wherein the particles comprises cellulose, have a $d_{75}$ of less than about 8 microns, have a $d_{50}$ of about 0.5 microns to about 5 microns, have an aspect ratio of about 1 to about 1.5, and have a non-spherical shape, wherein at least a portion of the cellulose is type-II cellulose.

In various aspects, the particles are primary particles; however, without wishing to be bound by theory, the particles may also be in a semi- or fully-agglomerated form.

In a further aspect, the particles have a $d_{75}$ of less than about 10 microns. In a still further aspect, the particles have a $d_{75}$ of less than about 8 microns. In yet a further aspect, the particles have a $d_{75}$ of less than about 6 microns. In an even further aspect, the particles have a $d_{75}$ of less than about 5 microns. In a still further aspect, the particles have a $d_{75}$ of less than about 4 microns. In yet a further aspect, the particles have a $d_{75}$ of less than about 3 microns. In an even further aspect, the particles have a $d_{75}$ of less than about 2 microns. In a still further aspect, the particles have a $d_{75}$ of from about 1 micron to about 8 microns. Each of the foregoing numbers can be preceded by the term "about," "at least about," or "less than about," and any of the foregoing numbers can be used singly to describe an open-ended range or in combination to describe a closed-ended range.

In a further aspect, the particles have an aspect ratio of about 1 to about 1.5. In a still further aspect, the particles have an aspect ratio of about 1 to about 1.4. In yet a further aspect, the particles have an aspect ratio of about 1 to about 1.3. In an even further aspect, the particles have an aspect ratio of about 1 to about 1.2. In a still further aspect, the particles have an aspect ratio of about 1 to about 1.1. In yet a further aspect, the particles have an aspect ratio of about 1.1 to about 1.5. In an even further aspect, the particles have an aspect ratio of about 1.2 to about 1.5. In a still further aspect, the particles have an aspect ratio of about 1.3 to about 1.5. In yet a further aspect, the particles have an aspect ratio of about 1.4 to about 1.5. Each of the foregoing numbers can be preceded by the term "about," "at least about," or "less than about," and any of the foregoing numbers can be used singly to describe an open-ended range or in combination to describe a closed-ended range.

In a further aspect, at least a portion of the cellulose is type-II cellulose. In a still further aspect, at least 0.01 wt % of the cellulose is type-II cellulose. In yet a further aspect, at least 0.1 wt % of the cellulose is type-II cellulose. In an even further aspect, at least 1 wt % of the cellulose is type-II cellulose. In a still further aspect, at least 5 wt % of the cellulose is type-II cellulose. In yet a further aspect, at least 10 wt % of the cellulose is type-II cellulose. In an even further aspect, at least 10 wt % of the cellulose is type-II cellulose. In a still further aspect, at least 20 wt % of the cellulose is type-II cellulose. In yet a further aspect, at least 30 wt % of the cellulose is type-II cellulose. In an even further aspect, at least 40 wt % of the cellulose is type-II cellulose. In a still further aspect, at least 50 wt % of the cellulose is type-II cellulose. In yet a further aspect, at least 60 wt % of the cellulose is type-II cellulose. In an even further aspect, at least 70 wt % of the cellulose is type-II cellulose. In a still further aspect, at least 80 wt % of the cellulose is type-II cellulose. In yet a further aspect, at least 90 wt % of the cellulose is type-II cellulose. In an even further aspect, at least 95 wt % of the cellulose is type-II cellulose. In a still further aspect, at least 99 wt % of the cellulose is type-II cellulose. In yet a further aspect, the entirety of the cellulose is type-II cellulose. In an even further aspect, about 100 wt % of the cellulose is type-II cellulose. Each of the foregoing numbers can be preceded by the term "about," "at least about," or "less than about," and any of the foregoing numbers can be used singly to describe an open-ended range or in combination to describe a closed-ended range.

In a further aspect, the cellulose composition is dried prior to the combining step. Without wishing to be bound by theory, the cellulose composition can be dried by any method known to one of skill in the art. Preferably, the drying should be done in such a manner that the particles of the cellulose composition are not allowed to agglomerate. Thus, in a still further aspect, dried is via freeze drying, lyophilization, spray drying, nano spray drying, fumed silica drying, supercritical carbon dioxide drying, supercritical anti-solvent drying, clay drying, oven drying, evaporation, vacuum, or a mixture thereof.

In a further aspect, the cellulose composition is present in an amount of from about 1 wt % to about 40 wt % of the masterbatch composition. In a still further aspect, the cellulose composition is present in an amount of from about 1 wt % to about 30 wt % of the masterbatch composition. In yet a further aspect, the cellulose composition is present in an amount of from about 5 wt % to about 40 wt % of the masterbatch composition. In a further aspect, the cellulose composition is present in an amount of from about 5 wt % to about 30 wt % of the masterbatch composition. In a still further aspect, the cellulose composition is present in an amount of from about 5 wt % to about 25 wt % of the masterbatch composition. In yet a further aspect, the cellulose composition is present in an amount of from about 5 wt % to about 20 wt % of the masterbatch composition. In an even further aspect, the cellulose composition is present in an amount of from about 5 wt % to about 15 wt % of the masterbatch composition. In a still further aspect, the cellulose composition is present in an amount of from about 5 wt % to about 10 wt % of the masterbatch composition. In yet a further aspect, the cellulose composition is present in an amount of from about 10 wt % to about 30 wt % of the masterbatch composition. In an even further aspect, the cellulose composition is present in an amount of from about 15 wt % to about 30 wt % of the masterbatch composition. In a still further aspect, the cellulose composition is present in an amount of from about 20 wt % to about 30 wt % of the masterbatch composition. In yet a further aspect, the cellulose composition is present in an amount of from about 25 wt % to about 30 wt % of the masterbatch composition. In an even further aspect, the cellulose composition is present in an amount of from about 5 wt % to about 30 wt % of the masterbatch composition. In a still further aspect, the cellulose composition is present in an amount of from about 10 wt % to about 25 wt % of the masterbatch composition. In yet a further aspect, the cellulose composition is present in an amount of from about 15 wt % to about 25 wt % of the masterbatch composition. In an even further aspect, the cellulose composition is present in an amount of about 10 wt % of the masterbatch composition. In a still further aspect, the cellulose composition is present in an amount of about 20 wt % of the masterbatch composition. Each of the foregoing numbers can be preceded by the term "about," "at least about," or "less than about," and any of the foregoing numbers can be used singly to describe an open-ended range or in combination to describe a closed-ended range.

a. Particles Comprising Cellulose

In one aspect, the cellulose composition comprises particles, wherein the particles comprise cellulose. The disclosed particles comprising cellulose may be prepared, for example, from the hydrolysis of biomass and other cellulose containing materials, particularly those processes utilizing sub-, near-, or supercritical fluids.

In various aspects, a suitable feedstock as disclosed elsewhere herein is hydrolyzed by contacting with a fluid, and the fluid has a temperature (° C.) of 100, 120, 140, 160, 180, 200, 220, 240, 250, 260, 280, 300, 320, 340, 350, 355, 360, 365, 374, 380, 385, 390, 395, 400, 410, 420, 430, 440, 450, 460, 470, 480, 490, 500, 550, or 575. Each of the foregoing numbers can be preceded by the word "about," "at least about," or "less than about," and any of the foregoing numbers can be used singly to describe an open-ended range or in combination to describe a closed-ended range.

In various aspects, the pressure of the hydrolysis is conducted at a pressure (bar) of 1, 5, 10, 20, 30, 40, 50, 60, 70, 80, 90, 100, 110, 120, 130, 140, 150, 160, 170, 180, 190, 200, 210, 220, 221, 225, 230, 250, 275, 300, 325, 350, 375, 400, 425, 450, 475, 500, 525, 550, 575, 600, 625, 650, 675, 700, 725, 750, 775, or 800. Each of the foregoing numbers can be preceded by the word "about," "at least about," or "less than about," and any of the foregoing numbers can be used singly to describe an open-ended range or in combination to describe a closed-ended range. For example, the pressure can be about 221 bar to about 800 bar, about 230 bar to about 500 bar, about 325 bar to about 750 bar, or about 275 bar to about 350 bar. In various aspects, the pressure may be greater than 800 bar. In some embodiments, the pressure is sufficient to maintain at least a portion or all of the fluid in liquid or supercritical form.

In various aspects, the residence time (seconds) of the hydrolysis is 0.1, 0.2, 0.3, 0.4, 0.5, 0.6, 0.7, 0.8, 0.9, 1.0, 1.1, 1.2, 1.3, 1.4, 1.5, 2.0, 2.5, 3.0, 3.5, 4.0, 4.5, 5.0, 6.0, 7.0, 8.0, 9.0, 10.0, 15, 20, 30, 40, 50, 60, 70, 80, 90, 100, 120, 140, 160, 180, 200, 220, 240, 260, 280, or 300. Each of the foregoing numbers can be preceded by the word "about," "at least about," or "less than about," and any of the foregoing numbers can be used singly to describe an open-ended range or in combination to describe a closed-ended range. For example, the duration can be about 0.1 seconds to about 10 seconds, about 0.1 seconds to about 5 seconds, about 0.1 seconds to about 0.3 seconds, about 1.1 seconds to about 5 seconds, or about 0.9 seconds to about 9 seconds. In various aspects, the duration is greater than 10 seconds. In various aspects, the duration is about 1.4 seconds or less, such as about 0.1 seconds to about 1.4 seconds. In various aspects, where the mixture is subjected to subcritical hydrolysis, the duration (minutes) of the hydrolysis is 0.5, 1, 1.5, 2, 2.5, 3, 3.5, 4, 5, 10, 20, 30, 40, 50, 60, 80, 100, 120, 140, 160, 180, 200, 220, 240, 260, 280, or 300. Each of the foregoing numbers can be preceded by the word "about," "at least about," or "less than about," and any of the foregoing numbers can be used singly to describe an open-ended range or in combination to describe a closed-ended range.

Thus, in various aspects, particles comprising cellulose may be isolated from the mixture resulting from the hydrolysis reaction by one or more of centrifugation, cyclone separation (including hydrocyclone separation), sedimentation, elutriation, aggregation, flocculation, screening, flotation and skimming, and the like, or any combination thereof. Differing cellulose particle fractions are produced according to differing methods of production and isolation.

In various aspects, the hydrolysis is conducted in one step. In various aspects, the hydrolysis in conducted in two steps. In various aspects, the hydrolysis is conducted in three, four, five, or six steps. Reaction conditions for each step can be independently selected from any of the reaction conditions or types of fluids (e.g., sub-, near-, or supercritical) disclosed herein. In various aspects, the hydrolysis is conducted in two steps, where the first step is subcritical or near-critical hydrolysis, and the second step is a supercritical hydrolysis. In various aspects where one step is employed, the one step is carried with a near- or supercritical fluid.

In various aspects, disclosed are particles comprising cellulose. In a further aspect, the particles comprise cellulose in an amount of 44%, 45% 46%, 48%, 50%, 52%, 54%, 56%, 58%, 60%, 62%, 64%, 66%, 68%, 70%, 72%, 74%, 76%, 78%, 80%, 82%, 84%, 86%, 88%, 90%, 92%, 94%, 96%, 98%, 99%, or 100%, based on the total weight of the particles on a dry basis. Each of the foregoing numbers can be preceded by the word "about," "at least about," or "less than about," and any of the foregoing numbers can be used singly to describe an open-ended range or in combination to describe a close-ended range. For example and without limitation, the amount of cellulose in the particles can be at least about 45% by weight, about 45% by weight to about 100% by weight, at least about 99%, or less than about 100%, by weight based on the total weight of the particles on a dry basis.

In various aspects, disclosed are particles comprising type II cellulose. In a further aspect, the particles comprise type II cellulose in an amount of 44%, 45% 46%, 48%, 50%, 52%, 54%, 56%, 58%, 60%, 62%, 64%, 66%, 68%, 70%, 72%, 74%, 76%, 78%, 80%, 82%, 84%, 86%, 88%, 90%, 92%, 94%, 96%, 98%, 99%, or 100%, based on the total weight of the particles on a dry basis. Each of the foregoing numbers can be preceded by the word "about," "at least about," or "less than about," and any of the foregoing numbers can be used singly to describe an open-ended range or in combination to describe a close-ended range. For example and without limitation, the amount of cellulose in the particles can be at least about 45% by weight, about 45% by weight to about 100% by weight, at least about 99%, or less than about 100%, by weight based on the total weight of the particles on a dry basis.

In various aspects, and as readily appreciated by one of ordinary skill in the art, the cellulose particles may comprise a number of crystalline structures. Natural cellulose, known as a type-I cellulose, can comprise $I_\alpha$ and $I_\beta$ structures. The amount of $I_\alpha$ and $I_\beta$ structures depends on the type of the natural cellulose. For example and without limitation, the cellulose produced by bacteria and algae may be enriched in $I_\alpha$, while cellulose of plants consists mainly of $I_\beta$. Type-I cellulose may be converted to a stable crystalline form of cellulose known as a type-II cellulose. The conversion of the type-I cellulose to the type-II cellulose may be achieved by different routes, for example and without limitation, by mercerization (alkali treatment), regeneration (solubilization followed by recrystallization), subcritical and supercritical water, ball milling of cellulose in presence of water and the like. The conversion may be irreversible, suggesting that the type-II cellulose is more stable than type-I cellulose. In a further aspect, additional types of the cellulose may be included. For example, and without limitation, a type-III cellulose and type-IV cellulose may be produced by various chemical treatments, such as treatment with liquid ammonia or certain amides such as ethylene diamine, or high temperature treatment in glycerol. The particles comprising cellulose herein comprise type-II cellulose, in an amount ranging up to 100% of the cellulose. In various aspects, the particles comprising cellulose herein may additionally comprise type-I cellulose.

In a further aspect, the cellulose particles comprise type-I cellulose and type-II cellulose. In a still further aspect, the cellulose particles comprise type-II cellulose and unconverted type-I cellulose. In yet a further aspect, the cellulose particles further comprise lignin. It should be understood that each respective component present in the cellulose particles may be present in any amount relative to the total weight percentage of the cellulose particles. For example, and without limitation, the cellulose particles can comprise type-I cellulose or type-II cellulose in any amount. The amounts described herein can apply to the amount of type-I cellulose in the cellulose particles, the amount of type-II cellulose in the cellulose particles, or the combined amount of type-I cellulose and type-II cellulose in the cellulose particles as will be clear by context. For example, the amount of type-I and/or type-II cellulose in the cellulose particles can be 5%, 10%, 15%, 20%, 25%, 30%, 35%, 40%, 45%, 50%, 55%, 60%, 65%, 70%, 75%, 80%, 85%, 90%, 95%, or 100% by weight. Each of the foregoing numbers can be preceded by the word "about," "at least about," or "less than about," and any of the foregoing numbers can be used singly to describe an open-ended range or in combination to describe a close-ended range. For example, the type-I and/or type-II cellulose can be present in an amount of at least about 35% by weight, about 15% by weight to about 70% by weight, or less than about 80% by weight.

In various aspects, there may be a type-III cellulose, a type-IV cellulose, an amorphous cellulose, or any combination thereof present in the cellulose particles. The numerical weight percent ranges disclosed herein for the type-I cellulose and/or type-II cellulose may be used to describe the amount of any of these additional cellulose types, if present, either alone or in combination with one another as will be clear by context, and weight percent values are based on the total weight of the cellulose particles (i.e., the total weight of all cellulose types, including amorphous if present, making up the cellulose particles on a dry basis).

As one of ordinary skill in the art would readily appreciate, the different crystalline phases of the cellulose may be analyzed using X-ray diffraction (XRD). The specific XRD pattern of a crystalline solid reflects the crystal structure. Using Cu Kα radiation, the XRD spectrum of the type-I cellulose show two peaks at 2θ: a primary peak around 22.5° and a secondary peak around 15.5°. The XRD spectrum of the type-II cellulose shows a primary peak at 2θ around 19.9° and a secondary peak around 12.1°.

In one aspect, at least a portion of the cellulose particles exhibits a degree of crystallinity of 70%, 72%, 74%, 76%, 78%, 80%, 82%, 84%, 86%, 88%, 90%, 92%, 94%, 96%, 98%, 99%, or 100%. Each of the foregoing numbers can be preceded by the word "about," "at least about," or "less than about," and any of the foregoing numbers can be used singly to describe an open-ended range or in combination to describe a close-ended range. For example, the crystallinity can be about at least 90%, about 86% to about 96%, or less than about 88%.

Relative amounts of type-I cellulose, type-II cellulose, and amorphous cellulose can be measured using solid-state $^{13}$C CP-MAS NMR spectroscopy or XRD. In various aspects, the cellulose particles comprise, consist of, or consist essentially of cellulose having a type-II structure, either alone or in combination with a type-I structure, an amorphous structure, or both. In other words, the cellulose in the particles can be type-II cellulose, either alone or in combination with a type-I cellulose, amorphous cellulose, or both. In various aspects, the ratio of type-I cellulose to type-II cellulose in the cellulose particles, on a dry weight basis, is about 0.5:9.5, 1:9, 1.5:9.5, 2:8, 2.5:7.5, 3:7, 3.5:6.5, 4:6, 4.5:5.5, 5:5, 5.5:4.5, 6:4, 6.5:3.5, 7:3, 7.5:2.5, 8:2, 8.5:1.5, 9:1, or 9.5:0.5. Each of the foregoing numbers can be preceded by the word "about," "at least about," or "less than about," and any of the foregoing numbers can be used singly to describe an open-ended range or in combination to describe a close-ended range. In various aspects, the cellulose particles comprises cellulose, wherein the cellulose is at least 99 wt. % type-II cellulose on a dry basis.

In various aspects, the cellulose particles can comprise type-I and type-II cellulose having any of the ratios herein, and the cellulose particles can further comprise amorphous cellulose. The ratio of amorphous cellulose to total amount of type-I and type-II cellulose, on a dry weight basis, can be 0.5:9.5, 1:9, 1.5:9.5, 2:8, 2.5:7.5, 3:7, 3.5:6.5, 4:6, 4.5:5.5, 5:5, 5.5:4.5, 6:4, 6.5:3.5, 7:3, 7.5:2.5, 8:2, 8.5:1.5, 9:1, or 9.5:0.5. Each of the foregoing numbers can be preceded by the word "about," "at least about," or "less than about," and any of the foregoing numbers can be used singly to describe an open-ended range or in combination to describe a close-ended range.

In various aspects, the cellulose particles can comprise cellulose having a weight-average molecular weight ($M_w$ in g/mol) of 2200, 2400, 2600, 2800, 3000, 3200, 3400, 3500, 3600, 3800, 4000, 4200, 4400, 4500, 4600, 4800, 5000, 5200, 5400, 5500, 5600, 5800, 6000, 6200, 6400, 6500, 6600, 6800, 7000, 7200, 7400, 7500, 7600, 7800, 8000, 8500, 9000, 9500, 10000, 10500, 11000, 11500, 12000, 12500, 13000, 13500, 14000, 14500, 15000, 15500, 16000, 16500, 17000, 17500, or 18000. Each of the foregoing numbers can be preceded by the word "about," "at least about," or "less than about," and any of the foregoing numbers can be used singly to describe an open-ended range or in combination to describe a close-ended range. For example, the $M_w$ of the cellulose particles can be at least about 4000 g/mol, about 12000 g/mol to about 15500 g/mol, about 6000 g/mol to about 12000 g/mol, about 2200 g/mol to about 9500 g/mol, or less than about 13000 g/mol, as determined on a sample of the cellulose particles that has been prepared for gel-permeation chromatography analysis according to a first condition.

The cellulose particles can have any suitable $M_n$. For example, the $M_n$ (g/mol) can be 2000, 2500, 3000, 3500, 4000, 4500, 5000, 5500, 6000, 6500, 7000, 7500, or 8000. Each of the foregoing numbers can be preceded by the word "about," "at least about," or "less than about," and any of the foregoing numbers can be used singly to describe an open-ended range or in combination to describe a close-ended range. For example, the $M_n$ of the cellulose particles can be at least about 2000 g/mol, about 3000 g/mol to about 5500 g/mol, about 3000 g/mol to about 8000 g/mol, or less than about 7000 g/mol, as determined on a sample of the cellulose particles that has been prepared for gel-permeation chromatography analysis according to a first condition.

The cellulose particles can have any suitable $M_z$. For example, the $M_z$ (g/mol) can be 5000, 5500, 6000, 6500, 7000, 7500, 8000, 8500, 9000, 9500, 10000, 10500, 11000, 11500, 12000, 12500, 13000, 13500, 14000, 14500, 15000, 16000, 17000, 18000, 19000, 20000, 21000, 22000, 23000, 24000, 25000, 26000, 27000, 28000, 29000, 30000, or 40000. Each of the foregoing numbers can be preceded by the word "about," "at least about," or "less than about," and any of the foregoing numbers can be used singly to describe an open-ended range or in combination to describe a close-ended range.

In various aspects, the cellulose particles can comprise cellulose having a degree of polymerization ($DP_w$) of 10, 12, 14, 15, 16, 18, 20, 22, 24, 25, 26, 28, 30, 32, 34, 35, 36, 38, 40, 42, 44, 45, 46, 48, 50, 55, 60, 65, 70, 75, 80, 85, 90, 95, 100, 105, 110, 115, 120, 125, 130, 135, 140, 145, 150. Each of the foregoing numbers can be preceded by the word "about," "at least about," or "less than about," and any of the foregoing numbers can be used singly to describe an open-ended range or in combination to describe a close-ended range. For example and without limitation, the DP can be at least about 16, about 20 to about 95, about 40 to about 80, or less than about 150, as determined on a sample of the cellulose particles that has been prepared for gel-permeation chromatography analysis according to a first condition. DP, as used herein (sometimes termed $DP_w$), is calculated from $M_w$, using the anhydroglucose molar weight of 162 g/mol.

Similarly a $DP_n$ can be calculated from the Mn for the particles comprising cellulose. In various aspects, the cellulose particles can comprise cellulose having a number average degree of polymerization ($DP_n$) of 15, 16, 18, 20, 22, 24, 25, 26, 28, 30, 32, 34, 35, 36, 38, 40, 42, 44, 45, 46, 48, 50, 55, 60, 65, 70, 75, 80, 85, 90, 95, 100, 105, 110, 115, 120, 125, 130, 135, 140, 145, 150. Each of the foregoing numbers can be preceded by the word "about," "at least about," or "less than about," and any of the foregoing numbers can be used singly to describe an open-ended range or in combination to describe a close-ended range. For example and without limitation, the $DP_n$ can be at least about 16, about 20 to about 95, about 25 to about 40, or less than about 150, as determined on a sample of the cellulose particles that has been prepared for gel-permeation chromatography analysis according to a first condition. $DP_n$, as used herein, is calculated from $M_n$, using the anhydroglucose molar weight of 162 g/mol.

The $M_w$, $M_n$, $M_z$, and DP reported herein for the cellulose particles are different than those same parameters measured for microcrystalline cellulose (MCC), when solubilized for GPC measurement according to the first condition. The MCC used in this comparison was Acros Organics, cellulose microcrystalline, extra pure, average particle size 90 µm, product #382310010, and this MCC should be used for comparison purposes if available. If not available, then a comparable MCC should be used for comparison. Accordingly, in various aspects, the cellulose particles herein have an $M_n$ that is 0.05, 0.1, 0.15, 0.2, 0.25, 0.3, 0.35, 0.4, 0.45, 0.5, 0.55, 0.6, 0.65, or 0.7 times the $M_n$ of MCC. In various aspects, the cellulose particles herein have an $M_w$ that is 0.04, 0.02, 0.04, 0.06, 0.08, 0.1, 0.12, 0.14, 0.16, 0.18, 0.2, 0.22, 0.24, 0.26, 0.28, 0.3, 0.32, 0.34, 0.36, 0.38, 0.4, 0.42, 0.44, 0.46, 0.48, or 0.5 times the $M_w$ of MCC. In various aspects, the cellulose particles herein have an $M_z$ that is 0.01, 0.02, 0.03, 0.04, 0.05, 0.06, 0.07, 0.08, 0.09, 0.1, 0.12, 0.14, 0.15, 0.16, 0.18, 0.2, 0.22, 0.24, 0.26, 0.28, 0.3, 0.32, 0.34, or 0.36 times the $M_z$ of MCC. In various aspects, the cellulose particles herein have DP that is 0.04, 0.02, 0.04, 0.06, 0.08, 0.1, 0.12, 0.14, 0.16, 0.18, 0.2, 0.22, 0.24, 0.26, 0.28, 0.3, 0.32, 0.34, 0.36, 0.38, 0.4, 0.42, 0.44, 0.46, 0.48, or 0.5 times the DP of MCC. Each of the foregoing numbers relating to the comparison of $M_w$, $M_n$, $M_z$ and DP for MCC and cellulose particles can be preceded by "about," "at least about," or "less than about," and any of the foregoing numbers can be used singly to describe an open-ended range or in combination to describe a close-ended range. For example, the cellulose particles have an $M_w$ that is less than about 0.5 times the $M_w$ of MCC.

The particles comprising cellulose can have any suitable PDI. For example, the PDI can be 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, or 2.8. Each of the foregoing numbers can be preceded by the word "about," "at least about," or "less than about," and any of the foregoing numbers can be used singly to describe an open-ended range or in combination to describe a close-ended range.

In certain aspects, the disclosed particles comprising cellulose additionally comprise lignin. In certain aspects, lignin is present in an amount (weight %, dry basis) of 0, 1, 2, 3, 4, 5, 6, 7, 8, 9, 10, 11, 12, 3, 14, 15, 6, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 62, 64, 66, 68, 70, 72, 74, 76, 78, or 80. Each of the foregoing numbers can be preceded by the word "about," "at least about," or "less than about," and any of the foregoing numbers can be used singly to describe an open-ended range or in combination to describe a close-ended range. For example, lignin can be present in an amount of at least about 4% by weight, about 10% by weight to about 26% by weight, or less than about 5% by weight. In various aspects, the particles comprise about 0% by weight lignin, based on the weight of the particles on a dry basis.

Particle sizes are measured and reported herein using a Beckman Coulter LS 13 320 Laser Diffraction Particle Size Analyzer instrument with Universal Liquid Module attached (referred to herein as the Beckman Coulter Particle Sizer). One of ordinary skill in the art would understand how to prepare samples for particle size analysis with the Beckman Coulter Particle Sizer. While the Beckman Coulter Particle Sizer is preferred for measuring particle size, if such an instrument is not available, a different instrument known to one of ordinary skill in the art to have comparable measurement results should be employed. Samples for analysis should be prepared in a manner that enables the particles to be analyzed with the instrument. The following sample preparation is illustrative: (i) ensure a solids content of at least 3 wt. %, based on total suspension weight; (ii) heat the suspension at 45+/−5° C. for 1 hour; and (iii) blend the suspension for 60 seconds at about 12,000 rpm. This sample should then be stirred to form a homogeneous suspension immediately before injection into the Universal Solutions Module of the instrument. The standard software accompanying the Beckman Coulter Particle Sizer provides instructions for use of the instrument and sample preparation.

Light scattering is a commonly used technique for particle size determination for a suspension of particles in a liquid and particle sizes are generally reported herein in terms of $d_{(n)}$. The value $d_{(n)}$ represents the particle size at which (n) percentage of the sample, ranked by volume, is smaller. For example, the quantity $d_{(100)}$ represents the particle size at which 100% of the sample is smaller. The quantity $d_{(90)}$ represents the particle size at which 90% of the sample is smaller. The quantity $d_{(50)}$ represents the particle size at which 50% of the sample is smaller. The quantity $d_{(25)}$ represents the particle size at which 25% of the sample is smaller. The quantity $d_{(10)}$ represents the particle size at which 10% of the sample is smaller.

The particles comprising cellulose disclosed herein may have any desired particle size distribution characteristics. Particle size distributions typically include values of $d_{(n)}$, where (n) represents a volume percentage such as 5, 10, 15, 20, 25, 30, 35, 40, 45, 50, 55, 60, 65, 70, 75, 80, 85, 90, 95, or 100, at which (n) percentage of the volume is smaller. The particle size distribution can refer either to the cellulose particles in an agglomerated state or a non-agglomerated state, as will be clear from context. If an agglomeration state is not referred to, then the particle size refers to the non-agglomerated state of the particles (i.e., the size of the primary particles).

In exemplary and non-limiting aspects, the particles comprising cellulose have a particle size distribution with a $d_{(10)}$ (µm) of 0.3, 0.35, 0.4, 0.45, 0.5, 0.55, 0.6, 0.65, 0.7, 0.75, 0.8, 0.85, 0.9, 0.95, 1.0, 1.1, 1.2, 1.3, 1.4, 1.5, 1.6, 1.7, 1.8, 1.9, 2.0. Each of the foregoing numbers can be preceded by the word "about," "at least about," or "less than about," and any of the foregoing numbers can be used singly to describe an open-ended range or in combination to describe a close-ended range. For example, the $d_{10}$ can be at least about 0.3 µm, about 0.6 µm, about 0.4 µm to about 0.7 µm, or less than about 1.0 µm.

In various aspects, the particles comprising cellulose have a particle size distribution with a $d_{50}$ (µm) of 0.4, 0.5, 0.6, 0.7, 0.8, 0.9, 1.0, 1.1, 1.2, 1.3, 1.4, 1.5, 1.6, 1.7, 1.8. 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0. Each of the foregoing numbers can be preceded by the word "about," "at least about," or "less than about," and any of the foregoing numbers can be used singly to describe an open-ended range or in combination to describe a close-ended range. For example, the $d_{50}$ can be at least about 0.5 µm, about 1.4 µm, about 1.0 µm to about 1.6 µm, about 0.7 to about 1.2 µm, or less than about 2.0 µm.

In various aspects, the particles comprising cellulose have a particle size distribution with a $d_{75}$ (µm) of 0.5, 0.6, 0.7, 0.8, 0.9, 1.0, 1.1, 1.2, 1.3, 1.4, 1.5, 1.6, 1.7, 1.8. 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.5, 6.0, 6.5, 7.0, 7.5, or 8.0. Each of the foregoing numbers can be preceded by the word "about," "at least about," or "less than about," and any of the foregoing numbers can be used singly to describe an open-ended range or in combination to describe a close-ended range. For example, the $d_{75}$ can be at least about 0.7 µm, about 3.0 µm, about 0.8 µm to about 3.0 µm, about 0.5 µm to about 6 µm, or less than about 4.0 µm.

In various aspects, the particles comprising cellulose have a particle size distribution with a $d_{90}$ (µm) of 0.5, 0.6, 0.7, 0.8, 0.9, 1.0, 1.1, 1.2, 1.3, 1.4, 1.5, 1.6, 1.7, 1.8. 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.5, 9.0, 9.5, or 10. Each of the foregoing numbers can be preceded by the word "about," "at least about," or "less than about," and any of the foregoing numbers can be used singly to describe an open-ended range or in combination to describe a close-ended range. For example, the $d_{90}$ can be at least about 0.8 µm, about 6.2 µm, about 1.0 µm to about 7.5 µm, about 0.5 µm to about 10 µm, or less than about 8.0 µm.

In certain aspects, the particles comprising cellulose are characterized by transmission electron microscopy or scanning electron microscopy, in which the particle shape and aspect ratios can be readily visualized and calculated. In various aspects, aspect ratios for the particles comprising cellulose can be 1, 1.1, 1.2, 1.3, 1.4, or 1.5. Each of the foregoing numbers can be preceded by the word "about," "at least about," or "less than about," and any of the foregoing numbers can be used singly to describe an open-ended range or in combination to describe a close-ended range. For example, the aspect ratio can be about 1.2, about 1.1 to about 1.4, or about 1.4 or less. In various aspects, the aspect ratio is not greater than 1.5. In various aspects, particle shape can be irregular, globular, or the like. In various aspects, the particle shape is not needle-like, rectangular, or the like.

In certain aspects, suspensions (e.g., aqueous and/or organic solvent) of the particles comprising cellulose disclosed herein can have a solids content (%) of 4, 5, 6, 7, 8, 9, 10, 11, 12, 13, 14, 15, 16, 17, 18, 19, 20, 21, 22, 23, 24, 25, 26, 27, 28, 28, 30, 31, 32, 33, 34, 35, 36, 37, 38, 39, 40, 41, 42, 43, 44, 45, 46, 47, 48, 49, or 50. Each of the foregoing numbers can be preceded by the word "about," "at least about," or "less than about," and any of the foregoing numbers can be used singly to describe an open-ended range or in combination to describe a close-ended range. In certain aspects, the suspension has a solids content of at least about 15%, about 16% to about 20%, or less than about 40%. In various aspects, the suspension has a solids content of about 20% to about 40%.

In certain aspects, a cellulose composition is provided comprising particles comprising cellulose as disclosed herein and further comprising a resuspending agent adsorbed or bonded to at least a portion of the surface of the particles. In certain aspects, suspensions of such compositions may be dried and the dried compositions can have a solids content (%) of 90, 90.5, 91, 91.5, 92, 92.5, 93, 93.5, 94, 94.5, 95, 95.5, 96, 96.5, 97, 97.5, 98, 98.5, 99, 99.5, or 100. Each of the foregoing numbers can be preceded by the word "about," "at least about," or "less than about," and any of the foregoing numbers can be used singly to describe an open-ended range or in combination to describe a close-ended range. In certain aspects, the cellulose particles have a solids content of at least about 98.5%, about 97% to about 99%, or at least about 95%. In various aspects, the cellulose particles have a solids content of about 92% to about 93.5%. In various aspects, the cellulose particles have a solids content of at least about 95%. As used herein, "adsorbed" means the resuspending agent is in contact with at least a portion of the surface of the particles and, in various aspects, may be (but need not be) held to the surface through hydrogen bonding, van der Waals forces, or a combination thereof. As used herein, "bonded" means the resuspending agent is covalently bonded to at least a portion of the surface of the particles. In various aspects, the resuspending agent may be both adsorbed and bonded to the surface, for example, where a portion (or portions) of the agent is (are) adsorbed to the surface, and another portion (or portions) is (are) bonded to the surface.

G. Articles formed from the Compositions

In one aspect, disclosed are articles prepared by a disclosed method. In a further aspect, disclosed are articles formed from a disclosed composition. In a still further aspect, forming is via injection molding, stretch blow molding, extrusion, thermoforming, or extrusion blow molding. In yet a further aspect, forming is via sheet or film extrusion. In an even further aspect, the article is shaped as a body part for a vehicle.

In various aspects, the disclosed articles can have various properties that provide the superior function of the articles, including improved impact strength, tensile strength, Young's modulus, elongation at the break, flexural strength, and flexural modulus of elasticity, and/or density. It is also understood that the articles have other properties. In various aspects, the disclosed articles can have the same properties (e.g., improved impact strength, tensile strength, Young's modulus, elongation at the break, flexural strength, and flexural modulus of elasticity) as a reference article at lower loadings of the reinforcing filler (e.g., better strength to weight ratio or lower density).

In various aspects, the disclosed articles, formed from a disclosed composition, can have superior properties, e.g., modulus, compared to a reference article formed from a reference composition that contains the same volume fraction of a reinforcing filler as the disclosed composition. Alternatively, in various aspects, the disclosed articles, formed from a disclosed composition, can have equivalent properties, e.g., modulus, compared to a reference article formed from a reference composition that contains a greater volume fraction of a reinforcing filler than the disclosed composition. Thus, for example, the modulus of a disclosed article can be increased while the amount of reinforcing filler remains the same compared to prior art articles or the modulus of a disclosed article may remain the same while the amount of reinforcing filler is decreased compared to prior articles. In this way, a lower part density would be achieved.

Thus, in various aspects, the article exhibits an impact strength at least about 10% higher than an impact strength of a reference article formed from a reference composition that does not contain a cellulose composition, as determined by a Charpy impact test, for example, ISO 179. In a further aspect, the article exhibits an impact strength at least about 8% higher than an impact strength of a reference article formed from a reference composition that does not contain a cellulose composition. In a still further aspect, the article exhibits an impact strength at least about 5% higher than an impact strength of a reference article formed from a reference composition that does not contain a cellulose composition. In yet a further aspect, the article exhibits an impact strength at least about 1% higher than an impact strength of a reference article formed from a reference composition that does not contain a cellulose composition. In an even further aspect, the article exhibits an impact strength higher than an impact strength of a reference article formed from a reference composition that does not contain a cellulose composition.

Thus, in various aspects, the article exhibits a tensile strength at least about 10% higher than a tensile strength of a reference article formed from a reference composition that does not contain a cellulose composition, as determined by a Tensile test, such as ISO 527. In a further aspect, the article exhibits a tensile strength at least about 15% higher than a tensile strength of a reference article formed from a reference composition that does not contain a cellulose composition. In a still further aspect, the article exhibits a tensile strength at least about 20% higher than a tensile strength of a reference article formed from a reference composition that does not contain a cellulose composition. In yet a further aspect, the article exhibits a tensile strength at least about 30% higher than a tensile strength of a reference article formed from a reference composition that does not contain a cellulose composition. In an even further aspect, the article exhibits a tensile strength higher than a tensile strength of a reference article formed from a reference composition that does not contain a cellulose composition.

Thus, in various aspects, the article exhibits a Young's modulus at least about 10% higher than a Young's modulus of a reference article formed from a reference composition that does not contain a cellulose composition, as determined by a Tensile test, such as ISO 527. In a further aspect, the article exhibits a Young's modulus at least about 15% higher than a Young's modulus of a reference article formed from a reference composition that does not contain a cellulose composition. In a still further aspect, the article exhibits a Young's modulus at least about 20% higher than a Young's modulus of a reference article formed from a reference composition that does not contain a cellulose composition. In yet a further aspect, the article exhibits a Young's modulus at least about 30% higher than a Young's modulus of a reference article formed from a reference composition that does not contain a cellulose composition. In an even further aspect, the article exhibits a Young's modulus higher than a Young's modulus of a reference article formed from a reference composition that does not contain a cellulose composition.

Thus, in various aspects, the article exhibits a flexural strength at least about 10% higher than a flexural strength of a reference article formed from a reference composition that does not contain a cellulose composition, as determined by flexural testing by ISO 178. In a further aspect, the article exhibits a flexural strength at least about 8% higher than a flexural strength of a reference article formed from a reference composition that does not contain a cellulose composition. In a still further aspect, the article exhibits a flexural strength at least about 5% higher than a flexural strength of a reference article formed from a reference composition that does not contain a cellulose composition. In yet a further aspect, the article exhibits a flexural strength at least about 1% higher than a flexural strength of a reference article formed from a reference composition that does not contain a cellulose composition. In an even further aspect, the article exhibits a flexural strength higher than a flexural strength of a reference article formed from a reference composition that does not contain a cellulose composition.

Thus, in various aspects, the article exhibits a flexural modulus of elasticity at least about 10% higher than a flexural modulus of elasticity of a reference article formed from a reference composition that does not contain a cellulose composition, as determined by flexural testing by ISO 178. In a further aspect, the article exhibits a flexural modulus of elasticity at least about 8% higher than a flexural modulus of elasticity of a reference article formed from a reference composition that does not contain a cellulose composition. In a still further aspect, the article exhibits a flexural modulus of elasticity at least about 5% higher than a flexural modulus of elasticity of a reference article formed from a reference composition that does not contain a cellulose composition. In yet a further aspect, the article exhibits a flexural modulus of elasticity at least about 1% higher than a flexural modulus of elasticity of a reference article formed from a reference composition that does not contain a cellulose composition. In an even further aspect, the article exhibits a flexural modulus of elasticity higher than a flexural modulus of elasticity of a reference article formed from a reference composition that does not contain a cellulose composition.

Thus, in various aspects, the article is at least about 10% less dense than a reference article formed from a reference composition that does not contain a cellulose composition, as determined by ISO 1183. In a further aspect, the article is at least about 8% less dense than a reference article formed from a reference composition that does not contain a cellulose composition. In a still further aspect, the article is at least about 5% less dense than a reference article formed from a reference composition that does not contain a cellulose composition. In yet a further aspect, the article is at least about 1% less dense than a reference article formed from a reference composition that does not contain a cellulose composition. In an even further aspect, the article is less dense than a reference article formed from a reference composition that does not contain a cellulose composition.

H. Examples

Glass-reinforced composites are ubiquitous amongst industrial applications ranging from sports equipment to automotive components. Introducing 30 to 33 wt % chopped glass fiber has been the convention to achieve modulus (stiffness) for decades, but tends to be done at the expense of ductility and density (part weight). Recent applications are pushing the limits of thermoplastics and are targeting improvements in those same deficiencies. For example, automotive original equipment manufacturers (OEMs) are obliged to meet pending miles per gallon (MPG) minimum legislation and are taking weight off their fleets as part of the remedy. Here, particles comprising cellulose (dry) have been evaluated as a stiffness synergist by working in concert with conventional glass to meet modulus specifications with less overall inorganic content, thus lowering the density. Without wishing to be bound by theory, this concept is thought to apply across thermoplastics and thermosets using various reinforcing fillers.

The following examples are put forth so as to provide those of ordinary skill in the art with a complete disclosure and description of how the compositions and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

1. Preparation of the Cellulose Particles

In this example, the cellulose particles were formed from biomass using a two-step process. The first step produced a digested steam exploded (DSE) biomass. An aqueous slurry of size-reduced biomass was subjected to digestion in a horizontal screw digester at a temperature of about 180-205° C. for a period of about 20-30 minutes under a pressure sufficient to keep all of the fluid in liquid form (generally less than about 20 bar). The product from digestion was run through a steam mixing screw and horizontal screw digester, this time at a temperature of about 190-240° C. and at a pressure of less than about 35 bar for about 5-30 minutes residence time. The biomass was discharged through a blow line, causing the pressure to rapidly drop and the biomass to explode into smaller particles (steam explosion). The DSE material was used as the feed to a supercritical hydrolysis reactor for the second step. In that reactor, an aqueous slurry of DSE biomass was subjected to a temperature of about 350-420° C. for a period of less than about 10 sec under a pressure sufficient to keep the fluid in liquid or supercritical form (generally less than about 250 bar). The resulting mixture from hydrolysis was cooled via a series of flash cooling steps to a temperature of about 60-100° C. and then filtered to separate the liquid (predominantly gluco-oligo-saccharides, GOS) from the solids (predominantly lignin and cellulosic polysaccharide solids). The lignin and cellulosic polysaccharide solids were separated using one or more hydrocyclones and/or centrifuges. The particles comprising cellulose were recovered as the hydrocyclone overs as a slurry or suspension, which was further dewatered by centrifugation to produce a stable suspension having a maximum solids content of about 16-25% and a median average particle size of about 1.0 µm ($d_{(50)}$ of about 1 µm as measured by the Beckman Coulter Particle Sizer). The following particle size data was obtained for the cellulose particles obtained from four separate preparations (Table 1):

TABLE 1

| | Particle Size Distribution (µm) | | | | | | |
|---|---|---|---|---|---|---|---|
| | $d_{(10)}$ | $d_{(25)}$ | $d_{(50)}$ | $d_{(75)}$ | $d_{(90)}$ | Mean | Median |
| Sample A Particle Size (µm) | 0.55 | 0.71 | 0.99 | 1.38 | 1.92 | 1.2 | 0.99 |
| Sample B Particle Size (µm) | 0.52 | 0.64 | 0.85 | 1.13 | 1.44 | 0.92 | 0.85 |
| Sample C Particle Size (µm) | 0.52 | 0.66 | 0.91 | 1.33 | 2.27 | 1.2 | 0.91 |
| Sample D Particle Size (µm) | 0.52 | 0.66 | 0.96 | 3.55 | 6.71 | 2.64 | 0.96 |

Removal of water by heating or rotary evaporation or spray drying or freeze drying resulted in agglomeration of the particles and a much higher average particle size. However, it was found that higher solids content could be achieved without agglomeration of the particles by subjecting the suspension to one or more freeze-thaw cycles. A first freeze of a freeze-thaw cycle had the effect of loosely associating the solids, such that the corresponding thaw resulted in a partially separated suspension, from which the excess water at the upper surface can be readily removed (for example, by pipette, or by decanting). The resulting suspension had about 28% solids. Repeated freeze-thaw cycles allowed the solids level of the suspension to increase to as high as 40% solids.

2. Experimental Plan

The incorporation of fillers, additives, etc. in thermoplastic composites is achieved by melt-blending in an extruder (e.g., single screw, twin screw) where the most common method is to use a co-rotating intermeshing twin screw extruder. In the case of glass fiber, the configuration of the screw must be such that excessive size attrition is not imparted, yet the fiber is adequately dispersed and distributed. Here, a dried particle comprising cellulose was employed. To demonstrate the concept, Ultramid® B24 NO2 from BASF (PA6) and Owens Corning 995-10p (glass fiber) were selected, along with two dried cellulose compositions as detailed below. Without wishing to be bound by theory, any suitable drying technique could be employed as disclosed herein.

RMX-CP-CB: a dilute cellulose composition pre-blended with hectorite (Bentone® DE). Hectorite is a hydrophobic modified hectorite clay. Without wishing to be bound by theory, this diluted cellulose composition was selected: (1) because the clay would swell in water and when homogenously mixed with a cellulose composition the clay platelets and cellulose particles should disrupt re-agglomeration such that more of the inherent particle size is retained post-drying; and (2) to utilize a drying synergist that is thermally stable to survive blending. A ratio of 4:1 cellulose to clay was arbitrarily selected, and it was demonstrated that the resulting dry product retained more of the inherent PSD of the cellulose composition in the hydrated state.

RMX-CP-C: dried cellulose composition.

Additionally, Bentone DE was tested alone to measure its' contribution to performance.

3. Preparation of the Compositions

Additives were evaluated from 0.5 wt % to 2.0 wt %, with an emphasis on additives in an amount from 0.5 wt % to 1.0 wt %. In this way, a range of 20:1 to 60:1 glass to additive was prepared.

All additives were pre-melt blended in PA6 in a concentrated form (20 wt %) because it is very difficult to accurately dose <1.0 wt % powdered material. The benchmark was a 30% glass filled PA6 (see RMX-CP-17 in Tables 3 and 4 below). Glass fiber was evaluated at 15 wt %, 20 wt %, 25 wt %, and 30 wt % to measure the effect of the additive(s). Resin was used "as-is" from sealed foil-lined bags with a moisture level of <0.08%. Additives were not pre-dried before concentrating; however, in some embodiments, the additives may be pre-dried.

Samples were produced using a Berstorff 25 mm ZE twin-screw extruder with a general screw configuration that has been used to adequately disperse glass fiber (FIG. 1). Extruder temperature conditions were set as shown in Table 1.

TABLE 1

| Parameter | Value |
|---|---|
| Z1 | 450 F. |
| Z2 | 450 F. |
| Z3 | 450 F. |
| Z4 | 450 F. |
| Z5 | 450 F. |
| Z6 | 450 F. |
| Z7 | 450 F. |
| Die | 475 F. |
| Screw Speed | 200 rpm |
| Head Pressure | 200 psi |

Figure 2:
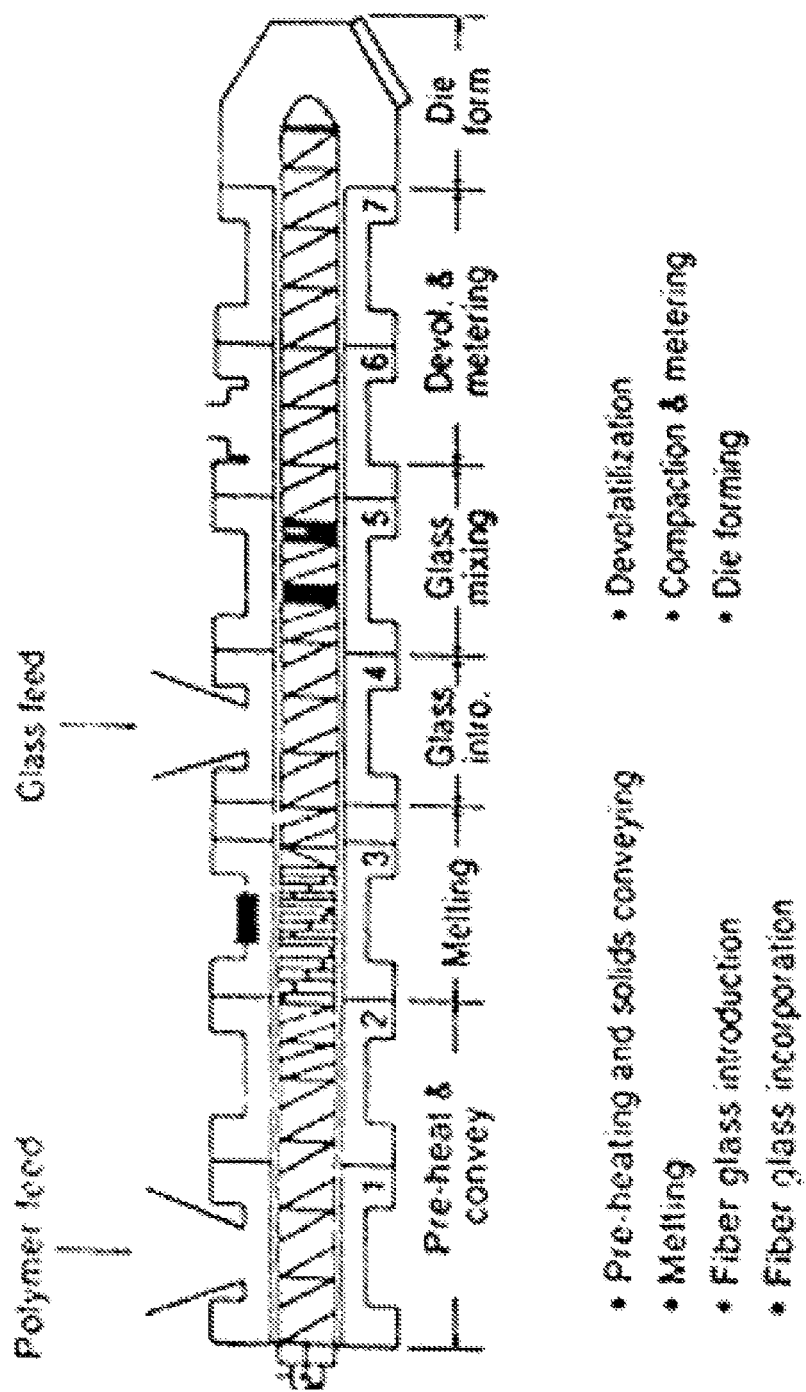
FIG. 2 shows a representative diagram illustrating a configuration for glass fiber incorporation into a polymer.

With reference to FIG. 2, neat PA6 pellets and concentrate were dry-mixed and dosed into zone 1. The glass fiber was metered in at zone 4 and mixed in zone 5. Metering was controlled by loss in weight feeders to accurately obtain the compositions prescribed above.

The extrudate was then cooled and pelletized. The pellets were dried 16-18 hrs at 121° C. in a forced air oven to remove superficial moisture. The dried pellets were then molded into ISO Type 1B tensile bars using a 30T Batenfeld electrically heated injection molding machine using the conditions shown in Table 2.

TABLE 2

| Parameter | Value |
| --- | --- |
| Z1 | 500 F. |
| Z2 | 520 F. |
| Z3 | 535 F. |
| Pressure | 1500 psi |
| Cooling | 20-30 s |
| Screw Speed | 400 |
| Velocity | 40/30/20/10 |

4. Masterbatch Compositions

The formulations of the masterbatch compositions prepared are shown in Table 3 and the effective loadings are shown in Table 4.

TABLE 3

| Component | RMX-CP-01 (wt %) | RMX-CP-02 (wt %) | RMX-CP-03 (wt %) | RMX-CP-04 (wt %) | RMX-CP-05 (wt %) |
| --- | --- | --- | --- | --- | --- |
| Ultramid B24 NO2 | 80 | 80 | 80 | 80 | 100 |
| RMX-CP-CB | 20 | — | — | — | — |
| RMX-CP-C | — | 20 | — | — | — |
| Bentone DE | — | — | 20 | — | — |
| CelluForce NCC | — | — | — | 20 | — |

TABLE 4

| Component | RMX-CP-01 (wt %) | RMX-CP-02 (wt %) | RMX-CP-03 (wt %) | RMX-CP-04 (wt %) | RMX-CP-05 (wt %) |
| --- | --- | --- | --- | --- | --- |
| Ultramid B24 NO2 | 80 | 80 | 80 | 80 | 100 |
| RMX | 10 | 20 | — | — | — |
| Bentone DE | 10 | — | 20 | — | — |
| CelluForce NCC | — | — | — | 20 | — |

5. Compositions

The formulations of the compositions prepared are shown in Table 5 and the effective loadings are shown in Table 6.

TABLE 5

| Component | RMX-CP-06 (wt %) | RMX-CP-07 (wt %) | RMX-CP-08 (wt %) | RMX-CP-09 (wt %) | RMX-CP-10 (wt %) | RMX-CP-11 (wt %) | RMX-CP-12 (wt %) | RMX-CP-13 (wt %) |
| --- | --- | --- | --- | --- | --- | --- | --- | --- |
| Ultramid B24 NO2 | 77.5 | 75 | 70 | 80 | 70 | 77.5 | 75 | 77.5 |
| OCV 995 | 20 | 20 | 20 | 15 | 25 | 20 | 20 | 20 |
| RMX-CP-01 | 2.5 | 5 | 10 | 5 | 5 | — | — | — |
| RMX-CP-02 | — | — | — | — | — | 2.5 | 5 | — |
| RMX-CP-03 | — | — | — | — | — | — | — | 2.5 |
| RMX-CP-04 | — | — | — | — | — | — | — | — |
| RMX-CP-05 | — | — | — | — | — | — | — | — |

| Component | RMX-CP-14 (wt %) | RMX-CP-15 (wt %) | RMX-CP-16 (wt %) | RMX-CP-17 (wt %) | RMX-CP-18 (wt %) | RMX-CP-19 (wt %) |
| --- | --- | --- | --- | --- | --- | --- |
| Ultramid B24 NO2 | 75 | 77.5 | 75 | 67 | 77 | 97 |
| OCV 995 | 20 | 20 | 20 | 30 | 20 | — |
| RMX-CP-01 | — | — | — | — | — | — |
| RMX-CP-02 | — | — | — | — | — | — |
| RMX-CP-03 | 5 | — | — | — | — | — |
| RMX-CP-04 | — | 2.5 | 5 | — | — | — |
| RMX-CP-05 | — | — | — | 3 | 3 | 3 |

TABLE 6

| Component | RMX-CP-06 (wt %) | RMX-CP-07 (wt %) | RMX-CP-08 (wt %) | RMX-CP-09 (wt %) | RMX-CP-10 (wt %) | RMX-CP-11 (wt %) | RMX-CP-12 (wt %) | RMX-CP-13 (wt %) |
| --- | --- | --- | --- | --- | --- | --- | --- | --- |
| Ultramid B24 NO2 | 77.5 | 75 | 70 | 80 | 70 | 77.5 | 75 | 77.5 |
| OCV 995 | 20 | 20 | 20 | 15 | 25 | 20 | 20 | 20 |
| RMX | 0.37 | 0.73 | 1.47 | 0.73 | 0.73 | 0.5 | 1 | — |
| Bentone DE | 0.13 | 0.27 | 0.53 | 0.27 | 0.27 | — | — | 0.5 |
| CelluForce NCC | — | — | — | — | — | — | — | — |
| 2$^{nd}$ Heat History PA6 | 2 | 4 | 8 | 4 | 4 | 2 | 4 | 2 |

TABLE 6-continued

| Component | RMX-CP-14 (wt %) | RMX-CP-15 (wt %) | RMX-CP-16 (wt %) | RMX-CP-17 (wt %) | RMX-CP-18 (wt %) | RMX-CP-19 (wt %) |
|---|---|---|---|---|---|---|
| Ultramid B24 NO2 | 75 | 77.5 | 75 | 67 | 77 | 97 |
| OCV 995 | 20 | 20 | 20 | 30 | 20 | — |
| RMX | — | — | — | — | — | — |
| Bentone DE | 1 | — | — | — | — | — |
| CelluForce NCC | — | 0.5 | 1 | — | — | — |
| 2$^{nd}$ Heat History PA6 | 4 | 2 | 4 | 3 | 3 | 3 |

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for making a composition, the method comprising the step of combining:
   (a) a polymer in an amount of from about 30 wt % to about 60 wt % of the composition;
   (b) a cellulose composition comprising particles, wherein the particles comprises cellulose and have an aspect ratio of from about 1 to about 1.5, and wherein the cellulose is present in an amount of from about 0.01 wt % to about 5 wt % of the composition; and
   (c) a reinforcing filler in an amount of from about 40 wt % to about 70 wt % of the composition, wherein the reinforcing filler is a glass fiber, a mineral filler, a carbon fiber, or a combination thereof.

2. The method of claim 1, wherein the polymer is a thermoplastic polymer.

3. The method of claim 2, wherein the thermoplastic polymer is a polyamide or a polyester.

4. The method of claim 1, wherein the cellulose composition is a dried cellulose composition.

5. The method of claim 1, wherein the cellulose composition is dried prior to the combining step.

6. The method of claim 1, further comprising forming the composition into an article.

7. An article prepared by the method of claim 6.

8. A composition prepared by the method of claim 1.

* * * * *